United States Patent
Qiu et al.

(10) Patent No.: US 12,358,247 B2
(45) Date of Patent: Jul. 15, 2025

(54) CONTACT LENSES WITH SOFTER LENS SURFACES

(71) Applicant: Alcon Inc., Fribourg (CH)

(72) Inventors: Yongxing Qiu, Suwanee, GA (US); John Dallas Pruitt, Suwanee, GA (US); Ciara Dauenhauer, Cumming, GA (US); Chung-Yuan Chiang, Johns Creek, GA (US); Paul William Oyler, Cumming, GA (US); Robert Carey Tucker, Suwanee, GA (US)

(73) Assignee: Alcon Inc., Fribourg (CH)

( * ) Notice: Subject to any disclaimer, the term of this patent is extended or adjusted under 35 U.S.C. 154(b) by 957 days.

(21) Appl. No.: 17/385,987

(22) Filed: Jul. 27, 2021

(65) Prior Publication Data

US 2022/0032564 A1    Feb. 3, 2022

Related U.S. Application Data

(60) Provisional application No. 63/057,478, filed on Jul. 28, 2020.

(51) Int. Cl.
  *B29D 11/00* (2006.01)
  *C09D 133/08* (2006.01)
  (Continued)

(52) U.S. Cl.
  CPC .. *B29D 11/00865* (2013.01); *B29D 11/00048* (2013.01); *B29D 11/00134* (2013.01);
  (Continued)

(58) Field of Classification Search
  CPC ........ B29D 11/00865; B29D 11/00048; B29D 11/00134; C09D 133/08; C09D 133/10; G02C 7/04; G02C 7/049
  (Continued)

(56) References Cited

U.S. PATENT DOCUMENTS

| | | |
|---|---|---|
| 3,408,429 A | 10/1968 | Wichterle |
| 4,042,552 A | 8/1977 | Grucza |

(Continued)

FOREIGN PATENT DOCUMENTS

| | | | | |
|---|---|---|---|---|
| AU | 2014221267 | * | 3/2016 | ............... A61F 2/14 |
| EP | 0632329 A1 | | 1/1995 | |

(Continued)

OTHER PUBLICATIONS

D. Auciello et al. (ed.) "Plasma-Surface Interactions and Processing of Materials"; The Application of Plasmas to ThinFilm Deposition Processes; Kluwer Academic Publishers, 1990, pp. 377-399.

(Continued)

*Primary Examiner* — Brian K Talbot
(74) *Attorney, Agent, or Firm* — Jian Zhou

(57) ABSTRACT

The invention is related to a coated contact lens, especially a coated silicone hydrogel contact lens, which comprises an anterior surface, an opposite posterior surface, and a layered structural configuration from the anterior surface to the posterior surface. The layered structural configuration comprises an outer anterior surface hydrogel layer, an inner layer, and an outer posterior surface hydrogel layer. The inner layer is a lens bulk material. The coated contact lens has a superior lens surface softness and a good lens surface hydrophilicity while optionally having a desirably-lower polyquaternium-1 uptake.

12 Claims, 2 Drawing Sheets

(51) Int. Cl.
*C09D 133/10* (2006.01)
*G02C 7/04* (2006.01)

(52) U.S. Cl.
CPC ......... *C09D 133/08* (2013.01); *C09D 133/10* (2013.01); *G02C 7/049* (2013.01)

(58) Field of Classification Search
USPC ........................................................ 427/164
See application file for complete search history.

(56) References Cited

U.S. PATENT DOCUMENTS

| | | |
|---|---|---|
| 4,045,547 A | 8/1977 | Le Boeuf et al. |
| 4,136,250 A | 1/1979 | Mueller et al. |
| 4,143,949 A | 3/1979 | Chen |
| 4,153,641 A | 5/1979 | Deichert et al. |
| 4,182,822 A | 1/1980 | Chang |
| 4,189,546 A | 2/1980 | Deichert et al. |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | LeBoeuf |
| 4,276,402 A | 6/1981 | Chromecek et al. |
| 4,312,575 A | 1/1982 | Peyman et al. |
| 4,327,203 A | 4/1982 | Deichert et al. |
| 4,341,889 A | 7/1982 | Deichert et al. |
| 4,343,927 A | 8/1982 | Chang |
| 4,347,198 A | 8/1982 | Ohkada et al. |
| 4,355,147 A | 10/1982 | Deichert et al. |
| 4,444,711 A | 4/1984 | Schad |
| 4,460,534 A | 7/1984 | Boehm et al. |
| 4,486,577 A | 12/1984 | Mueller et al. |
| 4,543,398 A | 9/1985 | Bany et al. |
| 4,605,712 A | 8/1986 | Mueller et al. |
| 4,661,575 A | 4/1987 | Tom |
| 4,684,538 A | 8/1987 | Klemarczyk |
| 4,703,097 A | 10/1987 | Wingler et al. |
| 4,833,218 A | 5/1989 | Lee |
| 4,837,289 A | 6/1989 | Mueller |
| 4,954,586 A | 9/1990 | Toyoshim et al. |
| 4,954,587 A | 9/1990 | Mueller |
| 5,010,141 A | 4/1991 | Mueller |
| 5,034,461 A | 7/1991 | Lai |
| 5,039,761 A | 8/1991 | Ono et al. |
| 5,070,170 A | 12/1991 | Robertson et al. |
| 5,070,215 A | 12/1991 | Bambury |
| 5,079,319 A | 1/1992 | Mueller |
| 5,198,477 A | 3/1993 | von der Haegen et al. |
| 5,219,965 A | 6/1993 | Valint, Jr. |
| 5,346,946 A | 9/1994 | Yokoyama et al. |
| 5,358,995 A | 10/1994 | Lai |
| 5,387,632 A | 2/1995 | Lai |
| 5,416,132 A | 5/1995 | Yokoyama et al. |
| 5,449,729 A | 9/1995 | Lai |
| 5,451,617 A | 9/1995 | Lal |
| 5,464,667 A | 11/1995 | Koehler |
| 5,486,579 A | 1/1996 | Lai |
| 5,508,317 A | 4/1996 | Müller |
| 5,527,925 A | 6/1996 | Chabrecek et al. |
| 5,583,163 A | 12/1996 | Müller |
| 5,599,576 A | 2/1997 | Opolski |
| 5,760,100 A | 6/1998 | Nicolson et al. |
| 5,766,158 A | 6/1998 | Opolski |
| 5,789,464 A | 8/1998 | Müller |
| 5,843,346 A | 12/1998 | Morrill |
| 5,849,810 A | 12/1998 | Müller |
| 5,894,002 A | 4/1999 | Boneberger et al. |
| 5,962,548 A | 10/1999 | Vanderlaan et al. |
| 5,981,675 A | 11/1999 | Valint et al. |
| 6,039,913 A | 3/2000 | Hirt et al. |
| 6,087,415 A | 7/2000 | Vanderlaan |
| 6,096,726 A | 8/2000 | Opolski |
| 6,099,122 A | 8/2000 | Chabrecek et al. |
| 6,166,236 A | 12/2000 | Bambury |
| 6,303,687 B1 | 10/2001 | Beat |
| 6,340,465 B1 | 1/2002 | Hsu |
| 6,367,929 B1 | 4/2002 | Maiden et al. |
| 6,436,481 B1 | 8/2002 | Chabrecek et al. |
| 6,440,571 B1 | 8/2002 | Valint, Jr. et al. |
| 6,447,920 B1 | 9/2002 | Chabrecek et al. |
| 6,451,871 B1 | 9/2002 | Winterton et al. |
| 6,465,056 B1 | 10/2002 | Chabrecek et al. |
| 6,500,481 B1 | 12/2002 | Vanderlaan et al. |
| 6,521,352 B1 | 2/2003 | Chabrecek et al. |
| 6,534,559 B1 | 3/2003 | Vanderlaan |
| 6,586,038 B1 | 7/2003 | Chabrecek et al. |
| 6,623,747 B1 | 9/2003 | Chatelier et al. |
| 6,627,124 B1 | 9/2003 | Herbrechtsmeier et al. |
| 6,683,062 B2 | 1/2004 | Opolski |
| 6,719,929 B2 | 4/2004 | Winterton et al. |
| 6,730,366 B2 | 5/2004 | Lohmann et al. |
| 6,734,321 B2 | 5/2004 | Chabrecek et al. |
| 6,762,264 B2 | 7/2004 | Kunzler et al. |
| 6,793,973 B2 | 9/2004 | Winterton et al. |
| 6,800,225 B1 | 10/2004 | Hagmann et al. |
| 6,811,805 B2 | 11/2004 | Gillard et al. |
| 6,822,016 B2 | 11/2004 | McCabe et al. |
| 6,835,410 B2 | 12/2004 | Chabrecek et al. |
| 6,838,491 B1 | 1/2005 | Vanderlaan |
| 6,866,936 B2 | 3/2005 | Opolski |
| 6,867,245 B2 | 3/2005 | Iwata et al. |
| 6,878,399 B2 | 4/2005 | Chabrecek et al. |
| 6,881,269 B2 | 4/2005 | Matsuzawa |
| 6,896,926 B2 | 5/2005 | Qiu et al. |
| 6,923,978 B2 | 8/2005 | Chatelier et al. |
| 7,078,074 B2 | 7/2006 | Matsuzawa |
| 7,214,809 B2 | 5/2007 | Zanini et al. |
| 7,279,507 B2 | 10/2007 | Hu |
| 7,384,590 B2 | 6/2008 | Kelly et al. |
| 7,387,759 B2 | 6/2008 | Kelly et al. |
| 7,423,074 B2 | 9/2008 | Lai |
| 7,605,190 B2 | 10/2009 | Moszner et al. |
| 7,858,000 B2 | 12/2010 | Winterton |
| 8,030,369 B2 | 10/2011 | Winterton |
| 8,044,112 B2 | 10/2011 | Matsuzawa |
| 8,147,897 B2 | 4/2012 | Ferreiro et al. |
| 8,158,192 B2 | 4/2012 | Bothe |
| 8,409,599 B2 * | 4/2013 | Wu .......................... G02C 7/04 424/422 |
| 8,415,405 B2 | 4/2013 | Maggio |
| 8,475,529 B2 | 7/2013 | Clarke |
| 8,480,227 B2 * | 7/2013 | Qiu ....................... C08L 101/14 351/159.33 |
| 8,529,057 B2 | 9/2013 | Qiu |
| 8,557,334 B2 * | 10/2013 | Samuel ............ B29D 11/00865 427/430.1 |
| 8,614,261 B2 | 12/2013 | Iwata et al. |
| 8,658,748 B2 | 2/2014 | Liu et al. |
| 8,835,525 B2 | 9/2014 | Kuyu |
| 8,993,651 B2 | 3/2015 | Chang |
| 9,097,840 B2 | 8/2015 | Chang et al. |
| 9,103,965 B2 | 8/2015 | Chang |
| 9,156,213 B2 | 10/2015 | Qiu |
| 9,217,813 B2 | 12/2015 | Liu |
| 9,244,195 B2 | 1/2016 | Bauman |
| 9,265,413 B2 | 2/2016 | Bhamla et al. |
| 9,475,827 B2 | 10/2016 | Chang et al. |
| 9,505,184 B2 | 11/2016 | Kolluru et al. |
| 9,804,295 B2 | 10/2017 | Winterton et al. |
| 10,081,697 B2 | 9/2018 | Huang et al. |
| 10,155,349 B2 | 12/2018 | Pruitt et al. |
| 10,266,445 B2 * | 4/2019 | Quinter ............ B29D 11/00048 |
| 10,301,451 B2 | 5/2019 | Jing et al. |
| 2007/0122540 A1 * | 5/2007 | Salamone ............. A61L 29/085 427/2.24 |
| 2008/0142038 A1 | 6/2008 | Kunzier |
| 2009/0145086 A1 | 6/2009 | Reynolds |
| 2009/0145091 A1 | 6/2009 | Connolly |
| 2013/0337160 A1 | 12/2013 | Holland et al. |
| 2016/0061995 A1 | 3/2016 | Chang et al. |
| 2018/0030209 A1 | 2/2018 | Sawyer et al. |
| 2018/0079889 A1 * | 3/2018 | Chiang ................. C08G 73/00 |

(56) References Cited

U.S. PATENT DOCUMENTS

2018/0100038 A1    4/2018  Jing et al.
2018/0355112 A1   12/2018  Zhang et al.
2019/0179055 A1*   6/2019  Qiu .......................... G02B 1/18

FOREIGN PATENT DOCUMENTS

EP         1465931 B1    8/2007
JP       2001-075060 A   3/2001
TW         201936794 A   9/2019

OTHER PUBLICATIONS

H. Yasuda, "Glow Discharge Polymerization", Journal of Polymer Science: Macromolecular Reviews, vol. 16 (1981), pp. 199-293.
Ho and Yasuda: "Ultrathin coating of plasma polymer of methane applied on the surface of silicone contact lenses; Journal of Biomedical Materials Research"; vol. 22; pp. 919-937 (1988).
Jansen "Plasma Deposited Thin Films (Chapter 1)" In: Plasma Deposition Processes (19) CRC Press (1986), Boca Raton, FL, Editors: F. Jansen and J. Mort, Ph.D.
N. Dilsiz and G. Akovali: "Plasma Polymerization of Selected Organic Compounds", Polymer, vol. 37 (1996) pp. 333-341.
R. Hartmann Plasma polymerisation: Grundlagen, Technik and Anwendung, Jahrbuch Oberflachentechnik Band1993)49, pp. 283-296, Battelle-Inst. e.V. Frankfurt/Main Germany.

* cited by examiner

CONTACT LENSES WITH SOFTER LENS SURFACES

This application claims the benefit under 35 USC § 119 (e) of U.S. provisional application No. 63/057,478 filed 28 Jul. 2020, herein incorporated by reference in its entirety.

The present invention generally relates to an improved water gradient contact lens having superior softer lens surfaces and optionally reduced uptakes of positively-charged antimicrobial agents present in multipurpose lens care solutions. This invention also relates to a method for making such a contact lens.

BACKGROUND

In recent years, a great number of efforts have been made to develop contact lenses with improved wearing comfort.

One example is to incorporate leachable wetting agents in contact lenses (see, e.g., U.S. Pat. Nos. 4,045,547, 4,042,552, 5,198,477, 5,219,965, 6,367,9296,822,016, 7,279,507, 8,030,369, and 9,804,295).

Another example is to incorporate bioactive agents and hydrophobic comfort agents into contact lenses (see, e.g., U.S. Pat. No. 10,155,349).

A further example is to make contact lenses having a nano-textured surface which mimics the surface texture of cornea of human eye (see, e.g., U.S. Pat. No. 9,244,195).

Also a further example is the development of a new class of soft contact lenses, water gradient contact lenses. This new class of soft contact lenses have been first developed and successfully introduced as daily-disposable contact lenses, DAILIES® TOTAL1® (Alcon), in the market. Weekly- or monthly-disposable water gradient soft contact lenses with a durable hydrogel coating and with a reduced uptake of positively-charged antimicrobial agents present in multipurpose lens care solutions have also be developed (see, U.S. Pat. Appl. Pub. No. 2019-0179055 A1). This new class of soft contact lenses is characterized by having a water-gradient structural configuration, an increase in water content observed in passing from the core to the surface of the contact lens, reaching the highest water content in the region near and including the surface of the contact lens (see, U.S. Pat. No. 8,480,227 which is herein incorporated by reference in its entirety). This unique design can deliver a highly-lubricious and remarkably-soft, water-rich lens surface that in turn provide superior wearing comfort to patients.

However, there is still need for improved water gradient contact lenses having even softer lens surfaces and optionally even lower uptakes of positively-charged antimicrobial agents present in multipurpose lens care solutions.

SUMMARY OF THE INVENTION

In one aspect, the invention provides a method for making coated contact lenses, comprising the steps of (1) obtaining a contact lens precursor which has a concave surface and an opposite convex surface and comprises a lens bulk material and first reactive functional groups on and/or near the anterior and posterior surfaces, wherein the first reactive functional groups are selected from the group consisting of carboxyl groups, amino groups, azetidinium groups, epoxide groups, aziridine groups, vinylsulfone groups, thiol groups, and combinations thereof; (2) immersing the contact lens precursor in an aqueous solution in a container, wherein the aqueous solution has a room temperature and comprises (a) at least one hydrophilic polymeric material and (b) a pH-buffering system for maintaining pH of the aqueous solution, wherein the pH-buffering system comprises at least two buffering agents, wherein the total concentration of all buffering agents present in the aqueous solution is from about 10 mM to 100 mM, wherein the aqueous solution has a room temperature and a pH of from about 6.8 to about 7.5, wherein the totally concentration of all ions present in the aqueous solution is less than 241 mM, provided that the total concentration of all ions each having two or more charges in the aqueous solution is less than 80 mM, wherein said at least one hydrophilic polymeric material comprises second reactive functional groups each of which is capable of reacting with one first reactive functional group at a temperature above the room temperature to form a covalent linkage, wherein the second reactive functional groups are selected from the group consisting of carboxyl groups, amino groups, azetidinium groups, epoxide groups, aziridine groups, thiol groups, and combinations thereof; and (3) heating the aqueous solution with the contact lens precursor therein to a crosslinking-temperature of from about 50° C. to about 140° C. and then maintaining the crosslinking temperature for at least about 20 minutes to form a coated contact lens having a hydrogel coating thereon.

The invention, in another aspect, provides a coated contact lens, preferably a coated silicone hydrogel contact lens, an anterior surface, an opposite posterior surface, and a layered structural configuration from the anterior surface to the posterior surface, wherein the layered structural configuration comprises an outer anterior surface hydrogel layer, an inner layer, and an outer posterior surface hydrogel layer, wherein the inner layer is a lens bulk material, wherein the coated contact lens has a superior lens surface softness as measured by an averaged indentation depth at 5 KPa compression pressure of at least about 550 nm with using an indenting probe having a tip radius of about 10 μm and a stiffness of about 0.5 N/m in a nanoindentation test, have a water-break-up time (WBUT) of at least 10 seconds and optionally a polyquaternium-1 uptake ("PU") of about 0.4 micrograms/lens or less.

This and other aspects of the invention including various preferred embodiments in any combination will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Figure 1:
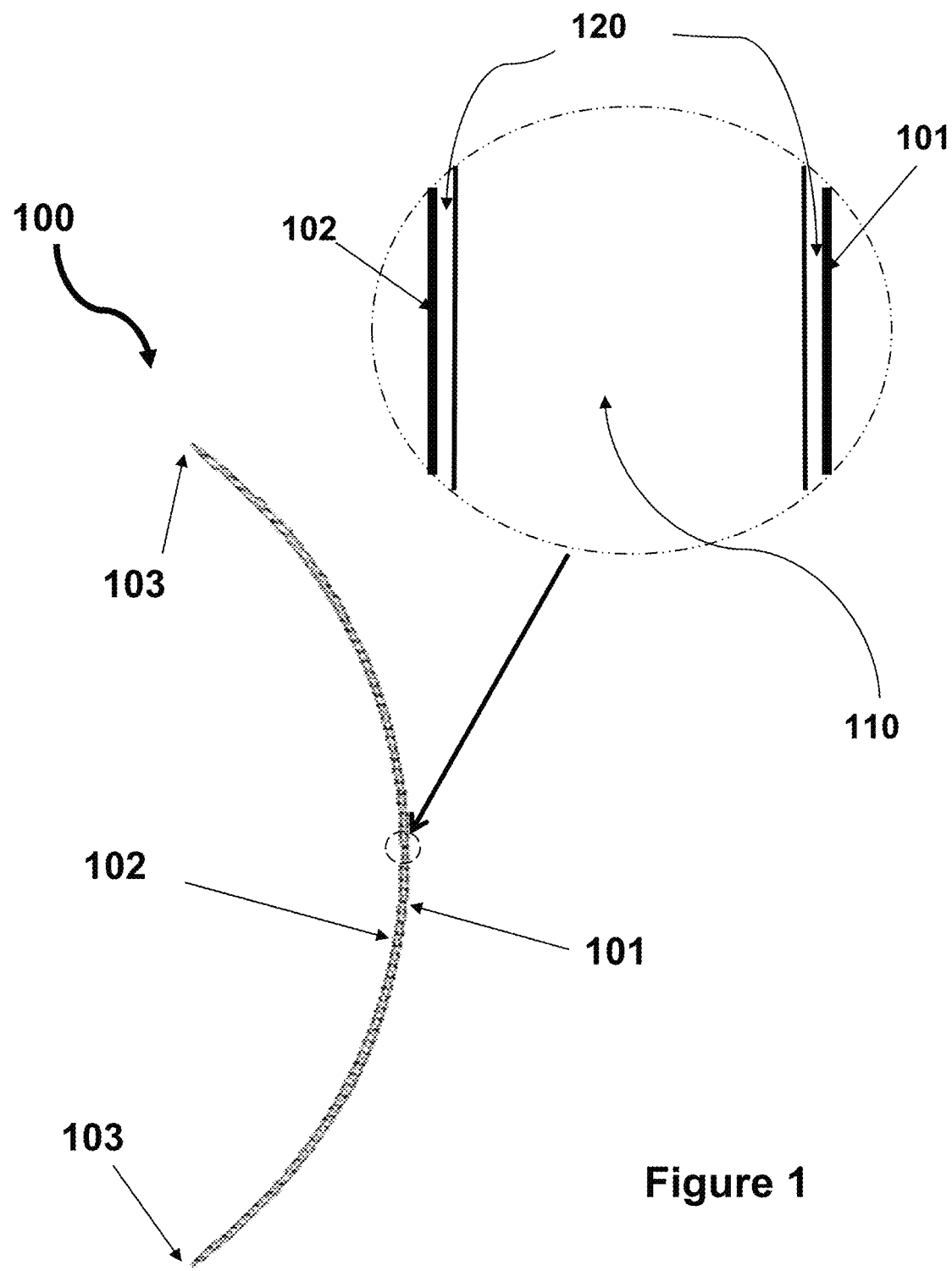
FIG. 1 schematically depicts a sectional view of the structural configuration of a contact lens according to a preferred embodiment of the invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

"About" as used herein in this application means that a number, which is referred to as "about", comprises the recited number plus or minus 1-10% of that recited number.

"Contact Lens" refers to a structure that can be placed on or within a wearers eye. A contact lens can correct, improve, or alter a user's eyesight, but that need not be the case. A contact lens can be of any appropriate material known in the art or later developed, and can be a hard lens, a rigid gas permeable lens, a soft lens, or a hybrid lens.

The term "anterior surface", "front surface", "front curve surface" or "FC surface" in reference to a contact lens, as used in this application, interchangeably means a surface of the contact lens that faces away from the eye during wear. The anterior surface (FC surface) is typically substantially convex.

The "posterior surface", "back surface", "base curve surface" or "BC surface" in reference to a contact lens, as used in this application, interchangeably means a surface of the contact lens that faces towards the eye during wear. The posterior surface (BC surface) is typically substantially concave.

A "hard contact lens" refers a contact lens comprising a hard plastics (e.g., polymethylmethacrylate) as lens bulk (or so-called "core") material.

A "rigid gas permeable contact lens" refers to a contact lens comprising a gas permeable material (e.g., a material made from fluorosilicone acrylates) as lens bulk (or so-called "core") material.

A soft contact lens can be a non-silicone hydrogel contact lens or a silicone hydrogel contact lens. A "non-silicone hydrogel contact lens" refers to a contact lens comprising a non-silicone hydrogel bulk (or so-called "core") material. A "silicone hydrogel contact lens" or "SiHy" interchangeably refers to a contact lens comprising a silicone hydrogel bulk (or so-called "core") material.

A hybrid contact lens comprises a lens bulk material consisting essentially of a central optical zone that is made of a gas permeable lens material and a peripheral zone that is made of silicone hydrogel or regular hydrogel lens material and extends outwardly from and surrounds the central optical zone.

An embedded contact lens comprises a lens bulk material consisting essentially of a 3-dimensional embedded article and a non-silicone hydrogel material or a silicone hydrogel material, wherein the 3-dimensional embedded article is made of a non-hydrogel material and has a 3-dimensional size smaller than that of the contact lens so that it is partially or preferably completely embedded within a non-silicone hydrogel material or a silicone hydrogel material. A non-hydrogel material can be any material which absorbs less than 10% (preferably about 7.5% or less, more preferably about 5.0% or less, even more preferably about 2.5% or less) by weight of water when being fully hydrated.

A "hydrogel" or "hydrogel material" refers to a cross-linked polymeric material which is insoluble in water, but can hold at least 10 percent by weight of water in its three-dimensional polymer networks (i.e., polymer matrix) when it is fully hydrated.

As used in this application, the term "non-silicone hydrogel" refers to a hydrogel that is theoretically free of silicon.

As used in this application, the term "silicone hydrogel" or "SiHy" interchangeably refers to a hydrogel containing silicone. A silicone hydrogel (SiHy) typically is obtained by copolymerization of a polymerizable composition comprising at least one silicone-containing vinylic monomer or at least one silicone-containing vinylic macromer or at least one silicone-containing prepolymer having ethylenically unsaturated groups.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

As used in this application, the term "vinylic crosslinker" refers to a compound having at least two ethylenically unsaturated groups. A "vinylic crosslinking agent" refers to a subclass of vinylic crosslinkers each having a number average molecular weight of 700 Daltons or less.

As used in this application, the term "ethylenically unsaturated group" is employed herein in a broad sense and is intended to encompass any groups containing at least one >C=C< group. Exemplary ethylenically unsaturated groups include without limitation (meth)acryloyl

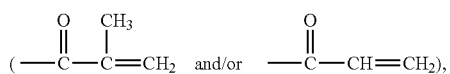

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "blending vinylic monomer" refers to a vinylic monomer capable of dissolving both hydrophilic and hydrophobic polymerizable components of a polymerizable composition to form a solution.

An "acrylic monomer" refers to a vinylic monomer having one sole (meth)acryloyl group. Examples of acrylic monomers includes (meth)acryloxy [or (meth)acryloyloxy] monomers and (meth)acrylamido monomers.

An "(meth)acryloxy monomer" or "(meth)acryloyloxy monomer" refers to a vinylic monomer having one sole group of

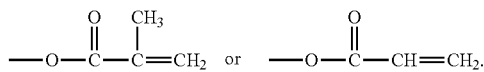

An "(meth)acrylamido monomer" refers to a vinylic monomer having one sole group of

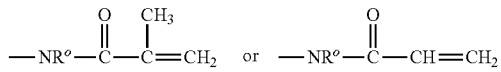

in which R° is H or $C_1$-$C_4$ alkyl.

A "vinylcarbonato monomer" refers to a vinylic monomer having one sole group of

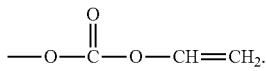

A "vinylcarbamato monomer" refers to a vinylic monomer having one sole group of

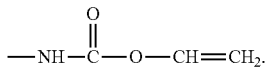

An "N-vinyl amide monomer" refers to an amide compound having a vinyl group (—CH═$CH_2$) that is directly attached to the nitrogen atom of the amide group.

A "UV-absorbing vinylic monomer" refers to a compound comprising an ethylenically-unsaturated group and a UV-absorbing moiety which can absorb or screen out UV radiation in the range from 200 nm to 400 nm as understood by a person skilled in the art.

A "HEVL-absorbing vinylic monomer" refers to a compound comprising an ethylenically-unsaturated group and a HEVL-absorbing moiety which can absorb or screen out HEVL (high-energy-violet-light) radiation in the range from 380 nm to 440 nm as understood by a person skilled in the art.

A siloxane, which often also described as a silicone, refers to a molecule having at least one moiety of —Si—O—Si— where each Si atom carries at least two substituents (organic groups).

A "silicone-containing vinylic monomer or crosslinker" or a "siloxane-containing vinylic monomer or crosslinker" interchangeably refers to a vinylic monomer or crosslinker having at least one moiety of —Si—O—Si— where each Si atom carries at least two substituents (organic groups).

The term "terminal ethylenically-unsaturated group" refers to one ethylenically-unsaturated group at one of the two ends of the main chain (or backbone) of an organic compound as known to a person skilled in the art. The term "terminal (meth)acryloyl group" refers to one (meth)acryloyl group at one of the two ends of the main chain (or backbone) of an organic compound as known to a person skilled in the art.

A "hydrophilic vinylic monomer", a "hydrophilic acrylic monomer", a "hydrophilic (meth)acryloxy monomer", a "hydrophilic (meth)acrylamide monomer", or a "hydrophilic N-vinyl amide monomer", as used herein, respectively refers to a vinylic monomer, an acrylic monomer, a (meth)acryloxy monomer, a (meth)acrylamido monomer), or a N-vinyl amide monomer, which typically yields a homopolymer that is water-soluble or can absorb at least 10 percent by weight of water at room temperature.

A "hydrophobic vinylic monomer", a "hydrophobic acrylic monomer", a "hydrophobic (meth)acryloxy monomer", a "hydrophobic (meth)acrylamide monomer", or a "hydrophobic N-vinyl amide monomer", as used herein, respectively refers to a vinylic monomer, an acrylic monomer, a (meth)acryloxy monomer, a (meth)acrylamido monomer), or a N-vinyl amide monomer, which typically yields a homopolymer that is insoluble in water and can absorb less than 10% by weight of water.

A "polysiloxane segment" or "polydiorganosiloxane segment" interchangeably refers to a polymer chain segment (i.e., a divalent radical) of

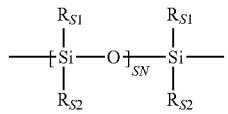

in which SN is an integer of 3 or larger and each of $R_{S1}$ and $R_{S2}$ independent of one another are selected from the group consisting of: $C_1$-$C_{10}$ alkyl; phenyl; $C_1$-$C_4$-alkyl-substituted phenyl; $C_1$-$C_4$-alkoxy-substituted phenyl; phenyl-$C_1$-$C_6$-alkyl; $C_1$-$C_{10}$ fluoroalkyl; $C_1$-$C_{10}$ fluoroether; aryl; aryl $C_1$-$C_{18}$ alkyl; -alk-($OC_2H_4$)$_{\gamma 1}$—OR° (in which alk is $C_1$-$C_6$ alkylene diradical, R° is H or $C_1$-$C_4$ alkyl and γ1 is an integer from 1 to 10); a $C_2$-$C_{40}$ organic radical having at least one functional group selected from the group consisting of hydroxyl group (—OH), carboxyl group (—COOH), amino group (—$NR_{N1}R^{N1'}$), amino linkages of —$NR_{N1}$—, amide linkages of —$CONR_{N1}$—, amide of —$CONR_{N1}R_{N1}'$, urethane linkages of —OCONH—, and $C_1$-$C_4$ alkoxy group, and a linear hydrophilic polymer chain, in which $R_{N1}$ and $R_{N1}'$ independent of each other are hydrogen or a $C_1$-$C_{15}$ alkyl.

A "polydiorganosiloxane vinylic monomer" or "polysiloxane vinylic monomer" refers to a compound comprising at least one polysiloxane segment and one sole ethylenically-unsaturated group.

A "polydiorganosiloxane vinylic crosslinker" or "polysiloxane vinylic crosslinker" interchangeably refers to a compound comprising at least one polysiloxane segment and at least two ethylenically-unsaturated groups.

A "linear polydiorganosiloxane vinylic crosslinker" or "linear polysiloxane vinylic crosslinker" interchangeably refers to a compound comprising a main chain which includes at least one polysiloxane segment and is terminated with one ethylenically-unsaturated group at each of the two ends of the main chain.

A "chain-extended polydiorganosiloxane vinylic crosslinker" or "chain-extended polysiloxane vinylic crosslinker" interchangeably refers to a compound comprising at least two ethylenically-unsaturated groups and at least two polysiloxane segments each pair of which are linked by one divalent radical.

The term "fluid" as used herein indicates that a material is capable of flowing like a liquid.

As used in this application, the term "clear" in reference to a polymerizable composition means that the polymerizable composition is a transparent solution or liquid mixture having a light transmissibility of 85% or greater (preferably 90% or greater) in the range between 400 to 700 nm.

A "macromer" or "prepolymer" refers to a compound or polymer comprising ethylenically unsaturated groups and having a number average molecular weight of greater than 700 Daltons.

As used in this application, the term "polymer" means a material formed by polymerizing or crosslinking one or more monomers, macromers, prepolymers, or combinations thereof.

As used in this application, the term "molecular weight" of a polymeric material (including monomeric or macromeric materials) refers to the number-average molecular weight unless otherwise specifically noted or unless testing conditions indicate otherwise. A skilled person knows how to determine the molecular weight of a polymer according to known methods, e.g., GPC (gel permeation chromatography) with one or more of a refractive index detector, a low-angle laser light scattering detector, a multi-angle laser light scattering detector, a differential viscometry detector, a UV detector, and an infrared (IR) detector; MALDI-TOF MS (matrix-assisted desorption/ionization time-of-flight mass spectroscopy); $^1$H NMR (Proton nuclear magnetic resonance) spectroscopy, etc.

The term "monovalent radical" refers to an organic radical that is obtained by removing a hydrogen atom from an organic compound and that forms one bond with one other group in an organic compound. Examples include without limitation, alkyl (by removal of a hydrogen atom from an alkane), alkoxy (or alkoxyl) (by removal of one hydrogen atom from the hydroxyl group of an alkyl alcohol), thiyl (by removal of one hydrogen atom from the thiol group of an alkylthiol), cycloalkyl (by removal of a hydrogen atom from a cycloalkane), cycloheteroalkyl (by removal of a hydrogen atom from a cycloheteroalkane), aryl (by removal of a hydrogen atom from an aromatic ring of the aromatic hydrocarbon), heteroaryl (by removal of a hydrogen atom from any ring atom), amino (by removal of one hydrogel atom from an amine), etc.

The term "divalent radical" refers to an organic radical that is obtained by removing two hydrogen atoms from an organic compound and that forms two bonds with other two groups in an organic compound. For example, an alkylene divalent radical (i.e., alkylenyl) is obtained by removal of two hydrogen atoms from an alkane, a cycloalkylene divalent radical (i.e., cycloalkylenyl) is obtained by removal of two hydrogen atoms from the cyclic ring.

In this application, the term "substituted" in reference to an alkyl or an alkylenyl means that the alkyl or the alkylenyl comprises at least one substituent which replaces one hydrogen atom of the alkyl or the alkylenyl and is selected from the group consisting of hydroxyl (—OH), carboxyl (—COOH), —NH$_2$, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, and combinations thereof.

As used in this application, the term "amino group" refers to a primary or secondary amino group of formula —NHR', where R' is hydrogen or a $C_1$-$C_{20}$ unsubstituted or substituted, linear or branched alkyl group, unless otherwise specifically noted.

In this application, the term "poly(2-oxazoline-co-ethyleneimine)" refers to a statistical copolymer or a polymer segment thereof having a formula of

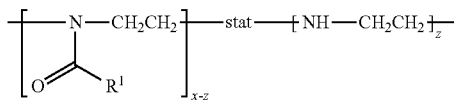

in which: $R^1$ is hydrogen, methyl, ethyl, N-pyrrolidinylmethyl, N-pyrrolidonylethyl, N-pyrrolidonylpropyl, or a monovalent radical of -alk-(OC$_2$H$_4$)$_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (≥90%) of the secondary amine groups of the poly(2-oxazoline-co-ethyleneimine) into azetidinium groups. Examples of poly(2-oxazoline-co-ethyleneimine)-epichlorohydrin are disclosed in a copending U.S. pat. Appl. No. 2016/0061995A1.

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged (i.e., cationic), divalent radical (or group or moiety) of

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at a temperature of from about 5° C. to about 15° C., to an extend detectable for a period of about one hour.

As used in this application, the term "phosphorylcholine" refers to a zwitterionic group of

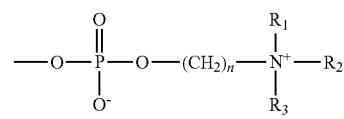

in which n is an integer of 1 to 5 and $R_1$, $R_2$ and $R_3$ independently of each other are $C_1$-$C_8$ alkyl or $C_1$-$C_8$ hydroxyalkyl.

As used in this application, the term "carboxyl-containing vinylic monomer" refers to any vinylic monomer having a carboxyl group (—COOH); the term "amino-containing vinylic monomer" refers to any vinylic monomer having an amino group (—NHR').

As used in this application, the term "non-reactive vinylic monomer" refers to any vinylic monomer free of carboxyl group, primary amino group, secondary amino group, epoxide group, isocyanate group, azlactone group

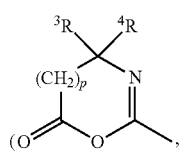

or aziridine group

(in which p is 0 or 1; $^3R$ and $^4R$ independently of each other is $C_1$-$C_8$ alkyl; $R^1$ is hydrogen, methyl or ethyl).

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

The intrinsic "oxygen permeability", $Dk_i$, of a material is the rate at which oxygen will pass through a material. As used in this application, the term "oxygen permeability (Dk)" in reference to a hydrogel (silicone or non-silicone) or a contact lens means a corrected oxygen permeability ($Dk_c$) which is measured at about 34-35° C. and corrected for the surface resistance to oxygen flux caused by the boundary layer effect according to the procedures described in ISO 1836J-4. Oxygen permeability is conventionally expressed in units of barrers, where "barrer" is defined as $[(cm^3\ oxygen)(cm)/(cm^2)(sec)(mm\ Hg)] \times 10^{-9}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as $[(cm^3\ oxygen)/(cm^2)(sec)(mm\ Hg)] \times 10^{-9}$.

The term "modulus" or "elastic modulus" in reference to a contact lens or a material means the tensile modulus or Young's modulus which is a measure of the stiffness of a contact lens or a material in tension. A person skilled in the art knows well how to determine the elastic modulus of a SiHy material or a contact lens. For example, all commercial contact lenses have reported values of elastic modulus.

A "coating" in reference to a contact lens means that the contact lens has, on its surfaces, a thin layer of a material that is different from the bulk material of the contact lens and obtained by subjecting the contact lens to a surface treatment.

"Surface modification" or "surface treatment", as used herein, means that an article has been treated in a surface treatment process, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified. Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929, the incorporation of wetting agents into a lens formulation for making contact lenses proposed in U.S. Pat. Nos. 6,367,929 and 6,822,016, reinforced mold-transfer coating disclosed in U.S. Pat. No. 7,858,000, and a hydrophilic coating composed of covalent attachment or physical deposition of one or more layers of one or more hydrophilic polymer onto the surface of a contact lens disclosed in U.S. Pat. Nos. 8,147,897, 8,409,599, 8,557,334, 8,529,057, and 9,505,184.

A "hydrophilic surface" in reference to a silicone hydrogel material or a contact lens means that the silicone hydrogel material or the contact lens has a surface hydrophilicity characterized by having an averaged water contact angle of about 90 degrees or less, preferably about 80 degrees or less, more preferably about 70 degrees or less, more preferably about 60 degrees or less.

An "average contact angle" refers to a water contact angle (static water contact angle measured by Sessile Drop), which is obtained by averaging measurements of at least 3 individual contact lenses.

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The term "water gradient" in reference to a contact lens means that there is an increase in water content observed in passing from the core to the surface of the contact lens, reaching the highest water content in the region near and including the surface of the contact lens. It is understood that the increase in water content from the core to the surface of the contact lens can be continuous and/or step-wise, so long as the water content is highest in the region near and including the surface of the contact lens.

As used in this application, the term "cross section" of a contact lens refers to a lens section obtained by cutting through the lens with a knife or cutting tool at an angle substantially normal to either of the anterior and posterior surfaces of the lens. A person skilled in the art knows well to cut manually (i.e., hand cut), or with Cryosta Microtome or with a lathe, a contact lens to obtain a cross section of the contact lens. A resultant cross section of a contact lens can be polished by using ion etching or similar techniques.

As used in this application, the term "equilibrium water content" in reference to a contact lens or a polymeric material means the amount (expressed as percent by weight) of water present in the contact lens or the polymeric material when being fully hydrated (equilibrated) in phosphate buffered saline solution (ca. 0.79 wt % NaCl) and determined at room temperature (as defined above).

As used in this application, the term "crosslinked coating" or "hydrogel coating" or "hydrogel layer" on a contact lens interchangeably is used to describe a crosslinked polymeric material having a three-dimensional network that can contain water when fully hydrated. The three-dimensional network of a crosslinked polymeric material can be formed by crosslinking of two or more linear or branched polymers through crosslinkages.

The term "modulus" or "elastic modulus" in reference to a contact lens or a material means the tensile modulus or Young's modulus which is a measure of the stiffness of a contact lens or a material in tension. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

As used in this application, the term "lens bulk material" in reference to a contact lens interchangeably means a layer that has a 3-dimensional shape of a contact lens and includes a central curved plane (which divides the contact lens into two parts, one containing the anterior surface and the other containing the posterior surface) and has a variable thickness.

As used in this application, the term "outer surface hydrogel layer" in reference to a contact lens means an outmost hydrogel layer underneath the surface of the contact lens, which consists of an outer anterior surface hydrogel layer and an outer posterior surface hydrogel layer and which fully covers the lens bulk material. An "outer anterior surface hydrogel layer" in reference to a contact lens means an outmost hydrogel layer underneath the anterior surface of the contact lens. An "outer posterior surface hydrogel layer" in reference to a contact lens means an outmost hydrogel layer underneath the posterior surface of the contact lens. It is understood that the anterior surface consists of the same material as the outer anterior surface hydrogel layer while the posterior surface consists of the same material as the outer posterior surface hydrogel layer.

As used in this application, the term "transition layer" in reference to a contact lens means a layer of polymeric material that is located between the inner layer (or the lens bulk material) and one of the anterior and posterior outer hydrogel layers.

The term "surface softness" is used in this application to means an apparent elastic property of a polymeric article (a hydrogel or a silicone hydrogel article) at one of its surface, as measured by an average indentation depth at 5 KPa compression pressure of an indenting probe having a tip radius of about 10 μm and a stiffness of about 0.5 N/m in a nanoindentation test (as described in Example 1). The 5 kPa compression pressure is used to simulate eyelid pressure, typically between 1-5 kPa. Other probe tip radii or cantilever stiffness could be used, depending upon the surface softness. Stiffer probes could be used for stiffer materials.

The surface softness of a contact lens with outer surface hydrogel layer thereon at one of the two surfaces depends upon on the surface modulus (or Young's modulus) and/or the thickness of the outer surface hydrogel layer on top of the core, at small indents (<10% of total lens thickness).

As known to a person skilled in the art, the surface modulus of a hydrogel correlates with the mesh size of the hydrogel, because the mesh size of the hydrogel is inversely proportional to the crosslinking density of the hydrogel while being proportional to the lengths of crosslinking chains (see, U.S. Pat. No. 2018/0030209). Due to the correlation between the mesh size and the equilibrium water content of a hydrogel, the surface modulus of a hydrogel can inversely correlate with the equilibrium water content of that hydrogel. The higher the surface modulus of a hydrogel is, the lower the equilibrium water content is. Consequently, the larger an indentation depth at 5 KPa is, the lower the elastic modulus of the outer surface hydrogel layer on a contact lens at one of its surface is.

The apparent surface property (i.e., surface softness) of a contact lens with outer surface hydrogel layer thereon at one of the two surfaces also depends upon on the thickness of the outer surface hydrogel layer underneath that surface, because the outer surface hydrogel layer can be much softer than a lens bulk material. The larger an indentation depth at 5 KPa is, the thicker the outer surface hydrogel layer on a contact lens at one of its surface is.

Therefore, the indentation depth at 5 KPa compression pressure (or any fixed compression pressure) of a contact lens at one of its surface can be a good indicator for both surface modulus (or equilibrium water content) and/or the thickness of an outer surface hydrogel layer at the surface.

FIG. 1 schematically illustrates a contact lens of the invention, according to a preferred embodiment. In accordance with this preferred embodiment of the invention, the contact lens 100 has an anterior surface (or front curve or convex surface) 101 and an opposite posterior surface (or base curve or concave surface) 102 which is rest on the cornea of the eye when worn by a user. The contact lens 100 comprises a lens bulk material 110, an outer anterior surface hydrogel layer 121 and an outer posterior surface hydrogel layers 122. The lens bulk material 110 has a 3-dimensional shape very close to the contact lens 100. The outer anterior and posterior surface hydrogel layers 120 are made of a hydrogel material substantially free of silicone (preferably totally free of silicone) having a higher water content relative to that of the inner layer 110. The anterior and posterior outer hydrogel layers 120 merge at the peripheral edge 103 of the contact lens 100 and cover completely the inner layer 110.

The invention is generally related to a coated contact lens, especially a coated SiHy contact lens, which comprises an anterior surface, an opposite posterior surface, and a layered structural configuration from the anterior surface to the posterior surface, wherein the layered structural configuration comprises an outer anterior surface hydrogel layer, an inner layer, and an outer posterior surface hydrogel layer, wherein the inner layer is a lens bulk material, wherein the coated contact lens has a superior lens surface softness (i.e., as measured by an averaged indentation depth at 5 KPa compression pressure of at least about 550 nm with using an indenting probe having a tip radius of about 10 μm and a stiffness of about 0.5 N/m in a nanoindentation test) and a good lens surface hydrophilicity (i.e., having a water-break-up time (WBUT) of at least 10 seconds) while optionally having a desirably-lower polyquaternium-1 uptake ("PU") (i.e., about 0.4 micrograms/lens or less).

The invention is partly based on the discoveries that the surface softness of a coated contact lens with a hydrogel coating thereon can be controlled by the solution reaction conditions under which the hydrogel coating is formed onto a contact lens precursor directly in a lens package containing the contact lens precursor immersed in a lens packaging solution in the presence of a water-soluble, thermally-crosslinkable polymeric material (e.g., one having azetidinium groups). Typically, contact lenses, which are hydrated and packaged in a packaging solution, must be sterilized. Sterilization of the hydrated lenses during manufacturing and packaging is typically accomplished by autoclaving. The autoclaving process involves heating the packaging of a contact lens to a temperature of from about 118° C. to about 125° C. for approximately 20-40 minutes under pressure. It is discovered that the total concentrations of all buffering agents, ions and those ions having at least two charges in the packaging solution are critical factors for forming a hydrogel coating on a contact lens precursor so that imparts to the resultant coated contact lens with a superior lens surface softness and a superior lens surface hydrophilicity as well as with an desirably lower.

In one aspect, the invention provides a method for making coated contact lenses, comprising the steps of (1) obtaining a contact lens precursor which has a concave surface and an opposite convex surface and comprises a lens bulk material and first reactive functional groups on and/or near the anterior and posterior surfaces, wherein the first reactive functional groups are selected from the group consisting of carboxyl groups, amino groups, azetidinium groups, epoxide groups, aziridine groups, vinylsulfone groups, thiol groups, and combinations thereof (preferably from the group consisting of carboxyl groups, amino groups, azetidinium groups, epoxide groups, thiol groups, and combinations thereof, more preferably from the group consisting of carboxyl groups, amino groups, azetidinium groups, and combinations thereof, even more preferably from the group consisting of carboxyl groups, amino groups, and combinations thereof); (2) immersing the contact lens precursor in an aqueous solution in a container, wherein the aqueous solution has a room temperature and comprises (a) at least one hydrophilic polymeric material and (b) a pH-buffering system for maintaining pH of the aqueous solution (within a range of from about 6.8 to about 7.5, preferably from about 6.8 to about 7.4, more preferably from about 6.9 to about 7.3), wherein the pH-buffering system comprises at least two buffering agents, wherein the total concentration of all buffering agents present in the aqueous solution is from about 10 mM to 100 mM (preferably from about 10 mM to 90 mM, more preferably from about 10 mM to 80 mM, even more preferably from about 10 mM to 70 mM), wherein the aqueous solution has a room temperature and a pH of from about 6.8 to about 7.5 (preferably from about 6.8 to about 7.4, more preferably from about 6.9 to about 7.3), wherein the totally concentration of all ions present in the aqueous solution is less than 241 mM (preferably less than 221 mM, more preferably less than 211 mM, even more preferably less than 201 mM), provided that the total concentration of all ions each having two or more charges in the aqueous solution is less than 80 mM (preferably less than 70 mM, more preferably less than 60 mM, even more preferably less than 50 mM), wherein said at least one hydrophilic polymeric material comprises second reactive functional groups each of which is capable of reacting with one first reactive functional group at a temperature above the room temperature to form a covalent linkage, wherein the second reactive functional groups are selected from the group consisting of carboxyl groups, amino groups, azetidinium groups, epoxide groups, aziridine groups, thiol groups, and combinations thereof (preferably from the group consisting of carboxyl groups, amino groups, azetidinium groups, epoxide groups, thiol groups, and combinations thereof, more preferably from the group consisting of carboxyl groups, amino groups, azetidinium groups, and combinations thereof); and (3) heating the aqueous solution with the contact lens precursor therein to a crosslinking-temperature of from about 50° C. to about 140° C. and then maintaining the crosslinking temperature for at least about 20 minutes to form a coated contact lens having a hydrogel coating thereon.

The invention, in another aspect, provides a coated contact lens, preferably a coated silicone hydrogel contact lens, an anterior surface, an opposite posterior surface, and a layered structural configuration from the anterior surface to the posterior surface, wherein the layered structural configuration comprises an outer anterior surface hydrogel layer, an inner layer, and an outer posterior surface hydrogel layer, wherein the inner layer is a lens bulk material, wherein the coated contact lens has a superior lens surface softness as measured by an averaged indentation depth at 5 KPa compression pressure of at least about 550 nm (preferably at least about 600 nm, more preferably at least about 650 nm, more preferably at least about 700 nm or 750 nm or 800 nm) with using an indenting probe having a tip radius of about 10 µm and a stiffness of about 0.5 N/m in a nanoindentation test, optionally have a polyquaternium-1 uptake ("PU") of about 0.4 micrograms/lens or less, and a water-break-up time (WBUT) of at least 10 seconds (preferably at least 12.5 seconds, more preferably at least 15 seconds, even more preferably at least 17.5 seconds).

In accordance with all the various aspects of the invention, the lens bulk material of a contact lens of the invention can be derived directly from a preformed contact lens. A preformed contact lens can be any contact lens which has not been subjected to any surface treatment after being produced according to any lens manufacturing processes, any contact lens which has been plasma treated or treated with any chemical or physical surface modification, or any commercial contact lens, so long as it does not have a hydrogel coating on the surface of the preformed contact lens. A person skilled in the art knows very well how to make preformed contact lenses. A person skilled in the art knows very well how to make preformed contact lenses. For example, preformed contact lenses can be produced in a conventional "spin-casting mold," as described for example in U.S. Pat. No. 3,408,429, or by the full cast-molding process in a static form, as described in U.S. Pat. Nos. 4,347,198; 5,508,317; 5,583,463; 5,789,464; and 5,849,810, or by lathe cutting of polymeric material buttons as used in making customized contact lenses. In cast-molding, a polymerizable composition (i.e., a lens formulation) typically is dispensed into molds and cured (i.e., polymerized and/or crosslinked) in molds for making contact lenses.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with the polymerizable composition.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. Nos. 4,444,711; 4,460,534; 5,843,346; and 5,894,002.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, New Jersey), or the like can be used. Other materials that allow UV light transmission could be used, such as quartz glass and sapphire.

In a preferred embodiment, reusable molds are used and the lens-forming composition is cured actinically under a spatial limitation of actinic radiation to form a contact lens. Examples of preferred reusable molds are those disclosed in U.S. Pat. Nos. 6,627,124, 6,800,225, 7,384,590, and 7,387, 759. Reusable molds can be made of quartz, glass, sapphire, CaF$_2$, a cyclic olefin copolymer (e.g., Topas® COC grade 8007-S10 (clear amorphous copolymer of ethylene and norbornene) from Ticona GmbH of Frankfurt, Germany and Summit, New Jersey, Zeonex® and Zeonor® from Zeon Chemicals LP, Louisville, KY), polymethylmethacrylate (PMMA), polyoxymethylene from DuPont (Delrin), Ultem® (polyetherimide) from G.E. Plastics, PrimoSpire®, etc.

In accordance with the invention, the polymerizable composition can be introduced (dispensed) into a cavity formed by a mold according to any known methods.

After the polymerizable composition is dispensed into the mold, it is polymerized to produce a contact lens. Crosslinking may be initiated thermally or actinically, preferably by exposing the polymerizable composition in the mold to a spatial limitation of actinic radiation to crosslink the polymerizable components in the polymerizable composition.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described below.

In a preferred embodiment, a preformed contact lens is a hard contact lens comprising a hard plastic material as lens bulk material. Preferably, the hard plastic material is a crosslinked polymethylacrylate. A person skilled in the art knows well how to make a hard plastic material, including a crosslinked polymethylmethacrylate.

In another preferred embodiment, a preformed contact lens is a rigid gas permeable contact lens comprising a rigid gas permeable material as lens bulk material. A person skilled in the art knows how to make a rigid gas permeable contact lens.

In another preferred embodiment, a preformed contact lens is a hybrid contact lens comprises a lens bulk material consisting essentially of a central optical zone that is made of a gas permeable lens material and a peripheral zone that is made of silicone hydrogel or regular hydrogel lens material and extends outwardly from and surrounds the central optical zone.

In another preferred embodiment, a preformed contact lens is a non-silicone hydrogel contact lens (or so-called a conventional hydrogel contact lens) comprising a non-silicone hydrogel material as lens bulk material.

Preformed non-silicone hydrogel contact lenses can be any commercially-available non-silicone hydrogel contact lenses or can be produced according to any known methods. For example, for production of preformed non-silicone hydrogel contact lenses, a non-silicone hydrogel lens formulation for cast-molding or spin-cast molding or for making rods used in lathe-cutting of contact lenses typically is: either (1) a monomer mixture comprising (a) at least one hydrophilic vinylic monomer (e.g., hydroxyethyl methacrylate, glycerol methacrylate, N-vinylpyrrolidone, or combinations thereof) and (b) at least one component selected from the group consisting of a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a high-energy-violet-light ("HEVL") absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof; or (2) an aqueous solution comprising one or more water-soluble prepolymers and at least one component selected from the group consisting of hydrophilic vinylic monomer, a crosslinking agent, a hydrophobic vinylic monomer, a lubricating agent (or so-called internal wetting agents incorporated in a lens formulation), a free-radical initiator (photoinitiator or thermal initiator), a UV-absorbing vinylic monomer, a HEVL absorbing vinylic monomer, a visibility tinting agent (e.g., reactive dyes, polymerizable dyes, pigments, or mixtures thereof), antimicrobial agents (e.g., preferably silver nanoparticles), a bioactive agent, and combinations thereof. Resultant preformed hydrogel contact lenses then can be subjected to extraction with an extraction solvent to remove unpolymerized components from the resultant lenses and to hydration process, as known by a person skilled in the art. It is understood that a lubricating agent present in a hydrogel lens formulation can improve the lubricity of preformed hydrogel contact lenses compared to the lubricity of control preformed hydrogel contact lenses obtained from a control hydrogel lens formulation without the lubricating agent.

Preferred examples of water-soluble prepolymers include without limitation: a water-soluble crosslinkable poly(vinyl alcohol) prepolymer described in U.S. Pat. Nos. 5,583,163 and 6,303,687

Numerous non-silicone hydrogel lens formulations have been described in numerous patents and patent applications published by the filing date of this application and have been used in producing commercial non-silicone hydrogel contact lenses. Examples of commercial non-silicone hydrogel contact lenses include, without limitation, alfafilcon A, acofilcon A, deltafilcon A, etafilcon A, focofilcon A, helfilcon A, helfilcon B, hilafilcon B, hioxifilcon A, hioxifilcon B, hioxifilcon D, methafilcon A, methafilcon B, nelfilcon A, nesofilcon A, ocufilcon A, ocufilcon B, ocufilcon C, ocufilcon D, omafilcon A, phemfilcon A, polymacon, samfilcon A, telfilcon A, tetrafilcon A, and vifilcon A.

In a preferred embodiment, the lens bulk material is composed of a non-silicone hydrogel material which comprises at least 50% by mole of repeating units of at least one hydroxyl-containing vinylic monomer, preferably selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof, more preferably selected from the group consisting of hydroxyethyl (meth)acrylate, glycerol (meth)acrylate, and vinyl alcohol. The mole percentages of repeating units can be calculated based on a non-silicone hydrogel lens formulation for making the non-silicone hydrogel contact lens.

In another preferred embodiment, a preformed contact lens is a silicone hydrogel contact lens comprising a silicone hydrogel material as lens bulk material.

Preformed silicone hydrogel contact lenses can be any commercially-available silicone hydrogel contact lenses or can be produced according to any known methods. For example, for production of preformed silicone hydrogel (SiHy) contact lenses, a SiHy lens formulation for cast-molding or spin-cast molding or for making SiHy rods used in lathe-cutting of contact lenses generally comprises at least one components selected from the group consisting of a silicone-containing vinylic monomer, a polysiloxane vinylic crosslinker, a silicone-containing prepolymer, a hydrophilic vinylic monomer, a hydrophobic vinylic monomer, a non-silicone vinylic crosslinker, a free-radical initiator (photoinitiator or thermal initiator), a silicone-containing prepolymer, and combination thereof, as well known to a person skilled in the art. Resultant preformed SiHy contact lenses then can be subjected to extraction with an extraction solvent to remove unpolymerized components from the resultant lenses and to hydration process, as known by a person skilled in the art. In addition, a preformed SiHy contact lens can be a colored contact lens (i.e., a SiHy contact lens having at least one colored patterns printed thereon as well known to a person skilled in the art).

In accordance with the invention, a silicone-containing vinylic monomer can be any silicone-containing vinylic monomer known to a person skilled in the art. Examples of preferred silicone-containing vinylic monomers include without limitation vinylic monomers each having a bis (trialkylsilyloxy)alkylsilyl group or a tris(trialkylsilyloxy) silyl group, polysiloxane vinylic monomers, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

Preferred polysiloxanes vinylic monomers including those of formula (M1) are described later in this application and can be obtained from commercial suppliers (e.g., Shin-Etsu, Gelest, etc.); prepared according to procedures described in patents, e.g., U.S. Pat. Nos. 5,070,215, 6,166,236, 6,867,245, 8,415,405, 8,475,529, 8,614,261, and 9,217,813; prepared by reacting a hydroxyalkyl (meth)acrylate or (meth)acrylamide or a (meth)acryloxypolyethylene glycol with a mono-epoxypropyloxypropyl-terminated polydimethylsiloxane; prepared by reacting glycidyl (meth)acrylate with a mono-carbinol-terminated polydimethylsiloxane, a mono-aminopropyl-terminated polydimethylsiloxane, or a mono-ethylaminopropyl-terminated polydimethylsiloxane; or prepared by reacting isocyanatoethyl (meth)acrylate with a mono-carbinol-terminated polydimethylsiloxane according to coupling reactions well known to a person skilled in the art.

Preferred silicone-containing vinylic monomers each having a bis(trialkylsilyloxy)alkylsilyl group or a tris(trialkylsilyloxy)silyl group, including those of formula (M2), are described later in this application and can be obtained from commercial suppliers (e.g., Shin-Etsu, Gelest, etc.) or can be prepared according to procedures described in U.S. Pat. Nos. 5,070,215, 6,166,236, 7,214,809, 8,475,529, 8,658,748, 9,097,840, 9,103,965, and 9,475,827.

Any suitable polysiloxane vinylic crosslinkers can be used in the invention. Examples of preferred polysiloxane vinylic crosslinkers are di-(meth)acryloyl-terminated polydimethylsiloxanes; di-vinyl carbonate-terminated polydimethylsiloxanes; di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane; polysiloxane-containing macromer selected from the group consisting of Macromer A, Macromer B, Macromer C, and Macromer D described in U.S. Pat. No. 5,760,100; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5,039,761, 5,346,946, 5,358,995, 5,387,632, 5,416,132, 5,451,617, 5,486,579, 5,962,548, 5,981,675, 6,039,913, and 6,762,264; polysiloxane-containing macromers disclosed in U.S. Pat. Nos. 4,259,467, 4,260,725, and 4,261,875.

One class of preferred polysiloxane vinylic crosslinkers are di-(meth)acryloyloxy-terminated polysiloxane vinylic crosslinkers each having dimethylsiloxane units and hydrophilized siloxane units each having one methyl substituent and one monovalent $C_4$-$C_{40}$ organic radical substituent having 2 to 6 hydroxyl groups, more preferably a polysiloxane vinylic crosslinker of formula (I), are described later in this application and can be prepared according to the procedures disclosed in U.S. patent Ser. No. 10/081,697.

Another class of preferred polysiloxane vinylic crosslinkers are vinylic crosslinkers of formula (1), which are described later in this application and can be obtained from commercial suppliers; prepared by reacting glycidyl (meth)acrylate (meth)acryloyl chloride with a di-amino-terminated polydimethylsiloxane or a di-hydroxyl-terminated polydimethylsiloxane; prepared by reacting isocyanatoethyl (meth)acrylate with di-hydroxyl-terminated polydimethylsiloxanes prepared by reacting an amino-containing acrylic monomer with di-carboxyl-terminated polydimethylsiloxane in the presence of a coupling agent (a carbodiimide); prepared by reacting a carboxyl-containing acrylic monomer with di-amino-terminated polydimethylsiloxane in the presence of a coupling agent (a carbodiimide); or prepared by reacting a hydroxyl-containing acrylic monomer with a di-hydroxy-terminated polydisiloxane in the presence of a diisocyanate or di-epoxy coupling agent.

Other classes of preferred polysiloxane vinylic crosslinkers are chain-extended polysiloxane vinylic crosslinkers of any one of formula (2) to (7), which are described later in this application and can be prepared according to the procedures described in U.S. Pat. Nos. 5,034,461, 5,416,132, 5,449,729, 5,760,100, 7,423,074, 8,529,057, 8,835,525, 8,993,651, and 10,301,451 and in U.S. Pat. App. Pub. No. 2018-0100038 A1.

Any hydrophilic vinylic monomers can be used in the invention. Examples of preferred hydrophilic vinylic monomers are alkyl (meth)acrylamides (as described later in this application), hydroxyl-containing acrylic monomers (as described below), amino-containing acrylic monomers (as described later in this application), carboxyl-containing acrylic monomers (as described later in this application), N-vinyl amide monomers (as described later in this application), methylene-containing pyrrolidone monomers (i.e., pyrrolidone derivatives each having a methylene group connected to the pyrrolidone ring at 3- or 5-position) (as described later in this application), acrylic monomers having a $C_1$-$C_4$ alkoxyethoxy group (as described later in this application), vinyl ether monomers (as described later in this application), allyl ether monomers (as described later in this application), phosphorylcholine-containing vinylic monomers (as described later in this application), N-2-hydroxyethyl vinyl carbamate, N-carboxyvinyl-β-alanine (VINAL), N-carboxyvinyl-α-alanine, and combinations thereof.

In accordance with the invention, any hydrophobic vinylic monomers can be in this invention. Examples of preferred hydrophobic vinylic monomers include methyl (meth)acrylate, ethyl (meth)acrylate, propyl (meth)acrylate, isopropyl (meth)acrylate, cyclohexyl (meth)acrylate, 2-ethylhexyl (meth)acrylate, vinyl acetate, vinyl propionate, vinyl butyrate, vinyl valerate, styrene, chloroprene, vinyl chloride, vinylidene chloride, (meth)acrylonitrile, 1-butene, butadiene, vinyl toluene, vinyl ethyl ether, perfluorohexylethyl-thio-carbonyl-aminoethyl-methacrylate, isobornyl (meth)

acrylate, trifluoroethyl (meth)acrylate, hexafluoro-isopropyl (meth)acrylate, hexafluorobutyl (meth)acrylate, and combinations thereof.

In accordance with the invention, any non-silicone vinylic crosslinkers can be in this invention. Examples of preferred non-silicone vinylic cross-linking agents are described later in this application.

Any thermal polymerization initiators can be used in the invention. Suitable thermal polymerization initiators are known to the skilled artisan and comprise, for example peroxides, hydroperoxides, azo-bis(alkyl- or cycloalkylnitriles), persulfates, percarbonates, or mixtures thereof. Examples of preferred thermal polymerization initiators include without limitation benzoyl peroxide, t-butyl peroxide, t-amyl peroxybenzoate, 2,2-bis(tert-butylperoxy)butane, 1,1-bis(tert-butylperoxy)cyclohexane, 2,5-Bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, di-t-butyl-diperoxyphthalate, t-butyl hydro-peroxide, t-butyl peracetate, t-butyl peroxybenzoate, t-butylperoxy isopropyl carbonate, acetyl peroxide, lauroyl peroxide, decanoyl peroxide, dicetyl peroxydicarbonate, di(4-t-butylcyclohexyl) peroxy dicarbonate (Perkadox 16S), di(2-ethylhexyl)peroxy dicarbonate, t-butylperoxy pivalate (Lupersol 11); t-butylperoxy-2-ethylhexanoate (Trigonox 21-C50), 2,4-pentanedione peroxide, dicumyl peroxide, peracetic acid, potassium persulfate, sodium persulfate, ammonium persulfate, 2,2'-azobis(4-methoxy-2,4-dimethylvaleronitrile) (VAZO 33), 2,2'-Azobis[2-(2-imidazolin-2-yl)propane]dihydrochloride (VAZO 44), 2,2'-azobis(2-amidinopropane) dihydrochloride (VAZO 50), 2,2'-azobis(2,4-dimethylvaleronitrile) (VAZO 52), 2,2'-azobis(isobutyronitrile) (VAZO 64 or AIBN), 2,2'-azobis-2-methylbutyronitrile (VAZO 67), 1,1-azobis(1-cyclohexanecarbonitrile) (VAZO 88); 2,2'-azobis (2-cyclopropylpropionitrile), 2,2'-azobis(methylisobutyrate), 4,4'-Azobis(4-cyanovaleric acid), and combinations thereof. Preferably, the thermal initiator is 2,2'-azobis(isobutyronitrile) (AIBN or VAZO 64).

Suitable photoinitiators are benzoin methyl ether, diethoxyacetophenone, a benzoylphosphine oxide, 1-hydroxycyclohexyl phenyl ketone and Darocur and Irgacur types, preferably Darocur 11730 and Darocur 29599, Germanium-based Norrish Type I photoinitiators (e.g., those described in U.S. Pat. No. 7,605,190). Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide.

Reactive photoinitiators which can be incorporated, for example, into a macromer or can be used as a special monomer are also suitable. Examples of reactive photoinitiators are those disclosed in EP 632329.

A SiHy contact lens formulation can also comprise other necessary components known to a person skilled in the art, such as, for example, a UV-absorbing vinylic monomer, a HEVL-absorbing vinylic monomer, a visibility tinting agent (e.g., reactive dyes, polymerizable dyes, pigments, or mixtures thereof, as well known to a person skilled in the art), antimicrobial agents (e.g., preferably silver nanoparticles), a bioactive agent, leachable lubricants (e.g., non-polymerizable hydrophilic polymers, etc.), leachable tear-stabilizing agents (e.g., phospholipids, monoglycerides, diglycerides, triglycerides, glycolipids, glyceroglycolipids, sphingolipids, sphingo-glycolipids, etc.), and mixtures thereof, as known to a person skilled in the art.

A polymerizable composition (SiHy lens formulation) can be a solventless clear liquid prepared by mixing all polymerizable components and other necessary component or a solution prepared by dissolving all of the desirable components in any suitable solvent, such as, a mixture of water and one or more organic solvents miscible with water, an organic solvent, or a mixture of one or more organic solvents, as known to a person skilled in the art. The term "solvent" refers to a chemical that cannot participate in free-radical polymerization reaction.

A solventless lens SiHy lens formulation typically comprises at least one blending vinylic monomer as a reactive solvent for dissolving all other polymerizable components of the solventless SiHy lens formulation. Examples of preferred blending vinylic monomers are described later in this application. Preferably, methyl methacrylate is used as a blending vinylic monomer in preparing a solventless SiHy lens formulation.

Any solvents can be used in the invention. Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-pyrrolidone, N,N-dimethylpropionamide, dimethyl formamide, dimethyl acetamide, dimethyl propionamide, N-methyl pyrrolidinone, and mixtures thereof.

Numerous SiHy lens formulations have been described in numerous patents and patent applications published by the filing date of this application and have been used in producing commercial SiHy contact lenses. Examples of commercial SiHy contact lenses include, without limitation, asmofilcon A, balafilcon A, comfilcon A, delefilcon A, efrofilcon A, enfilcon A, fanfilcon A, galyfilcon A, lotrafilcon A, lotrafilcon B, narafilcon A, narafilcon B, senofilcon A, senofilcon B, senofilcon C, smafilcon A, somofilcon A, and stenfilcon A.

A SiHy lens formulation (i.e., polymerizable composition) can be cured (polymerized) thermally or actinically as known to a person skilled in the art, preferably in molds for cast molding of contact lenses.

The thermal polymerization is carried out conveniently, for example at a temperature of from 25 to 120° C. and preferably 40 to 100° C. The reaction time may vary within wide limits, but is conveniently, for example, from 1 to 24 hours or preferably from 2 to 12 hours. It is advantageous to previously degas the components and solvents used in the polymerization reaction and to carry out said copolymerization reaction under an inert atmosphere, for example under a nitrogen or argon atmosphere.

The actinic polymerization can then be triggered off by actinic radiation, for example light, in particular UV light or visible light of a suitable wavelength. The spectral requirements can be controlled accordingly, if appropriate, by addition of suitable photosensitizers.

In accordance with the invention, a lens formulation can be introduced (dispensed) into a cavity formed by a mold according to any known methods.

After the lens formulation is dispensed into the mold, it is polymerized to produce a contact lens. Polymerization may be initiated thermally or actinically, preferably by exposing the lens formulation in the mold to a spatial limitation of actinic radiation to crosslink the polymerizable components in the lens formulation.

Opening of the mold so that the molded article can be removed from the mold may take place in a manner known per se.

The molded contact lens can be subject to lens extraction to remove unpolymerized polymerizable components. The extraction solvent can be any solvent known to a person skilled in the art. Examples of suitable extraction solvent are those described above.

In accordance with the invention, the silicone hydrogel material as the lens bulk material has an oxygen permeability of from about 50 (preferably about 60, more preferably about 70, even more preferably about 90 barrers, most preferably at least about 100 barrers) to about 180 barrers. The silicone hydrogel material can also have an equilibrium water content of from about 10% (preferably about 20%, more preferably 30%; even more preferably about 40%) to about 80% by weight. The silicone hydrogel material can further have a bulk elastic modulus (i.e., bulk Young Modulus) of from about 0.3 MPa to about 1.8 MPa, preferably from 0.4 MPa to about 1.5 MPa, more preferably from about 0.4 MPa to about 1.2 MPa. The oxygen permeability, elastic modulus and water content of the silicone hydrogel material of a contact lens of the invention can be determined by measuring the oxygen permeability, the elastic modulus and water content of the preformed contact lens. A person skilled in the art knows well how to determine the elastic modulus and equilibrium water content of a silicone hydrogel material or a SiHy contact lens. For example, all commercial SiHy contact lenses have reported values of oxygen permeability, elastic modulus and water content.

A contact lens of the invention can be obtained according to any method known to a person skilled in the art or to be developed.

In accordance with the invention, a contact lens precursor is a preformed contact lens that either inherently comprises or has been modified to comprise first reactive functional groups on and/or near its surface.

Where a preformed contact lens inherently comprises first reactive functional groups on and/or near its surfaces, it is obtained by polymerizing a polymerizable composition (i.e., a non-silicone hydrogel lens formulation or a silicone hydrogel lens formulation) comprising a vinylic monomer which further comprises at least one first reactive functional group, e.g., selected from the group consisting of carboxyl group, amino group, azetidinium group, epoxide group, aziridine group, and combinations thereof. Examples of carboxyl-containing vinylic monomers, amino-containing vinylic monomers, azetidinium-containing vinylic monomers, epoxy-containing vinylic monomers, and aziridine-containing vinylic monomers are known in the art and can be obtained from commercial sources or prepared according to known procedures. The lens formulation comprises preferably from about 0.1% to about 10%, more preferably from about 0.25% to about 7%, even more preferably from about 0.5% to about 5%, most preferably from about 0.75% to about 3%, by weight of such a vinylic monomer having at least one first reactive functional group.

Where a preformed contact lens inherently comprises amino groups on and/or near its surfaces, it can be modified chemically by reacting it with a divinylsulfone compound according to Thiol Michael Addition reaction to covalently attach vinylsulfone groups through the amino groups, or by reacting it with a thiolactone to covalently attach thiol groups through the amino groups.

Examples of preferred divinylsulfone compounds include without limitation divinylsulfone, bis(vinylsulfonyl) $C_1$-$C_6$ alkane, 1,3-bis(vinylsulfonyl)-2-propanol, 1,1-bis(vinylsulfonyl)-1-propanol, 1,5-bis(vinylsulfonyl)-3-pentanol, 1,1-bis(vinylsulfonyl)-3-methoxypropane, 1,5-bis(vinylsulfonyl)-2,4-dimethylbenzene, and 1,4-bis(vinylsulfonyl)-2,3,5,6-tetrafluorobenzene.

Examples of preferred commercially-available thiolactone include without limitation 4-butyrothiolactone (or dihydro-2(3H)-thiophenone), 3-methyldihydro-2(3H)-thiophenone, 3-ethyldihydro-2(3H)-thiophenone, 3-(1-methylethyl)dihydro-2(3H)-thiophenone, 3,3-dimethyldihydro-2(3H)-thiophenone, 3-ethyl-3-methyldihydro-2(3H)-thiophenone, 3-acetyldihydro-2(3H)-thiophenone, N-acetyl homocysteine thiolactone, N-propionyl homocysteine thiolactone, N-butyryl homocysteine thiolactone, and N-carboxybutyryl homocysteine thiolactone (or 4-oxo-4-[(tetrahydro-2-oxo-3-thienyl)amino]-butanoic acid).

A preformed contact lens can also be subjected either to a surface treatment to have first reactive functional groups on and/or near its surfaces. Any suitable surface treatments can be used in the invention. Examples of surface treatments include: without limitation, plasma treatments; chemical treatments; chemical vapor depositions; the grafting (covalently attaching) of compounds having at least one reactive functional groups onto the surface (modified or unmodified) of an article; the graft-polymerization of vinylic monomers having at least one first reactive functional group onto the surface (modified or unmodified) of an article; layer-by-layer ("LbL") deposition of one or more hydrophilic materials having first reactive functional groups on the surface (modified or unmodified) of an article (i.e., a process for forming an LbL coating); covalently attachment of one or more hydrophilic polymeric material shaving first reactive functional groups onto the surface (modified or unmodified) of an article; or combinations thereof.

A plasma treatment refers to a process in which a contact lens is exposed to a plasma to chemically modify the surface of the contact lens. The term "plasma" denotes an ionized gas (e.g., created by electric glow discharge which may be composed of electrons, ions of either polarity, gas atoms and molecules in the ground or any higher state of any form of excitation, as well as of photons). The excited species interact with solid surfaces of an article placed in the plasma, resulting in the chemical and physical modification of the material surface. Where a plasma is generated by subjecting a gas in a vacuum chamber to an electric charge typically at radio frequency (rf) (or at a microwave or other frequency), it is often called "low temperature plasma". Where a plasma is generated by an atmospheric discharge (e.g., arc discharge) and sustained at a surrounding atmospheric pressure, it is a "high temperature plasma" or "atmospheric plasma". An atmospheric plasma can be produced by atmospheric pressure discharges.

For a review of plasma treatment and its uses reference is made to R. Hartmann "Plasma polymerisation: Grundlagen, Technik und Anwendung, Jahrb. Oberflächentechnik (1993) 49, pp. 283-296, Battelle-Inst. e.V. Frankfurt/Main Germany; H. Yasuda, "Glow Discharge Polymerization", Journal of Polymer Science: Macromolecular Reviews, vol. 16 (1981), pp. 199-293; H. Yasuda, "Plasma Polymerization", Academic Press, Inc. (1985); Frank Jansen, "Plasma Deposition Processes", in "Plasma Deposited Thin Films", ed. by T. Mort and F. Jansen, CRC Press Boca Raton (19); O. Auciello et al. (ed.) "Plasma-Surface Interactions and Processing of Materials" publ. by Kluwer Academic Publishers in NATO ASI Series; Series E: Applied Sciences, vol. 176 (1990), pp. 377-399; and N. Dilsiz and G. Akovali "Plasma Polymerization of Selected Organic Compounds", Polymer, vol. 37 (1996) pp. 333-341.

The known plasma treatment under low pressure includes plasma deposition, plasma-induced polymerization, plasma grafting, plasma oxidation, and the likes. Plasma treatment under low pressure haven been used in commercial products, for example, such as, Focus NIGHT & DAY® and AIR OPTIX® (Alcon), and PUREVISION® (Bausch & Lomb). Advantages of a plasma coating, such as, e.g., those may be found with Focus NIGHT & DAY®, are its durability, relatively high hydrophilicity/wettability), and low susceptibility to lipid and protein deposition and adsorption. Examples of plasma treatment are those disclosed in U.S. Pat. Nos. 4,143,949; 4,312,575; 5,464,667; 6,881,269; and 7,078,074 (herein incorporated by references in their entireties). It is understood that a preformed contact lenses must typically be dried before a plasma treatment under low pressure.

A person skilled in the art understand well that a plasma (i.e., electrical glow discharge plasma) is a partially ionized gas which consists of large concentrations of excited atomic, molecular, ionic, and free-radical species and which is generated subjecting a gas in a vacuum chamber to an electric field, typically at radio frequency (rf) (or at a microwave or other frequency).

As an illustrated example of plasma treatment under low pressure of silicone hydrogel contact lenses, one or more preformed silicone hydrogel contact lenses are placed in a reactor chamber between opposing electrodes. The chamber is then sealed and depressurized by a vacuum system. Significant time is required to pump the system to the operative pressure.

When a suitable pressure is achieved in the chamber, a process gas is introduced into the chamber interior, and the electrodes are energized. The resulting plasma cloud may apply a thin layer of polymer (or a polymer coating) to the lens and/or change the chemical composition of a top layer of the lens surface depending upon the process gas used. After an appropriate time, the electrodes are de-energized, and the reactor chamber is brought back to atmospheric pressure so that the lenses may be removed.

Low pressure plasma treatment systems are known to a person skilled in the art and have been disclosed in patents and articles. For example, Peng Ho and Yasuda describe, in their paper ("Ultrathin Coating Of Plasma Polymer Of Methane Applied On The Surface Of Silicone Contact Lenses," Journal of Biomedical Materials Research, Vol. 22, 919-937 (1988), herein incorporated by reference in its entirety), a batch low-pressure-plasma treatment system (or a rotary plasma system) including a bell-shaped vacuum chamber in which opposing aluminum electrodes are disposed and a rotatable aluminum plate sits between the electrodes and is driven by an induction motor within the system. Matsuzawa and Winterton disclose in U.S. Pat. No. 6,881,269 (herein incorporated by reference in its entirety) a linear low-pressure-plasma system.

In accordance with the invention, the preformed contact lens in a dried state is treated with a low-pressure plasma generated in a plasma gas (i.e., an atmosphere) compose of air, $N_2$, $O_2$, $CO_2$, or a mixture of a $C_1$-$C_6$ hydrocarbon and a secondary gas selected from the group consisting of air, $N_2$, $O_2$, $CO_2$, and combinations thereof (preferably $CO_2$ or a mixture of a $C_1$-$C_4$ hydrocarbon and a secondary gas selected from the group consisting of air, $CO_2$, $N_2$, and combinations thereof, more preferably $CO_2$ or a mixture of methane and a secondary gas selected from the group consisting of air, $CO_2$, $N_2$, and combinations thereof, even more preferably $CO_2$ or a mixture of methane and $CO_2$).

Atmospheric plasma surface treatment disclosed in U.S. Pat. No. 9,156,213 (herein incorporated by reference in its entirety) is preferably used in the invention. For the atmospheric plasma surface treatment, contact lenses can be in a fully hydrated state.

A person skilled in the art knows well how to graft (covalently attach) a compound having at least one first reactive functional group (carboxyl group, amino group, azetidinium group, epoxide group, aziridine group, vinylsulfone group, thiol group, and combinations thereof) onto a surface of a contact lens according to known coupling reactions.

"LbL coating", as used herein, refers to a coating that is not covalently attached to the polymer matrix of a contact lens and is obtained through a layer-by-layer ("LbL") deposition of one or more polymeric materials on the lens. An LbL coating can be composed of one or more layers. LbL coatings on contact lenses can be obtained according to methods described in U.S. Pat. Nos. 6,451,871, 6,719,929, 6,793,973, 6,811,805, 6,896,926, 8,044,112, 8,158,192, and 8,147,897. Preferably, an LbL coating comprises at least one layer of one or more polyanionic polymers each comprising carboxyl groups and optionally polyanionic polymers chemically modified to contain first reactive functional groups other than carboxyl groups. The polyanionic polymer is preferably a polyanionic polymer selected from the group consisting of polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), and a mixture thereof, more preferably a polyanionic polymer which is polyacrylic acid, polymethacrylic acid, poly(acrylic acid-co-methacrylic acid), or a mixture thereof. A person knows well to chemically modify a polyanionic polymer by reacting it with a compound having at least one first reactive functional group other than carboxyl group.

An LbL coating of a polyanionic polymer having carboxyl groups can be form on a contact lens by contacting the contact lens with a solution of the polymer. Contacting of a contact lens with a coating solution of a polymer can occur by dipping it into the coating solution or by spraying it with the coating solution. One contacting process involves solely dipping the contact lens in a bath of a coating solution for a period of time or alternatively dipping the contact lens sequentially in a series of bath of coating solutions for a fixed shorter time period for each bath. Another contacting process involves solely spray a coating solution. However, a number of alternatives involve various combinations of spraying- and dipping-steps may be designed by a person having ordinary skill in the art. The contacting time of a contact lens with a coating solution of a reactive polymer may last up to about 10 minutes, preferably from about 5 to about 360 seconds, more preferably from about 5 to about 250 seconds, even more preferably from about 5 to about 200 seconds.

A solution of a polyanionic polymer for forming a coating on contact lenses can be prepared by dissolving one or more polymers in water, a mixture of water and an organic solvent miscible with water, an organic solvent, or a mixture of one or more organic solvent. Preferably, the polymer is dissolved in a mixture of water and one or more organic solvents, an organic solvent, or a mixture of one or more organic solvent. It is believed that a solvent system containing at least one organic solvent can swell a contact lens so that a portion of the reactive polymer may penetrate into the contact lens and increase the durability of the coating. Examples of organic solvents are described above. The pH of the polyanionic polymer solution is preferably from about 1.5 to about 4.0 to form a relatively-thick and stable LbL coating. The temperature of the coating solution is preferably from about 20° C. to about 70° C.

A person skilled in the art knows how to covalently attach one or more polymers having first reactive functional groups onto the surface of a contact lens. Exemplary methods for covalently attaching one or more hydrophilic polymers onto a medical device are disclosed in U.S. Pat. Nos. 5,599,576, 5,766,158, 6,087,415, 6,096,726, 6,340,465, 6,440,571, 6,500,481, 6,534,559, 6,623,747, 6,683,062, 6,838,491, 6,866,936, 6,923,978, and 8,529,057 and in U.S. Pat. Appl. Pub. Nos. 2009-0145086A1, 2009-0145091A1, 2008-0142038A1, and 2007-0122540A1.

Graft-polymerization of one more vinylic monomers having at least one first reactive functional group (e.g., carboxyl, amino, azetidinium group, epoxide group, aziridine group, and combinations thereof) in the presence or absence of a vinylic crosslinking agent to form a hydrophilic polymer coating are described in numerous patents, for example, in U.S. Pat. Nos. 6,099,122, 6,436,481, 6,440,571, 6,447,920, 6,465,056, 6,521,352, 6,586,038, 6,730,366, 6,734,321, 6,835,410, and 6,878,399 and in JP2001075060. For example, a preformed contact lens in dry state is first subjected to a plasma treatment in a plasma atmosphere of a compound having at least one reactive functional group (e.g., a vinylic monomer having a primary or secondary amino group, a carboxyl group, an epoxy group, an azlactone group, an aziridine group, or an isocyanate group) to form a plasma coating having reactive functional groups. The plasma-treated contact lens is reacted with a compound having a free-radical initiator moiety (e.g., a thermal initiator or a photoinitiator) or preferably a living polymerization initiator moiety (e.g., an atom transfer radical polymerization (ATRP) initiator or a reversible addition fragmentation chain transfer polymerization (RAFT) initiator) and a functional group co-reactive with the functional groups of the plasma coating on the contact lens in the presence or absence of a coupling agent under coupling reaction conditions known to a person skilled in the art. The obtained contact lens with free-radical initiator moieties thereon is immersed in a solution of one or more vinylic monomers having at least one first functional group and subject to conditions to initiate free radical polymerization of those vinylic monomers so as to form a layer of a graft-from polymer comprising first reactive functional groups.

In accordance with the invention, any pH-buffering system can be used in the invention, so long as its buffering agents are physiologically compatible and it can maintain the pH of an aqueous solution within a range from about 6.8 to about 7.5, preferably from about 6.8 to about 7.4, more preferably from about 6.9 to about 7.3. Physiologically compatible buffering agents have been widely used in contact lens packaging solutions and contact lens care compositions. Examples of such buffering agents include without limitation boric acid, borates (e.g. sodium borate, potassium borate), citric acid, citrates (e.g., monopotassium citrate, monosodium citrate; dipotassium citrate; disodium citrate; tripotassium citrate), phosphates (e.g. $NaH_2PO_4$, $KH_2PO_4$, $Na_2HPO_4$, $K_2HPO_4$, $Na_3HPO_4$, $K_3HPO_4$), TRIS (i.e., 2-amino-2-hydroxymethyl-1,3-propanediol), Bis-Tris [i.e., Bis-(2-hydroxyethyl)-imino-tris-(hydroxymethyl)-methane], Bis-Tris propane [i.e., 1,3-bis(tris(hydroxymethyl) methylamino)propane], bis-aminopolyols, triethanolamine, ACES [i.e., N-(2-hydroxyethyl)-2-aminoethanesulfonic acid], BES [i.e., N,N-Bis(2-hydroxyethyl)-2-aminoethanesulfonic acid], HEPES [i.e., 4-(2-hydroxyethyl)-1-piperazineethanesulfonic acid], MES [i.e., 2-(N-morpholino)ethanesulfonic acid], MOPS [i.e., 3-[N-morpholino]-propanesulfonic acid], PIPES [i.e., piperazine-N,N'-bis(2-ethanesulfonic acid], TES {i.e., N-[Tris(hydroxymethyl) methyl]-2-aminoethanesulfonic acid}, salts thereof, or mixtures thereof. The total concentration of all buffering agents present in the aqueous solution is from about 10 mM to 100 mM (preferably from about 10 mM to 90 mM, more preferably from about 10 mM to about 80 mM, even more preferably from about 10 mM to 70 mM).

In accordance, the totally concentration of all ions present in the aqueous solution is less than 241 mM (preferably less than 221 mM, more preferably less than 211 mM, even more preferably less than 201 mM), provided that the total concentration of all ions each having two or more charges in the aqueous solution is less than 80 mM (preferably less than 70 mM, more preferably less than 60 mM, even more preferably less than 50 mM). It is understood that the ions present in the aqueous solution can be derived the buffering agents and optionally salts added in the aqueous solution for adjusting pH and osmolality as well as other purposes.

In a preferred embodiment, the aqueous solution additionally includes one or more tonicity-adjusting agents which independently of one another can be ionic or non-ionic. Suitable occularly acceptable tonicity-adjusting agents include, but are not limited to sodium chloride, potassium chloride, glycerol, propylene glycol, polyols, mannitol, sorbitol, xylitol and mixtures thereof. Preferably, non-ionic tonicity-adjusting agents are used to adjust the osmolality of the aqueous solution to a value from about 200 to about 450 mOsm/Kg (preferably from about 230 to about 400 mOsm/Kg, more preferably from about 260 to about 350 mOsm/Kg).

In another preferred embodiment, the aqueous solution is a packaging solution for storing contact lenses each individually in a sealed and sterilized lens package, as well known to a person skilled in the art. In accordance with the invention, a packaging solution can contain one or more other ingredients known to a person skilled in the art. Examples of other ingredients include without limitation, surfactants, antibacterial agents, preservatives, and lubricants (e.g., cellulose derivatives, polyvinyl alcohol, polyvinyl pyrrolidone).

In a preferred embodiment, the aqueous solution (or packaging solution) comprises preferably from about 0.01% to about 2%, more preferably from about 0.05% to about 1.5%, even more preferably from about 0.1% to about 1%, most preferably from about 0.2% to about 0.5%, by weight of a hydrophilic polymeric material having second reactive functional groups.

In accordance with the invention, the hydrophilic polymeric material for forming the outer surface hydrogel layer or the outer anterior and posterior surface hydrogel layers (i.e., the crosslinked hydrophilic coating) comprises second reactive functional groups. Preferably, the hydrophilic polymeric material is a highly-branched hydrophilic polymeric material that comprises a three-dimensional network (i.e., polymer chains crosslinked by a limited amount of one or more crosslinkers so that the highly-branched hydrophilic polymeric material is soluble or dispersible in water) and second reactive functional groups.

One example of such a highly-branched hydrophilic polymeric material is a partial reaction product of at least one azetidinium-containing polymer having azetidinium groups with at least one hydrophilic polymer having carboxyl, primary amine, secondary amine, or thiol groups, according to the crosslinking reactions shown in Scheme I Scheme I

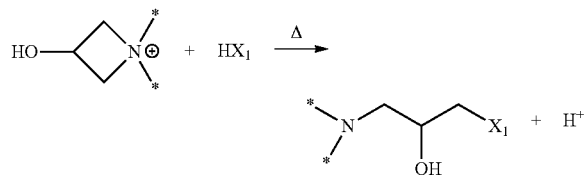

in which $X_1$ is —S—*, —OC(=O)—*, or —NR'—* in which R' is hydrogen or a $C_1$-$C_{20}$ unsubstituted or substituted alkyl group, and * represents an organic radical. The resultant highly-branched hydrophilic polymer comprise azetidinium groups and optionally carboxyl, primary amine, secondary amine, thiol groups, or combinations thereof.

Any suitable azetidinium-containing polymers can be used in the invention. Examples of azetidinium-containing polymers includes without limitation epichlorohydrin-functionalized polyamines, homopolymers of an azetidinium-containing vinylic monomer, copolymers of an azetidinium-containing vinylic monomer with one or more vinylic monomers.

Preferably, an azetidinium-containing polymer is an epichlorohydrin-functionalized polyamine. An epichlorohydrin-functionalized polyamine can be obtained by reacting epichlorohydrin with a polyamine polymer or a polymer containing secondary amino groups. For example, a poly (alkylene imines) or a poly(amidoamine) which is a polycondensate derived from a polyamine and a dicarboxylic acid (e.g., adipic acid-diethylenetriamine copolymers) can react with epichlorohydrin to form an epichlorohydrin-functionalized polymer; a homopolymer or copolymer of mono-alkylaminoalkyl (meth)acrylate or mono-alkylaminoalkyl (meth)acrylamide can also react with epichlorohydrin to form an epichlorohydrin-functionalized polyamine; a poly(2-oxazoline-co-ethyleneimine) copolymer can react with epichlorohydrin to form an epichlorohydrin-functionalized polyamine (i.e., a poly(2-oxazoline-co-ethyleneimine)-epichlorohydrin). The reaction conditions for epichlorohydrin-functionalization of a polyamine or polyamidoamine polymer are taught in EP1465931. A preferred epichlorohydrin-functionalized polyamine is polyamidoamine-epichlorohydrin (PAE) or a poly(2-oxazoline-co-ethyleneimine)-epichlorohydrin.

Polyamidoamine-epichlorohydrin is commercially available, such as, for example, Kymene® or Polycup® resins (epichlorohydrin-functionalized adipic acid-diethylenetriamine copolymers) from Hercules.

Poly(2-oxazoline-co-ethyleneimine)-epichlorohydrin can be prepared according to procedures described in U.S. Pat. Appl. Pub. No. US 2016/0061995 A1.

Vinyl polymers of an azetidinium-containing vinylic monomer and vinyl copolymers an azetidinium-containing vinylic monomer with one or more vinylic monomers can be obtained according to the procedures described in U.S. Pat. Appl. Pub. No. 2013/0337160A1.

Any suitable hydrophilic polymers can be used in the invention so long as they are ophthalmically compatible and contain at least one amino group, at least one carboxyl group, and/or at least one thiol group, preferably contain at least one carboxyl group, at least one thiol group, or combinations thereof.

Hydrophilic polymeric materials comprising azetidinium groups can be prepared according to the processes disclosed in U.S. Pat. Appli. Pub. Nos. US 2016/0061995 A1 and US2013/0337160 A1 and in U.S. Pat. No. 8,529,057.

Another example of such a highly-branched hydrophilic polymeric material is a partial reaction product of at least one polymer having epoxy groups with at least one hydrophilic polymer having carboxyl, primary amine, secondary amine, or thiol groups, according to the known coupling reactions. The resultant highly-branched hydrophilic polymer comprise epoxy groups and optionally carboxyl, primary amine, secondary amine, thiol groups, or combinations thereof. For example, a multiarmed polyethylene glycol with terminal epoxy groups can be partially reacted with a multiarmed polyethylene glycol with terminal thiol groups (or carboxyl or amino groups). Alternatively, a copolymer of an epoxy-containing vinylic monomer (i.e., a vinylic monomer having an epoxy group) with one or more hydrophilic vinylic monomer can be reacted with a hydrophilic polymer having thiol, carboxyl or amino groups. Such hydrophilic polymeric materials can be prepared according to the processes disclosed in U.S. Pat. No. 9,244,195.

Another example of such a highly-branched hydrophilic polymeric material is a partial reaction product of at least one polymer having aziridine groups (or azlactone groups) with at least one hydrophilic polymer having carboxyl, primary amine, secondary amine, or thiol groups, according to the known coupling reactions. The resultant highly-branched hydrophilic polymer comprise aziridine groups (or azlactone groups) and optionally carboxyl, primary amine, secondary amine, thiol groups, or combinations thereof. Examples of hydrophilic polymers comprising aziridine groups or azlactone groups includes copolymers of aziridine-containing vinylic monomers (i.e. a vinylic monomer having an aziridine group) or azlactone-containing vinylic monomer (i.e., a vinylic monomer having an azlactone group) with one or more hydrophilic vinylic monomers.

Another example of such a highly-branched hydrophilic polymeric material are partial reaction products of at least one polymer having vinylsulfone groups with at least one hydrophilic polymer having thiol groups, according to the known Michael Addition reactions. The resultant highly-branched hydrophilic polymer comprise vinylsulfone groups and/or thiol groups. Examples of hydrophilic polymers comprising vinylsulfone groups includes multiarmed polyethylene glycols having terminal sulfone groups, a polymer comprising monomeric units each having a thiol group and obtained by reacting a thiolactone with monomeric units each having an amino group (i.e., derived from an amino-containing vinylic monomers).

In accordance with the invention, the concentration ratio of a hydrophilicity-enhancing agent relative to an azetidinium-containing polymer in the aqueous reactive solution must be selected not to render a resultant water-soluble thermally-crosslinkable polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the azetidinium-containing polymer.

In accordance with the invention, the preformed contact lens with the first reactive functional groups thereon (i.e., the contact lens precursor) is heated in an aqueous solution which comprises a hydrophilic polymeric material having the second reactive functional groups, at a temperature of from about 50° C. to about 140° C. for a time period to crosslink the hydrophilic polymeric material while covalently attaching the crosslinked hydrophilic polymeric material onto the preformed contact lens so as to form a hydrogel coating on the surface of the preformed contact lens.

Preferably, the step of heating is performed by autoclaving the preformed contact lens with the first reactive functional groups thereon (i.e., the contact lens precursor) immersed in the aqueous solution which is a packaging solution (i.e., a buffered aqueous solution with a pH of from 6.7 to 7.6) in a sealed lens package at a temperature of from about 115° C. to about 125° C. for approximately 20-90 minutes. It is believed that during autoclave those azetidinium groups (or epoxy, aziridine or azlactone groups) which do not participate in crosslinking reaction may be hydrolyzed into 2,3-dihydroxypropyl ($HO-CH_2-CH(OH)-CH_2-$) groups (or hydroxyl, amino, or carboxyl groups) and that the azetidinium-containing polymeric material (or epoxy-, aziridine- or azlactone-containing polymeric material) present in the lens packaging solution, if applicable, can be converted to a non-reactive polymeric wetting agent capable of improving a lens's insert comfort. Consequently, the packaging solution is ophthalmically safe after autoclave.

Lens packages (or containers) are well known to a person skilled in the art for autoclaving and storing a contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with a preferred embodiment, the outer anterior and posterior surface hydrogel layers of a contact lens of the invention independent of each other comprise an equilibrium water content of at least 80% by weight, preferably at least 85% by weight, more preferably at least about 90% by weight, even more preferably at least 95% by weight.

In accordance with the invention, each of the outer anterior and posterior surface hydrogel layers is substantially free of silicone, preferably totally free of silicone.

The layered structure configuration of a coated contact lens of the invention can be established by analysis with atomic force microscopy (AFM) alone or in combination with a differential staining of the hydrogel coating or the lens bulk material, environmental scanning electron microscopy, confocal fluorescence microscopy, or any other known techniques of a cross section of a contact lens in fully hydrated state (i.e., directly in water or a buffered saline) as known to a person skilled in the art.

In accordance with the invention, a coated contact lens of the invention has at least one property selected from the group consisting of an equilibrium water content of from about 15% to about 70% (preferably from about 20% to about 65%, more preferably from about 20% to about 60%, even more preferably from about 25% to about 55%) by weight, an elastic modulus of from about 0.2 MPa to about 2.0 MPa (preferably from about 0.25 MPa to about 1.5 MPa, more preferably from about 0.3 MPa to about 1.2 MPa, even more preferably from about 0.35 MPa to about 1.0 MPa), an oxygen transmissibility of at least 40 barrers/mm (preferably at least 60 barrers/mm, more preferably at least 80 barrers/mm, even more preferably at least 100 barrers/mm), an averaged water contact angle of less than 90 degrees (preferably less than 80 degrees, more preferably less than 70 degrees, even more preferably less than 60 degrees), a UVB transmittance of about 10% or less (preferably about 5% or less, more preferably about 2.5% or less, even more preferably about 1% or less) between 280 and 315 nanometers, a UVA transmittance of about 30% or less (preferably about 20% or less, more preferably about 10% or less, even more preferably about 5% or less) between 315 and 380 nanometers, and a Violet transmittance of from 0% to about 70%, preferably from 5% to about 60%, more preferably from 5% to about 50%, even more preferably from about 5% to about 40% between 380 nm and 440 nm, and combination thereof.

Although various embodiments of the invention have been described using specific terms, devices, and methods, such description is for illustrative purposes only. The words used are words of description rather than of limitation. As would be obvious to one skilled in the art, many variations and modifications of the invention may be made by those skilled in the art without departing from the spirit and scope of the novel concepts of the disclosure. In addition, it should be understood that aspects of the various embodiments of the invention may be interchanged either in whole or in part or can be combined in any manner and/or used together, as illustrated below:

1. A method for making coated contact lenses, comprising the steps of:
   (1) obtaining a contact lens precursor which has a concave surface and an opposite convex surface and comprises a lens bulk material and first reactive functional groups on and/or near the anterior and posterior surfaces, wherein the first reactive functional groups are selected from the group consisting of carboxyl groups, amino groups, azetidinium groups, epoxide groups, aziridine groups, vinylsulfone groups, thiol groups, and combinations thereof;
   (2) immersing the contact lens precursor in an aqueous solution in a container, wherein the aqueous solution has a room temperature and comprises (a) at least one hydrophilic polymeric material and (b) a pH-buffering system for maintaining pH of the aqueous solution, wherein the pH-buffering system comprises at least two buffering agents, wherein the total concentration of all buffering agents present in the aqueous solution is from about 10 mM to 100 mM, wherein the aqueous solution has a room temperature and a pH of from about 6.8 to about 7.5, wherein the totally concentration of all ions present in the aqueous solution is less than 241 mM, provided that the total concentration of all ions each having two or more charges in the aqueous solution is less than 80 mM, wherein said at least one hydrophilic polymeric material comprises second reactive functional groups each of which is capable of reacting with one first reactive functional group at a temperature above the room temperature to form a covalent linkage, wherein the second reactive functional groups are selected from the group consisting of carboxyl groups, amino groups, azetidinium groups, epoxide groups, aziridine groups, thiol groups, and combinations thereof; and (3) heating the aqueous solution with the contact lens precursor therein to a crosslinking-temperature of from about 50° C. to about 140° C. and then maintaining the crosslinking temperature for at least about 20 minutes to form a coated contact lens having a hydrogel coating thereon.

2. The method of embodiment 1, wherein the contact lens precursor inherently comprises comprise first reactive functional groups on and/or near the anterior and posterior surfaces.

3. The method of embodiment 2, wherein the contact lens precursor is obtained by polymerizing a polymerizable composition comprising from about 0.1% to about 10% by weight of a vinylic monomer which further comprises at least one first reactive functional group.

4. The method of embodiment 2, wherein the contact lens precursor is obtained by polymerizing a polymerizable composition comprising from about 0.25% to about 7% by weight of a vinylic monomer which further comprises at least one first reactive functional group.

5. The method of embodiment 2, wherein the contact lens precursor is obtained by polymerizing a polymerizable composition comprising from about 0.5% to about 5% by weight of a vinylic monomer which further comprises at least one first reactive functional group.

6. The method of embodiment 2, wherein the contact lens precursor is obtained by polymerizing a polymerizable composition comprising from about 0.75% to about 3% by weight of a vinylic monomer which further comprises at least one first reactive functional group.

7. The method of any one of embodiments 1 to 6, wherein said at least one first reactive functional group is selected from the group consisting of carboxyl group, amino group, azetidinium group, epoxy group, aziridine group, and combinations thereof.

8. The method of embodiment 1, wherein the contact lens precursor is obtained by subjecting a preformed contact lens to a surface treatment to have the first reactive functional groups.

9. The method of embodiment 8, wherein the surface treatment comprises at least one process selected from the group consisting of a plasma treatment; a chemical treatment; a chemical vapor deposition; grafting (covalently attaching) of one or more compounds each having at least one first reactive functional groups onto the preformed contact lens; graft-polymerizing of one or more vinylic monomers having at least one first reactive functional group onto the preformed contact lens; layer-by-layer ("LbL") deposition of one or more polymeric materials having first reactive functional groups onto the preformed contact lens; covalently attaching of one or more polymeric materials having first reactive functional groups onto the preformed contact lens; and combinations thereof.

10. The method of embodiment 9, wherein the surface treatment comprises a plasma treatment.

11. The method of embodiment 9, wherein the surface treatment comprises grafting (covalently attaching) of one or more compounds each having at least one first reactive functional groups onto the preformed contact lens.

12. The method of embodiment 9, wherein the surface treatment comprises graft-polymerizing of one or more vinylic monomers having at least one first reactive functional group onto the preformed contact lens.

13. The method of embodiment 9, wherein the surface treatment comprises covalently attaching of one or more polymeric materials having first reactive functional groups onto the preformed contact lens.

14. The method of any one of embodiments 9 to 13, wherein the first reactive functional groups are carboxyl groups, amino groups, azetidinium groups, epoxy groups, aziridine groups, or combinations thereof.

15. The method of any one of embodiments 1 to 14, wherein the first reactive functional groups are carboxyl groups and/or amino, whereas the second reactive functional groups are azetidinium groups, epoxy groups, aziridine groups, or combinations thereof.

16. The method of any one of embodiments 1 to 14, wherein the first reactive functional groups are thiol groups whereas the second reactive functional groups are azetidinium groups, epoxy groups, aziridine groups, vinylsulfone groups, or combinations thereof.

17. The method of any one of embodiments 1 to 14, wherein the first reactive functional groups are azetidinium groups whereas the second reactive functional groups are carboxyl groups, amino groups, thiol groups, or combinations thereof.

18. The method of any one of embodiments 1 to 14, wherein the first reactive functional groups are epoxy groups whereas the second reactive functional groups are carboxyl groups, amino groups, thiol groups, or combinations thereof.

19. The method of any one of embodiments 1 to 14, wherein the first reactive functional groups are aziridine groups whereas the second reactive functional groups are carboxyl groups, amino groups, thiol groups, or combinations thereof.

20. The method of any one of embodiments 1 to 14, wherein the first reactive functional groups are vinylsulfone groups whereas the second reactive functional groups are thiol groups.

21. The method of any one of embodiments 1 to 14, wherein the first reactive functional groups are thiol groups whereas the second reactive functional groups are vinylsulfone groups.

22. The method of any one of embodiments 1 to 21, wherein the total concentration of all buffering agents present in the aqueous solution is from about 10 mM to 90 mM.

23. The method of any one of embodiments 1 to 21, wherein the total concentration of all buffering agents present in the aqueous solution is from about 10 mM to about 80 mM.

24. The method of any one of embodiments 1 to 21, wherein the total concentration of all buffering agents present in the aqueous solution is from about 10 mM to 70 mM.

25. The method of any one of embodiments 1 to 24, wherein the aqueous solution has a pH of from about 6.8 to about 7.4.
26. The method of any one of embodiments 1 to 24, wherein the aqueous solution has a pH of from about 6.9 to about 7.3.
27. Them method of any one of embodiments 1 to 26, wherein the totally concentration of all ions present in the aqueous solution is less than 221 mM.
28. Them method of any one of embodiments 1 to 26, wherein the totally concentration of all ions present in the aqueous solution is less than 211 mM.
29. Them method of any one of embodiments 1 to 26, wherein the totally concentration of all ions present in the aqueous solution is less than 201 mM.
30. The method of any one of embodiments 1 to 29, wherein the total concentration of all ions each having two or more charges in the aqueous solution is less than 70 mM.
31. The method of any one of embodiments 1 to 29, wherein the total concentration of all ions each having two or more charges in the aqueous solution is less than 60 mM.
32. The method of any one of embodiments 1 to 29, wherein the total concentration of all ions each having two or more charges in the aqueous solution is less than 50 mM.
33. The method of any one of embodiments 1 to 32, wherein the aqueous solution additionally includes one or more tonicity-adjusting agents which independently of one another is ionic or non-ionic non-ionic tonicity-adjusting agents and are used to adjust the osmolality of the aqueous solution to a value from about 200 to about 450 mOsm/Kg.
34. The method of any one of embodiments 1 to 32, wherein the aqueous solution additionally includes one or more tonicity-adjusting agents which independently of one another is ionic or non-ionic non-ionic tonicity-adjusting agents and are used to adjust the osmolality of the aqueous solution to a value from about 230 to about 400 mOsm/Kg.
35. The method of any one of embodiments 1 to 32, wherein the aqueous solution additionally includes one or more tonicity-adjusting agents which independently of one another is ionic or non-ionic non-ionic tonicity-adjusting agents and are used to adjust the osmolality of the aqueous solution to a value from about 260 to about 350 mOsm/Kg.
36. The method of any one of embodiments 1 to 32, wherein the aqueous solution additionally includes one or more non-ionic tonicity-adjusting agents that are used to adjust the osmolality of the aqueous solution to a value from about 200 to about 450 mOsm/Kg.
37. The method of any one of embodiments 1 to 32, wherein the aqueous solution additionally includes one or more non-ionic tonicity-adjusting agents are used to adjust the osmolality of the aqueous solution to a value from about 230 to about 400 mOsm/Kg.
38. The method of any one of embodiments 1 to 32, wherein the aqueous solution additionally includes one or more non-ionic tonicity-adjusting agents are used to adjust the osmolality of the aqueous solution to a value from about 260 to about 350 mOsm/Kg.
39. The method of any one of embodiments 36 to 38, wherein said one or more non-ionic tonicity-adjusting agents are glycerol, propylene glycol, polyols, mannitol, sorbitol, xylitol, or mixtures thereof.
40. The method of any one of embodiments 1 to 39, wherein said at least one hydrophilic polymeric material is a highly-branched hydrophilic polymeric material comprising the second reactive functional groups.
41. The method of embodiment 40, wherein the highly-branched hydrophilic polymeric material comprises vinylsulfone groups and is a partial reaction product of at least one vinylsulfone-containing polymer having vinylsulfone groups with at least one thiol-containing hydrophilic polymer having thiol groups.
42. The method of embodiment 41, wherein said at least one vinylsulfone-containing hydrophilic polymer is selected from the group consisting of a multiarmed polyethylene glycol having terminal vinylsulfone groups or a hydrophilic polymer comprising monomeric units each having a vinylsulfone group and obtained by reacting a divinylsulfone compound with an amino group of an amino-containing monomeric unit (i.e., derived from an amino-containing vinylic monomer), wherein the said at least one thiol-containing hydrophilic polymer is selected from the group consisting of a multiarmed polyethylene glycol having terminal thiol groups or a hydrophilic copolymer comprising thiol-containing monomeric units each having a thiol group and obtained by reacting a thiolactone with an amino group of an amino-containing monomeric unit (i.e., derived from an amino-containing vinylic monomer).
43. The method of embodiment 40, wherein the highly-branched hydrophilic polymeric material comprises epoxy groups and is a partial reaction product of at least one epoxy-containing hydrophilic polymer having epoxy groups with at least one amino-containing hydrophilic polymer having amino groups, at least one carboxyl-containing hydrophilic polymer having carboxyl groups, or at least one thiol-containing hydrophilic polymer having thiol groups.
44. The method of embodiment 43, wherein said at least one epoxy-containing hydrophilic polymer is selected from the group consisting of a multiarmed polyethylene glycol having terminal epoxy groups or a hydrophilic copolymer of an epoxy-containing vinylic monomer, wherein said at least one thiol-containing hydrophilic polymer is selected from the group consisting of a multiarmed polyethylene glycol having terminal thiol groups or a hydrophilic copolymer comprising thiol-containing monomeric units each having a thiol group and obtained by reacting a thiolactone with an amino group of an amino-containing monomeric unit (i.e., derived from an amino-containing vinylic monomer), wherein said at least one amino-containing hydrophilic polymer is a hydrophilic copolymer of an amino-containing vinylic monomer, wherein said at least one carboxyl-containing hydrophilic polymer is a hydrophilic copolymer of a carboxyl-containing vinylic monomer.
45. The method of embodiment 40, wherein the highly-branched hydrophilic polymeric material comprises aziridine groups and is a partial reaction product of at least one aziridine-containing hydrophilic polymer having aziridine groups with at least one amino-containing hydrophilic polymer having amino groups, at least one carboxyl-containing hydrophilic polymer having carboxyl groups, or at least one thiol-containing hydrophilic polymer having thiol groups.
46. The method of embodiment 45, wherein said at least one aziridine-containing hydrophilic polymer is a hydrophilic copolymer of an aziridine-containing vinylic monomer, wherein said at least one thiol-containing hydrophilic polymer is selected from the group consisting of a multiarmed polyethylene glycol having terminal thiol groups or a hydrophilic copolymer comprising thiol-containing monomeric units each having a thiol group and obtained by reacting a thiolactone with an amino group of an amino-containing monomeric unit (i.e., derived from an amino-containing vinylic monomer), wherein said at least one amino-containing hydrophilic polymer is a hydrophilic copolymer of an amino-containing vinylic monomer, wherein said at least one carboxyl-containing hydrophilic polymer is a hydrophilic copolymer of a carboxyl-containing vinylic monomer.

47. The method of embodiment 40, wherein the highly-branched hydrophilic polymeric material comprises azetidinium groups and is a partial reaction product of at least one azetidinium-containing polymer with at least one hydrophilicity-enhancing polymer having at least one carboxyl, primary amine, secondary amine, or thiol group.

48. The method of embodiment 47, wherein the thermally-crosslinkable hydrophilic polymeric material comprises:
   (i) from about 20% to about 95% by weight of first polymer chains derived from said at least one azetidinium-containing polymer,
   (ii) from about 5% to about 80% by weight of second polymer chains derived from said at least one hydrophilicity-enhancing polymer having at least one reactive functional group selected from the group consisting of amino group, carboxyl group, thiol group, and combination thereof (preferably carboxyl groups), wherein the second polymer chains are covalently attached to the first polymer chains through one or more covalent linkages each formed between one azetidinium group of the azetidinium-containing polymer and one amino, carboxyl or thiol group of the hydrophilicity-enhancing agent, and
   (iii) azetidinium groups which are parts of the first polymer chains or pendant or terminal groups covalently attached to the first polymer chains.

49. The method of embodiment 47 or 48, wherein said at least one azetidinium-containing polymer is a polyamidoamine-epichlorohydrin.

50. The method of embodiment 47 or 48, wherein said at least one azetidinium-containing polymer is poly(2-oxazoline-co-ethyleneimine)-epichlorohydrin.

51. The method of any one of embodiments 47 to 50, wherein the hydrophilicity-enhancing polymer is a primary amine-containing polysaccharide, a secondary amine-containing polysaccharide, a carboxyl-containing polysaccharide, hyaluronic acid, chondroitin sulfate, or a combination thereof.

52. The method of any one of embodiments 47 to 50, wherein the hydrophilicity-enhancing polymer is: a polyethylene glycol having one sole amino, carboxyl or thiol group; a polyethylene glycol with two terminal amino, carboxyl and/or thiol groups; a multi-arm polyethylene glycol with one or more amino, carboxyl and/or thiol groups; a polyethylene glycol dendrimer with one or more amino, carboxyl and/or thiol groups.

53. The method of any one of embodiments 47 to 50, wherein the hydrophilicity-enhancing polymer is a copolymer which is a polymerization product of a composition comprising (1) about 60% or less by weight of one or more reactive vinylic monomers and (2) one or more non-reactive hydrophilic vinylic monomers.

54. The method of embodiment 53, wherein said one or more reactive vinylic monomers are vinylic monomers having a carboxyl group (preferably are selected from the group consisting of acrylic acid, methacrylic acid, ethyl acrylic acid, N,N-2-acrylamidoglycolic acid, and combinations thereof).

55. The method of embodiment 53, wherein said one or more reactive vinylic monomers are vinylic monomers having an amino group (preferably are amino-$C_2$-$C_6$ alkyl (meth)acrylate, $C_1$-$C_6$ alkylamino-$C_2$-$C_6$ alkyl (meth)acrylate, allylamine, vinylamine, amino-$C_2$-$C_6$ alkyl (meth)acrylamide, $C_1$-$C_6$ alkylamino-$C_2$-$C_6$ alkyl (meth)acrylamide, and combinations thereof).

56. The method of any one of embodiments 53 to 55, wherein said one or more non-reactive vinylic monomers are selected from the group consisting of (meth)acrylamide, N,N-dimethyl (meth)acrylamide, N-vinylpyrrolidone (NVP), N-vinyl formamide, N-vinyl acetamide, N-vinyl isopropylamide, N-vinyl-N-methyl acetamide, N,N-dimethylaminoethyl (meth)acrylate, N,N-dimethylaminopropyl (meth)acrylamide, glycerol (meth)acrylate, 3-(meth)acryloylamino-1-propanol, N-hydroxyethyl (meth)acrylamide, N-hydroxypropyl (meth)acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, $C_1$-$C_4$-alkoxy polyethylene glycol (meth)acrylate having a weight average molecular weight of up to 1500 Daltons, allyl alcohol, vinyl alcohol, and combinations thereof (preferably from the group consisting of acrylamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a weight average molecular weight of up to 400 Daltons, vinyl alcohol, and combination thereof).

57. The method of any one of embodiments 53 to 55, wherein said one or more non-reactive vinylic monomers are phosphorylcholine-containing vinylic monomers (preferably methacryloyloxyethyl phosphorylcholine).

58. The method of any one of embodiments 53 to 57, wherein the composition comprises about 50% or less by weight (preferably from about 0.1% to about 30% by weight, more preferably from about 0.5% to about 20% by weight, even more preferably from about 1% to about 15% by weight) of said one or more reactive vinylic monomers.

59. The method of any one of embodiments 47 to 58, wherein the contact lens precursor has a base coating thereon, wherein the coating comprises a layer of a polyanionic polymer having carboxyl groups.

60. The method of embodiment 59, wherein the polyanionic polymer is polyacrylic acid, polymethacrylic acid, polyethylacrylic acid, poly(acrylic acid-co-methacrylic acid), poly(acrylic acid-co-ethacrylic acid), poly(methacrylic acid-co-ethacrylic acid), or a mixture thereof.

61. The method of any one of embodiments 1 to 60, where the first reactive functional groups are not vinylsulfone groups, the step of heating is performed by autoclaving the preformed contact lens with the first reactive functional groups thereon immersed in the aqueous solution which is a packaging solution in a sealed lens package at a temperature of from about 115° C. to about 125° C. for approximately 20-90 minutes.

62. A coated contact lens, comprising:
an anterior surface; an opposite posterior surface; and a layered structural configuration from the anterior surface to the posterior surface,
wherein the layered structural configuration comprises an outer anterior surface hydrogel layer, an inner layer, and an outer posterior surface hydrogel layer, wherein the inner layer is a lens bulk material, wherein the coated contact lens has a superior lens surface softness as measured by an averaged indentation depth at 5 KPa compression pressure of at least about 550 nm with using an indenting probe having a tip radius of about 10 μm and a stiffness of about 0.5 N/m in a nanoindentation test, have a water-break-up time (WBUT) of at least 10 seconds and optionally a polyquaternium-1 uptake ("PU") of about 0.4 micrograms/lens or less.

63. The coated contact lens of embodiment 62, wherein the averaged indentation depth at 5 KPa compression pressure is at least about 600 nm.

64. The coated contact lens of embodiment 62, wherein the averaged indentation depth at 5 KPa compression pressure is at least about 650 nm.

65. The coated contact lens of embodiment 62, wherein the averaged indentation depth at 5 KPa compression pressure is at least about 700 nm or 750 nm or 800 nm.

66. The coated contact lens of any one of embodiments 62 to 65, wherein the coated contact lens has a water-break-up time of at least 10 seconds.

67. The coated contact lens of any one of embodiments 62 to 65, wherein the coated contact lens has a water-break-up time of at least 12.5 seconds.

68. The coated contact lens of any one of embodiments 62 to 65, wherein the coated contact lens has a water-break-up time of at least 15 seconds.

69. The coated contact lens of any one of embodiments 62 to 65, wherein the coated contact lens has a water-break-up time of at least 17.5 seconds.

70. The coated contact lens of any one of embodiments 62 to 65, wherein the coated contact lens has a water-break-up time of at least 20 seconds.

71. The method of any one of embodiments 1 to 61 or the coated contact lens of any one of embodiments 62 to 70, wherein the contact lens precursor is a preformed hard contact lens and the lens bulk material is a hard plastic material.

72. The method or coated contact lens of embodiment 71, wherein the hard plastic material is a crosslinked polymethacrylate.

73. The method of any one of embodiments 1 to 61 or the coated contact lens of any one of embodiments 62 to 70, wherein the contact lens precursor is a preformed rigid gas permeable contact lens and the lens bulk material is a rigid gas permeable lens material.

74. The method or coated contact lens according to any one of embodiments 71 to 73, wherein the outer anterior and posterior surface hydrogel layers independent of each another have a thickness of from about 0.2 μm to about 20 μm when being fully hydrated.

75. The method or coated contact lens according to any one of embodiments 71 to 73, wherein the anterior and posterior outer hydrogel layers independent of each another have a thickness of from about 0.3 μm to about 15 μm when being fully hydrated.

76. The method or coated contact lens according to any one of embodiments 71 to 73, wherein the anterior and posterior outer hydrogel layers independent of each another have a thickness of from about 0.4 μm to about 10 μm when being fully hydrated.

77. The method or coated contact lens according to any one of embodiments 71 to 73, wherein the anterior and posterior outer hydrogel layers independent of each another have a thickness of from about 0.5 μm to about 8 μm when being fully hydrated.

78. The method of any one of embodiments 1 to 61 or the coated contact lens of any one of embodiments 62 to 70, wherein the contact lens precursor is a preformed hydride contact lens and the lens bulk material consists essentially of a central optical zone that is essentially made of a gas permeable lens material and a peripheral zone that is essentially made of a non-silicone hydrogel material.

79. The method of any one of embodiments 1 to 61 or the coated contact lens of any one of embodiments 62 to 70, wherein the contact lens precursor is a preformed embedded contact lens, wherein the lens bulk material consists essentially of a 3-dimensional article and a non-silicone hydrogel material, wherein the 3-dimensional article is made of a non-hydrogel material and has a 3-dimensional size smaller than that of the contact lens so that the 3-dimensional article is completely embedded within the non-silicone hydrogel material.

80. The method of any one of embodiments 1 to 61 or the coated contact lens of any one of embodiments 62 to 70, wherein the lens bulk material is a preformed non-silicon hydrogel contact lens essentially made of a non-silicone hydrogel material.

81. The method or coated contact lens of any one of embodiments 78 to 80, wherein the non-silicon hydrogel material comprises at least 50% by mole of repeating units of at least one hydroxyl-containing vinylic monomer.

82. The method or coated contact lens of embodiment 81, wherein said at least one hydroxyl-containing vinylic monomer is selected from the group consisting of hydroxyethyl (meth)acrylate, glycerol (meth)acrylate, 3-hydroxypropyl (meth)acrylate, 2-hydroxypropyl (meth)acrylate, 3-amino-2-hydroxypropyl (meth)acrylate, N-2-hydroxyethyl (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, vinyl alcohol, allyl alcohol, and combinations thereof.

83. The method or coated contact lens of embodiment 81, wherein said at least one hydroxyl-containing vinylic monomer is selected from the group consisting of hydroxyethyl (meth)acrylate, glycerol (meth)acrylate, and vinyl alcohol.

84. The method or coated contact lens of any one of embodiments 78 to 83, wherein the non-silicone hydrogel material has an equilibrium water content of from about 10% to 80% by weight.

85. The method or coated contact lens according to any one of embodiments 78 to 84, wherein the outer anterior and posterior surface hydrogel layers independent of each another have a thickness of from about 0.05 μm to about 20 μm when being fully hydrated.

86. The method or coated contact lens according to any one of embodiments 78 to 84, wherein the outer anterior and posterior surface hydrogel layers independent of each another have a thickness of from about 0.1 μm to about 15 μm when being fully hydrated.

87. The method or coated contact lens according to any one of embodiments 78 to 84, wherein the outer anterior and posterior surface hydrogel layers independent of each another have a thickness of from about 0.2 μm to about 10 μm when being fully hydrated.

88. The method or coated contact lens according to any one of embodiments 78 to 84, wherein the outer anterior and posterior surface hydrogel layers independent of each another have a thickness of from about 0.3 μm to about 6 μm when being fully hydrated.

89. The method of any one of embodiments 1 to 61 or the coated contact lens according to any one of embodiments 62 to 70, wherein the contact lens precursor is a preformed hybrid contact lens and the lens bulk material consists essentially of a central optical zone that is essentially made of a rigid gas permeable lens material and surrounded by a peripheral zone that is essential made of a silicone hydrogel material.

90. The method of any one of embodiments 1 to 61 or the coated contact lens according to any one of embodiments 62 to 70, wherein the contact lens precursor is a preformed embedded contact lens, wherein the lens bulk material consists essentially of a 3-dimensional article and a silicone hydrogel material, wherein the 3-dimensional article is made of a non-hydrogel material and has a 3-dimensional size smaller than that of the preformed embedded contact lens so that the 3-dimensional article is completely embedded within the silicone hydrogel material.

91. The method or coated contact lens of embodiment 89 or 90, wherein the silicone hydrogel material comprises repeating units of at least one silicone-containing vinylic monomer selected from the group consisting of a vinylic monomer having a bis(trialkylsilyloxy)alkylsilyl group, a vinylic monomer having a tris(trialkylsilyloxy)silyl group, a polysiloxane vinylic monomer, 3-methacryloxy propylpentamethyldisiloxane, t-butyldimethyl-siloxyethyl vinyl carbonate, trimethylsilylethyl vinyl carbonate, and trimethylsilylmethyl vinyl carbonate, and combinations thereof.

92. The method or coated contact lens of embodiment 91, wherein said at least one silicone-containing vinylic monomer comprises a vinylic monomer of formula (M1) or (M2)

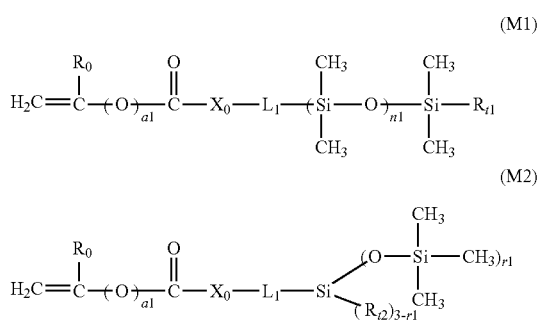

in which: a1 is zero or 1; $R_o$ is H or methyl; $X_o$ is O or $NR_1$; $L_1$ is a $C_2$-$C_8$ alkylene divalent radical or a divalent radical of

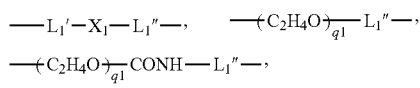

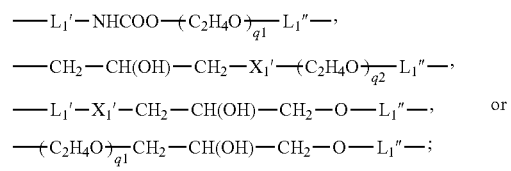

$L_1'$ is a $C_2$-$C_8$ alkylene divalent radical which has zero or one hydroxyl group; $L_1''$ is $C_3$-$C_8$ alkylene divalent radical which has zero or one hydroxyl group; $X_1$ is O, $NR_1$, NHCOO, OCONH, $CONR_1$, or $NR_1CO$; $R_1$ is H or a $C_1$-$C_4$ alkyl having 0 to 2 hydroxyl group; $R_{t1}$ and $R_{t2}$ independent of each other are a $C_1$-$C_6$ alkyl; $X_1'$ is O or $NR_1$; q1 is an integer of 1 to 30; q2 is an integer of 0 to 30; n1 is an integer of 3 to 40; and r1 is an integer of 2 or 3.

93. The method or coated contact lens of embodiment 91 or 92, wherein said at least one silicone-containing vinylic monomer comprises tris(trimethylsilyloxy)silylpropyl (meth)acrylate, [3-(meth)acryloxy-2-hydroxypropyloxy]propylbis(trimethylsiloxy) methylsilane, [3-(meth)acryloxy-2-hydroxypropyloxy]propylbis(trimethylsiloxy)butylsilane, 3-(meth)acryloxy-2-(2-hydroxyethoxy)-propyloxy)propylbis(trimethylsiloxy)methylsilane, 3-(meth)acryloxy-2-hydroxypropyloxy)propyltris(trimethylsiloxy)silane, N-[tris(trimethylsiloxy)silylpropyl]-(meth)acrylamide, N-(2-hydroxy-3-(3-(bis(trimethylsilyloxy)methylsilyl)propyloxy)propyl)-2-methyl (meth)acrylamide, N-(2-hydroxy-3-(3-(bis(trimethylsilyloxy)methylsilyl)propyloxy)-propyl) (meth)acrylamide, N-(2-hydroxy-3-(3-(tris(trimethylsilyloxy)silyl)propyloxy)propyl)-2-methyl acrylamide, N-(2-hydroxy-3-(3-(tris(trimethylsilyloxy)silyl)propyloxy)propyl) (meth)acrylamide, N-[tris(dimethylpropylsiloxy)silylpropyl]-(meth)acrylamide, N-[tris(dimethylphenylsiloxy)silylpropyl] (meth)acrylamide, N-[tris(dimethylethylsiloxy)-silylpropyl] (meth)acrylamide, N,N-bis[2-hydroxy-3-(3-(bis(trimethylsilyloxy)methylsilyl)-propyloxy)propyl]-2-methyl (meth)acrylamide, N,N-bis[2-hydroxy-3-(3-(bis(trimethylsilyloxy)methylsilyl)propyloxy)propyl] (meth)acrylamide, N,N-bis[2-hydroxy-3-(3-(tris(trimethylsilyloxy)silyl)propyloxy)propyl]-2-methyl (meth)acrylamide, N,N-bis[2-hydroxy-3-(3-(tris(trimethylsilyloxy)silyl)propyloxy)propyl] (meth)acrylamide, N-[2-hydroxy-3-(3-(t-butyldimethylsilyl)propyloxy)propyl]-2-methyl (meth)acrylamide, N-[2-hydroxy-3-(3-(t-butyldimethylsilyl)propyloxy)propyl] (meth)acrylamide, N,N-bis[2-hydroxy-3-(3-(t-butyldimethylsilyl)propyloxy)propyl]-2-methyl (meth)acrylamide, N-2-(meth)acryloxyethyl-0-(methyl-bis-trimethylsiloxy-3-propyl)silyl carbamate, 3-(trimethylsilyl)propylvinyl carbonate, 3-(vinyloxycarbonylthio)propyl-tris(trimethylsiloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, or a combination thereof.

94. The method or coated contact lens of any one of embodiments 91 to 93, wherein said at least one silicone-containing vinylic monomer comprises α-(meth)acryloxypropyl terminated ω-$C_1$-$C_4$-alkyl terminated polydimethylsiloxane, α-(meth)acryloxy-2-hydroxypropyloxypropyl terminated ω-$C_1$-$C_4$-alkyl terminated polydimethylsiloxane, α-(2-hydroxyl-methacryloxypropyloxypropyl)-ω-$C_1$-$C_4$-alkyl-decamethylpentasiloxane, α-[3-(meth)acryloxyethoxy-2-hydroxypropyloxypropyl]-terminated ω-$C_1$-$C_4$-alkyl terminated polydimethylsiloxane, α-[3-(meth)acryloxy-propyloxy-2-hydroxypropyloxypropyl]-terminated ω-$C_1$-$C_4$-alkyl terminated polydimethylsiloxane, α-[3-(meth)acryloxy-isopropyloxy-2-hydroxypropyloxypropyl]-terminated ω-$C_1$-$C_4$-alkyl terminated polydimethylsiloxane, α-[3-(meth)acryloxybutyloxy-2-hydroxypropyloxypropyl]-terminated ω-$C_1$-$C_4$-alkyl terminated polydimethylsiloxane, α-[3-(meth)acryloxyethylamino-2-hydroxypropyloxypropyl]-terminated ω-$C_1$-$C_4$-alkyl terminated polydimethylsiloxane, α-[3-(meth)acryloxypropylamino-2-hydroxypropyloxypropyl]-terminated ω-$C_1$-$C_4$-alkyl terminated polydimethylsiloxane, α-[3-(meth)acryloxybutylamino-2-hydroxypropyloxypropyl]-terminated ω-$C_1$-$C_4$-alkyl terminated polydimethylsiloxane, α-(meth)acryloxy(polyethylenoxy)-2-hydroxypropyloxypropyl]-terminated ω-$C_1$-$C_4$-alkyl terminated polydimethylsiloxane, α-[(meth)acryloxy-2-hydroxypropyloxyethoxypropyl]-terminated ω-$C_1$-$C_4$-alkyl terminated polydimethylsiloxane, α-[(meth)acryloxy-2-hydroxypropyl-N-ethylaminopropyl]-terminated ω-$C_1$-$C_4$-alkyl terminated polydimethylsiloxane, α-[(meth)acryloxy-2-hydroxypropyl-aminopropyl]-terminated ω-$C_1$-$C_4$-alkyl terminated polydimethylsiloxane, α-[(meth)acryloxy-2-hydroxypropyloxy-(polyethylenoxy)propyl]-terminated ω-$C_1$-$C_4$-alkyl terminated polydimethylsiloxane, α-(meth)acryloylamidopropyloxypropyl terminated ω-$C_1$-$C_4$-alkyl terminated polydimethylsiloxane, α-N-methyl-(meth)acryloylamidopropyloxypropyl terminated ω-$C_1$-$C_4$-alkyl terminated polydimethylsiloxane, α-[3-(meth)acrylamidoethoxy-2-hydroxypropyloxy-propyl]-terminated ω-$C_1$-$C_4$-alkyl polydimethylsiloxane, α-[3-(meth)acrylamidopropyloxy-2-hydroxypropyloxypropyl]-terminated ω-$C_1$-$C_4$-alkyl terminated polydimethylsiloxane, α-[3-(meth)acrylamidoisopropyloxy-2-hydroxypropyloxypropyl]-terminated ω-$C_1$-$C_4$-alkyl terminated polydimethylsiloxane, α-[3-(meth)acrylamidobutyloxy-2-hydroxypropyloxypropyl]-terminated ω-$C_1$-$C_4$-alkyl terminated polydimethylsiloxane, α-[3-(meth)acryloylamido-2-hydroxypropyloxypropyl]terminated ω-$C_1$-$C_4$-alkyl polydimethylsiloxane, α-[3-[N-methyl-(meth)acryloylamido]-2-hydroxypropyloxypropyl] terminated ω-$C_1$-$C_4$-alkyl terminated polydimethylsiloxane, N-methyl-N'-(propyltetra(dimethylsiloxy)dimethylbutylsilane) (meth)acrylamide, N-(2,3-dihydroxypropane)-N'-(propyltetra(dimethylsiloxy)dimethylbutylsilane) (meth)acrylamide, (meth)acryloylamidopropyltetra(dimethylsiloxy)dimethylbutylsilane, α-vinyl carbonate-terminated ω-$C_1$-$C_4$-alkyl-terminated polydimethylsiloxanes, α-vinyl carbamate-terminated ω-$C_1$-$C_4$-alkyl-terminated polydimethylsiloxane, or a mixture thereof.

95. The method or coated contact lens of any one of embodiments 89 to 94, wherein the silicone hydrogel material comprises repeating units of at least one polysiloxane vinylic crosslinker.

96. The method or coated contact lens of embodiment 95, wherein said at least one polysiloxane vinylic crosslinker comprises a di-(meth)acryloyl-terminated polydimethylsiloxane, a di-vinyl carbonate-terminated polydimethylsiloxane; a di-vinyl carbamate-terminated polydimethylsiloxane; N,N,N',N'-tetrakis(3-methacryloxy-2-hydroxypropyl)-alpha,omega-bis-3-aminopropyl-polydimethylsiloxane, or a combination thereof.

97. The method or coated contact lens of embodiment 95, wherein said at least one polysiloxane vinylic crosslinker comprises a vinylic crosslinker of formula (I)

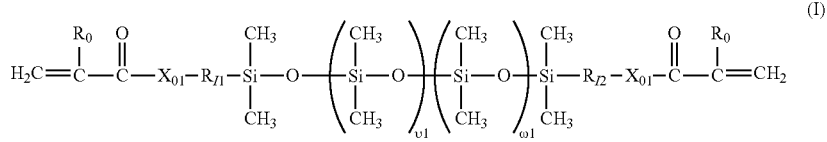

in which:
υ1 is an integer of from 30 to 500 and ω1 is an integer of from 1 to 75, provided that
ω1/υ1 is from about 0.035 to about 0.15 (preferably from about 0.040 to about 0.12, even more preferably from about 0.045 to about 0.10);
$X_{01}$ is O or $NR_N$ in which $R_N$ is hydrogen or $C_1$-$C_{10}$-alkyl;
$R_o$ is hydrogen or methyl;
$R_{I1}$ and $R_{I2}$ independently of each other are a substituted or unsubstituted $C_1$-$C_{10}$ alkylene divalent radical or a divalent radical of —$R_{I4}$—O—$R_{I5}$— in which $R_{I4}$ and $R_{I5}$ independently of each other are a substituted or unsubstituted $C_1$-$C_{10}$ alkylene divalent radical;
$R_{I3}$ is a monovalent radical of any one of formula (Ia) to (Ie)

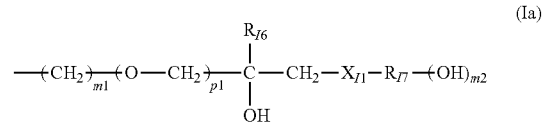

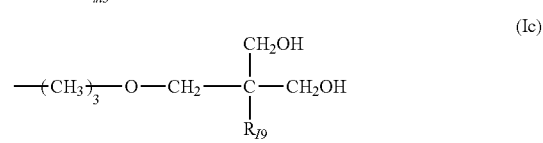

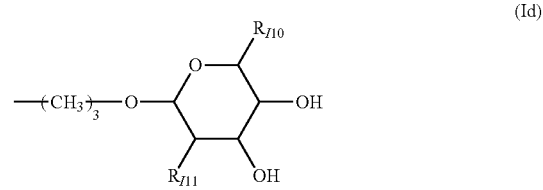

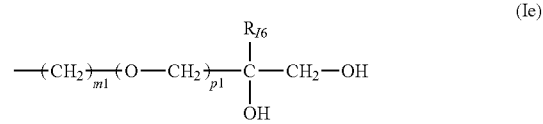

p1 is zero or 1; m1 is an integer of 2 to 4; m2 is an integer of 1 to 5; m3 is an integer of 3 to 6; m4 is an integer of 2 to 5;

$R_{I6}$ is hydrogen or methyl;

$R_{I7}$ is a $C_2$-$C_6$ hydrocarbon radical having (m2+1) valencies;

$R_{I8}$ is a $C_2$-$C_6$ hydrocarbon radical having (m4+1) valencies;

$R_{I9}$ is ethyl or hydroxymethyl;

$R_{I10}$ is methyl or hydromethyl;

$R_{I11}$ is hydroxyl or methoxy;

$X_{I1}$ is a sulfur linkage of —S— or a tertiary amino linkage of —$NR_{I12}$— in which $R_{I12}$ is $C_1$-$C_1$ alkyl, hydroxyethyl, hydroxypropyl, or 2,3-dihydroxypropyl; and $X_{42}$ is an amide linkage of

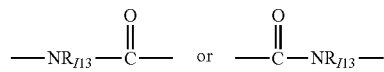

in which $R_{I13}$ is hydrogen or $C_1$-$C_{10}$ alkyl.

98. The method or coated contact lens of embodiment 95, wherein said at least one polysiloxane vinylic crosslinker comprises a vinylic crosslinker of any one of formula (1) to (7)

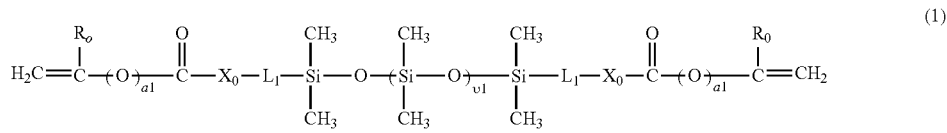
(1)

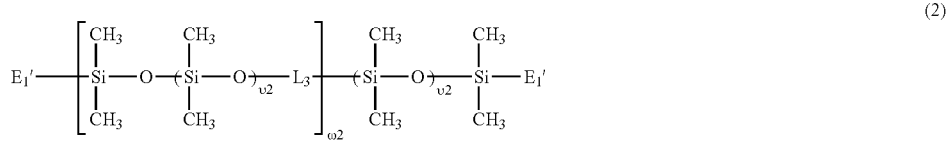
(2)

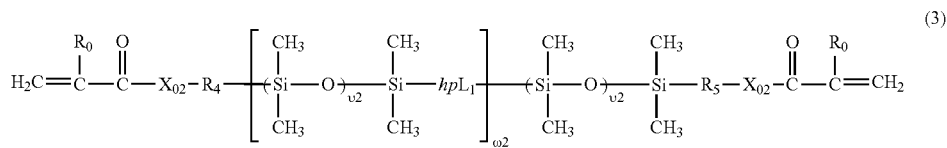
(3)

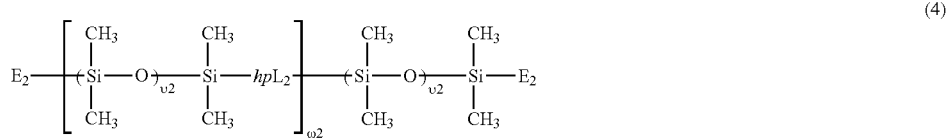
(4)

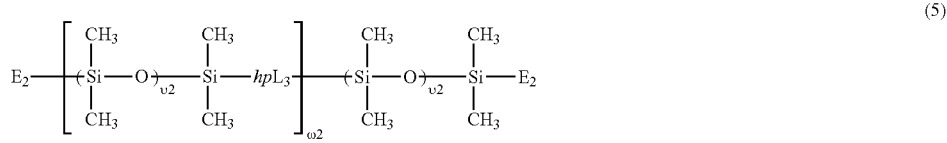
(5)

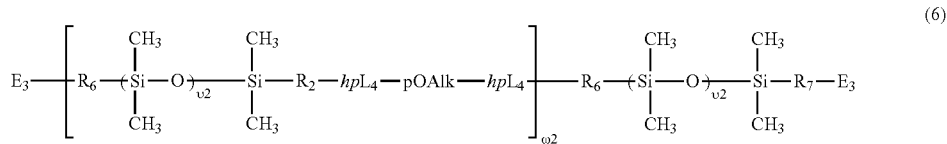
(6)

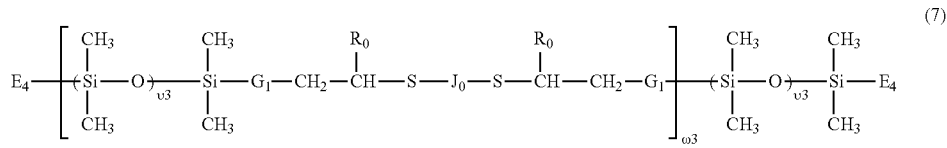
(7)

in which:
υ1 is an integer of from 30 to 500;
υ2 is an integer of from 5 to 50;
υ3 is an integer of from 5 to 100;
ω2 and ω3 independent of each other are an integer of from 1 to 15;
a1 and g1 independent of each other is zero or 1;
h1 is an integer of 1 to 20 and h2 is an integer of 0 to 20;
m1 and m3 independent of each other is 0 or 1, m2 is an integer of 1 to 6, m4 is an integer of 1 to 5, m5 is 2 or 3;
q1 is an integer of 1 to 20, q2 is an integer of 0 to 20, q3 is an integer of 0 to 2, q4 is an integer of 2 to 50, q5 and q6 independent of each other are a number of 0 to 35, provided that (q4+q5+q6) is an integer of 2 to 50;
x+y is an integer of from 10 to 30;
e1 is an integer of 5 to 100, p1 and b1 independent of each other are an integer of 0 to 50, provided that (e1+p1+b1)≥10 and $e_1/(p1+b1)\geq 2$ (preferably from about 2:1 to about 10:1, more preferably from about 3:1 to about 6:1) when (p1+b1)≥1;
$R_o$ is H or methyl; $R_1$, $R_{1n}$, $R_{2n}$, $R_{3n}$, and $R_{4n}$ independent of one another are H or a $C_1$-$C_4$ alkyl having 0 to 2 hydroxyl group;
$R_{n5}$ is H or a $C_1$-$C_{10}$ alkyl;
$R_2$ is a $C_4$-$C_{14}$ hydrocarbon divalent radical;
$R_3$ is a $C_2$-$C_6$ alkylene divalent radical;
$R_4$ and $R_5$ independent of each other are a $C_1$-$C_6$ alkylene divalent radical or a $C_1$-$C_6$ alkylene-oxy-$C_1$-$C_6$ alkylene divalent radical;
$R_6$ and $R_7$ independent of each other are a $C_1$-$C_6$ alkylene divalent radical or a $C_1$-$C_6$ alkoxy-$C_1$-$C_6$ alkylene divalent radical;
$R_8$ and $R_9$ independent of each other are a substituted or unsubstituted $C_1$-$C_{12}$ alkylene divalent radical;
$X_o$, $X_1'$, $X_{o1}$, $X_{o2}$, and $X_{o3}$ independent of one another are O or $NR_1$;
$X_1$ is O, $NR_1$, NHCOO, OCONH, $CONR_1$, or $NR_1CO$;
$X_{o4}$ is —COO— or —$CONR_{n5}$—;
$X_{o5}$ and $X_{o7}$ independent of each other are a direct bond, —COO— or —$CONR_{n5}$—;
$X_{o8}$ is a direct bond, a $C_1$-$C_6$ alkylene divalent radical, a $C_1$-$C_6$ alkylenoxy divalent radical, —COO—, or —$CONR_{n5}$—;
$X_{o8}$ is a direct bond or —COO—;
$X_{o9}$ is O or $NR_{n5}$;
$X_{10}$ is a direct bond, a $C_1$-$C_6$ alkylene divalent radical, —COO—, or —$CONR_{n5}$—;

$E_1'$ is a monovalent radical of

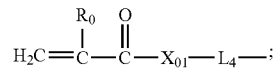

$E_2$ is a monovalent radical of

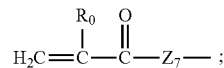

$E_3$ is a monovalent radical of

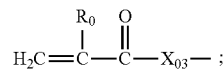

$E_4$ is a monovalent radical of

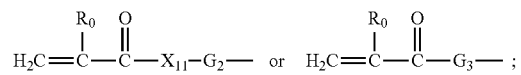

$L_1$ is a $C_2$-$C_8$ alkylene divalent radical or a divalent radical of

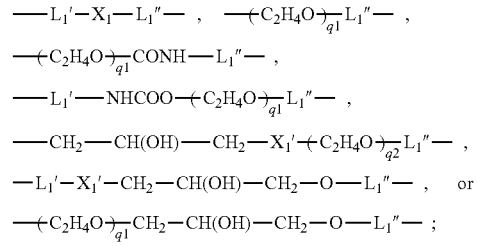

$L_1'$ is a $C_2$-$C_8$ alkylene divalent radical which has zero or one hydroxyl group;
$L_1''$ is a $C_3$-$C_8$ alkylene divalent radical which has zero or one hydroxyl group;
$L_3$ is a divalent radical of

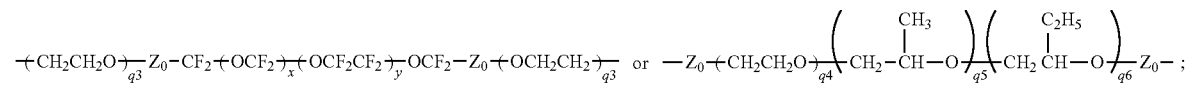

in which PE is a divalent radical of $-\!\!+\!CH_2CH_2O\!+\!\!_{q3}\!Z_0\!-\!CF_2\!+\!OCF_2\!+\!_x\!+\!OCF_2CF_2\!+\!_y\!OCF_2\!-\!Z_0\!+\!OCH_2CH_2\!+\!_{q3}$ or $-Z_0\!+\!CH_2CH_2O\!+\!_{q4}\!+\!CH_2\!-\!\underset{CH_3}{\underset{|}{CH}}\!-\!O\!+\!_{q5}\!+\!CH_2\!\underset{C_2H_5}{\underset{|}{CH}}\!-\!O\!+\!_{q6}\!Z_0-$ ;

$L_3'$ is $C_3$-$C_8$ alkylene divalent radical;

$L_4$ is a divalent radical of

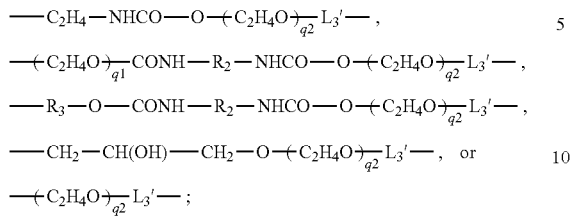

$hpL_1$ is a divalent radical of

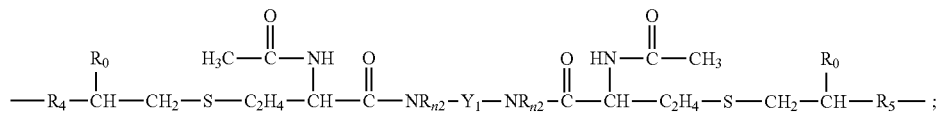

$hpL_2$ is a divalent radical of

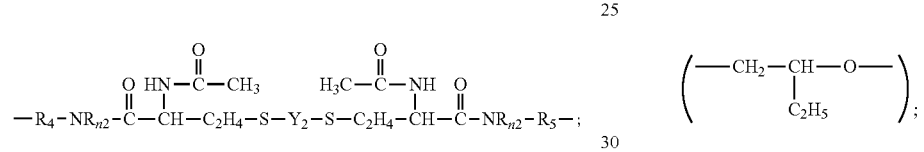

$hpL_3$ is a divalent radical of

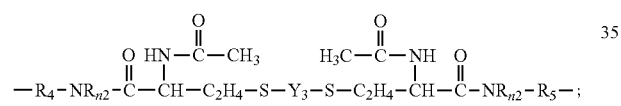

$hpL_4$ is a divalent radical of

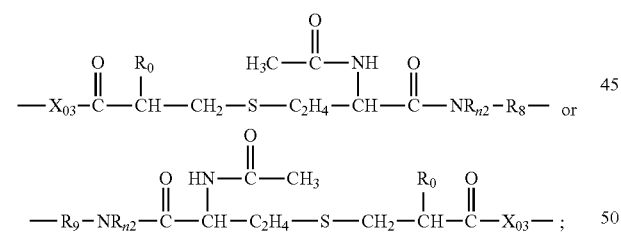

pOAlk is a divalent radical of

in which EO is an oxyethylene unit (—CH$_2$CH$_2$O—), PO is an oxypropylene unit

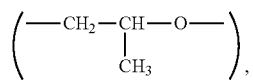

and BO is an oxybutylene unit

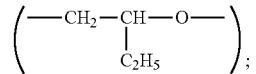

$M_0$ is $C_3$-$C_8$ alkylene divalent radical;

$M_1$ is a $C_4$-$C_{14}$ hydrocarbon divalent radical;

$M_2$ and $M_3$ independent of each other are a $C_1$-$C_6$ alkylene divalent radical;

$J_0$ is a $C_1$-$C_{12}$ hydrocarbon radical having 0 to 2 hydroxyl or carboxyl groups;

G1 is a direct bond, a $C_1$-$C_4$ alkylene divalent radical, or a bivalent radical of

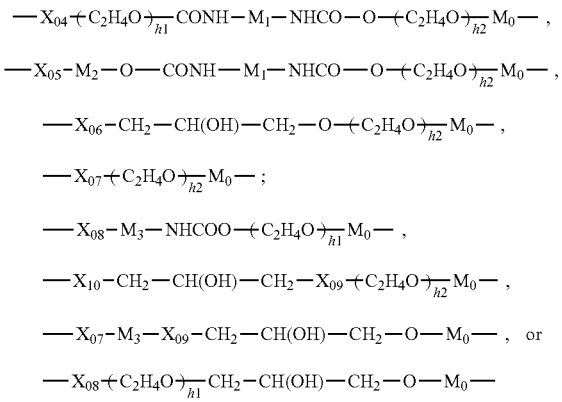

in which $M_0$ is linked to Si atom while $X_{04}$ to $X_{10}$ are linked to the group of —CH$_2$— in formula (7) and at least one of $J_0$ and G1 in formula (7) comprises at least one moieties selected from the group consisting of hydroxyl groups, urethane linkage of —OCONH—, amino groups of —NHR°, amino linkages of —NH—, amide linkages of —CONH—, carboxyl groups, and combinations thereof;

$G_2$ is a $C_1$-$C_4$ alkylene divalent radical or a bivalent radical of

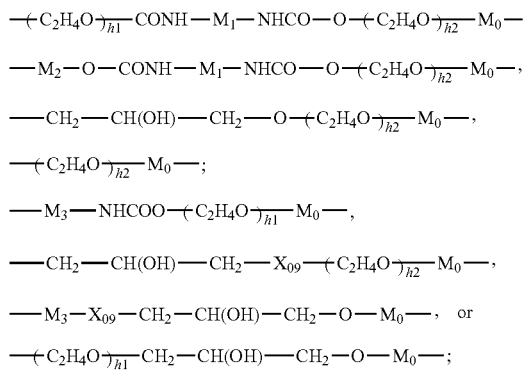

$G_3$ is a divalent radical of

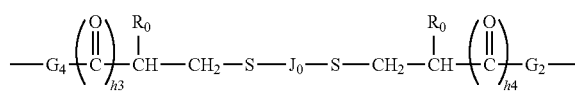

in which h3 and h4 independent of each other are 1 or 0;

$G_4$ is a divalent radical of any one of (a) —$NR_3'$— in which $R_3'$ is hydrogen or $C_1$-$C_3$ alkyl,

 (b)

(c) —$NR_0$-$G_5$-$NR_0$— in which $G_5$ is a $C_1$-$C_8$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, and (d) —O-$G_6$-O— in which $G_8$ is a $C_1$-$C_6$ alkylene divalent radical, a divalent radical of

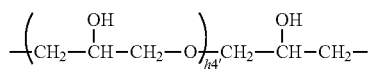

in which h4' is 1 or 2, a divalent radical of

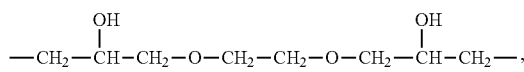

a divalent radical of

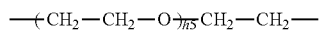

in which h5 is an integer of 1 to 5, a divalent radical of

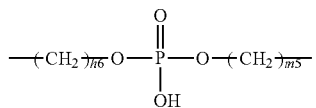

in which h6 is 2 or 3, or a substituted $C_3$-$C_8$ alkylene divalent radical having a hydroxyl group or phosphonyloxy group;

$Y_1$ is a $C_1$-$C_6$ alkylene divalent radical, 2-hydroxylpropylene divalent radical, 2-(phosphonyloxy)propylene divalent radical, 1,2-dihydroxyethylene divalent radical, a divalent radical of

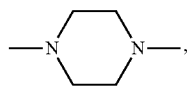

or a divalent radical of

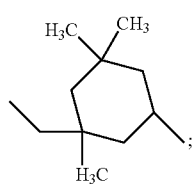

$Y_2$ is a divalent radical of

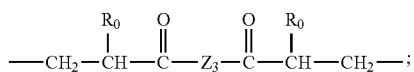

$Y_3$ is a divalent radical of

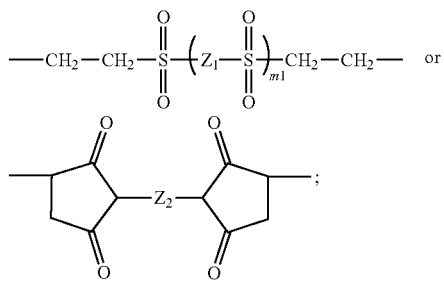

$Z_0$ is a direct bond or a $C_1$-$C_{12}$ alkylene divalent radical;
$Z_1$ is a $C_1$-$C_6$ alkylene divalent radical, a hydroxyl- or methoxy-substituted $C_1$-$C_6$ alkylene divalent radical, or a substituted or unsubstituted phenylene divalent radical,
$Z_2$ is a $C_1$-$C_6$ alkylene divalent radical, a hydroxyl- or methoxy-substituted $C_1$-$C_6$ alkylene divalent radical, a dihydroxyl- or dimethoxy-substituted $C_2$-$C_6$ alkylene divalent radical, a divalent radical of —$C_2H_4$—(O—$C_2H_4)_{m2}$—, a divalent radical of —$Z_4$—S—S—$Z_4$—, a hydroxyl- or methoxy-substituted $C_1$-$C_6$ alkylene divalent radical, or a substituted or unsubstituted phenylene divalent radical, $Z_3$ is a divalent radical of any one of (a) —$NR_{n3}$—,

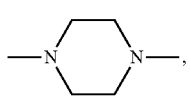 (b)

(c) —$NR_0$—$Z_5$—$NR_0$—, and (d) —O—$Z_6$—O—, $Z_4$ is a $C_1$-$C_6$ alkylene divalent radical, $Z_5$ is a $C_1$-$C_6$ alkylene divalent radical, 2-hydroxylpropylene divalent radical, 2-(phosphonyloxy)propylene divalent radical, 1,2-dihydroxyethylene divalent radical, 2,3-dihydroxybutylene divalent radical, $Z_6$ is (a) a $C_1$-$C_6$ alkylene divalent radical, (b) a divalent radical of

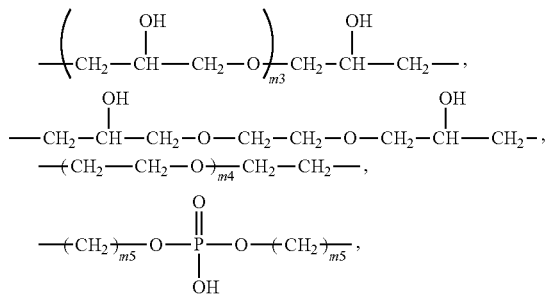

or (c) a substituted $C_3$-$C_8$ alkylene divalent radical having a hydroxyl group or phosphonyloxy group, $Z_7$ is a divalent radical of

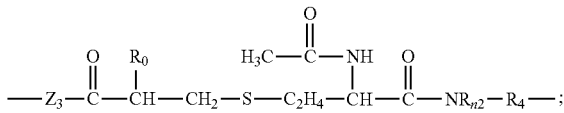

and $Z_8$ is a divalent radical of

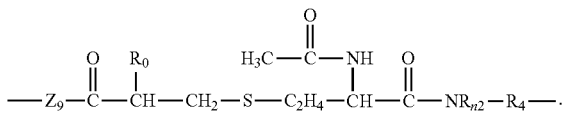

99. The method or coated contact lens of embodiment 95, wherein said at least one polysiloxane vinylic crosslinker is α,ω-bis[3-(meth)acrylamidopropyl]-terminated polydimethylsiloxane, α,ω-bis[3-(meth)acryloxypropyl]-terminated polydimethylsiloxane, α,ω-bis[3-(meth)acryloxy-2-hydroxypropyloxypropyl]-terminated polydimethylsiloxane, α,ω-bis[3-(meth)acryloxyethoxy-2-hydroxypropyloxypropyl]-terminated polydimethylsiloxane, α,ω-bis[3-(meth)acryloxypropyloxy-2-hydroxypropyloxypropyl]-terminated polydimethylsiloxane, α,ω-bis[3-(meth)acryloxy-isopropyloxy-2-hydroxypropyloxypropyl]-terminated polydimethylsiloxane, α,ω-bis[3-(meth)acryloxybutyloxy-2-hydroxypropyloxypropyl]-terminated polydimethylsiloxane, α,ω-bis[3-(meth)acrylamidoethoxy-2-hydroxypropyloxypropyl]-terminated polydimethylsiloxane, α,ω-bis[3-(meth)acrylamidopropyloxy-2-hydroxypropyloxypropyl]-terminated polydimethylsiloxane, α,ω-bis[3-(meth)acrylamidoisopropyloxy-2-hydroxypropyloxypropyl]-terminated polydimethylsiloxane, α,ω-bis[3-(meth)acrylamidobutyloxy-2-hydroxypropyloxypropyl]-terminated polydimethylsiloxane, α,ω-bis[3-(meth)acryloxyethylamino-2-hydroxypropyloxypropyl]-terminated polydimethylsiloxane, α,ω-bis[3-(meth)acryloxypropylamino-2-hydroxypropyloxypropyl]-terminated polydimethylsiloxane, α,ω-bis[3-(meth)acryloxybutylamino-2-hydroxypropyloxypropyl]-terminated polydimethylsiloxane, α,ω-bis[(meth)acrylamidoethylamino-2-hydroxypropyloxy-propyl]-terminated polydimethylsiloxane, α,ω-bis[3-(meth)acrylamidopropylamino-2-hydroxypropyloxypropyl]-terminated polydimethylsiloxane, α,ω-bis[3-(meth)acrylamide-butylamino-2-hydroxypropyloxypropyl]-terminated polydimethylsiloxane, α,ω-bis[(meth)acryloxy-2-hydroxypropyloxy-ethoxypropyl]-terminated polydimethylsiloxane, α,ω-bis[(meth)acryloxy-2-hydroxypropyl-N-ethylaminopropyl]-terminated polydimethylsiloxane, α,ω-bis[(meth)acryloxy-2-hydroxypropyl-aminopropyl]-polydimethylsiloxane, α,ω-bis[(meth)acryloxy-2-hydroxypropyloxy-(polyethylenoxy)propyl]-terminated polydimethylsiloxane, α,ω-bis[(meth)acryloxyethylamino-carbonyloxy-ethoxypropyl]-terminated polydimethylsiloxane, α,ω-bis[(meth)acryloxyethylamino-carbonyloxy-(polyethylenoxy)propyl]-terminated polydimethylsiloxane, or combinations thereof.

100. The method or coated contact lens of any one of embodiments 89 to 99, wherein the silicone hydrogel comprises repeating units of at least one hydrophilic vinylic monomer.

101. The method or coated contact lens of embodiment 100, wherein said at least one hydrophilic vinylic monomer comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomer having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra(ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio) ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio) ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12) N-2-hydroxyethyl vinyl carbamate; (13) N-carboxyvinyl-β-alanine (VINAL); (14) N-carboxyvinyl-α-alanine; (15) or combinations thereof.

102. The method or coated contact lens of embodiment 100 or 101, wherein said at least one hydrophilic vinylic monomer comprises N-vinylpyrrolidone, N-vinyl-N-methyl acetamide, or combinations thereof.

103. The method or coated contact lens of any one of embodiments 100 to 102, wherein said at least one hydrophilic vinylic monomer comprises N,N-dimethyl (meth)acrylamide.

104. The method or coated contact lens of any one of embodiments 100 to 103, wherein said at least one hydrophilic vinylic monomer comprises N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol) (meth)acrylate, poly(ethylene glycol) (meth)acrylate having a number average molecular weight of up to 1500, poly(ethylene glycol)ethyl (meth)acrylamide having a number average molecular weight of up to 1500, or combinations thereof.

105. The method of coated contact lens of any one of embodiments 89 to 104, wherein the silicone hydrogel comprises repeating units of at least one non-silicone vinylic cross-linking agent.

106. The method or coated contact lens of embodiment 105, wherein said at least one non-silicone vinylic crossling agent comprises ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide, dimethacrylamide, N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate, piperazine diacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, allylmethacrylate, allylacrylate, N-allyl-methacrylamide, N-allyl-acrylamide, or combinations thereof.

107. The method or coated contact lens of any one of embodiments 89 to 104, wherein the silicone hydrogel comprises repeating units of at least one blending vinylic monomer.

108. The method or coated contact lens of any one of embodiments 89 to 104, wherein said at least one blending vinylic monomer comprises $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof.

109. The method or coated contact lens of any one of embodiments 89 to 104, wherein said at least one blending vinylic monomer comprises methyl methacrylate.

110. The method or coated contact lens of any one of embodiments 89 to 109, wherein the silicone hydrogel comprises repeating units of at least one UV-absorbing vinylic monomer and optionally repeating units of at least one UV/HEVL-Absorbing vinylic monomer.

111. The method of coated contact lens of any one of embodiments 89 to 110, wherein the silicone hydrogel material has an equilibrium water content of from about 10% to about 80% by weight.

112. The method or coated contact lens of any one of embodiments 89 to 110, wherein the silicone hydrogel material has an equilibrium water content of from about 20% to about 80% by weight.

113. The method or coated contact lens of any one of embodiments 89 to 110, wherein the silicone hydrogel material has an equilibrium water content of from about 30% to about 80% by weight.

114. The method or coated contact lens of any one of embodiments 89 to 110, wherein the silicone hydrogel material has an equilibrium water content of from about 40% to about 80% by weight.

115. The method or coated contact lens of any one of embodiments 89 to 114, wherein the silicone hydrogel material has an oxygen permeability of from about 50 to about 180 barrers.

116. The method or coated contact lens of any one of embodiments 89 to 114, wherein the silicone hydrogel material has an oxygen permeability of from about 60 to about 180 barrers.

117. The method or coated contact lens of any one of embodiments 89 to 114, wherein the silicone hydrogel material has an oxygen permeability of from about 70 to about 180 barrers.

118. The method or coated contact lens of any one of embodiments 89 to 114, wherein the silicone hydrogel material has an oxygen permeability of from about 80 to about 180 barrers.

119. The method or coated contact lens of any one of embodiments 89 to 114, wherein the silicone hydrogel material has an oxygen permeability of from about 90 to about 180 barrers.

120. The method or coated contact lens of any one of embodiments 89 to 114, wherein the silicone hydrogel material has an oxygen permeability of from about 100 to about 180 barrers.

121. The method or coated contact lens according to any one of embodiments 89 to 120, wherein the outer anterior and posterior surface hydrogel layers independent of each another have a thickness of from about 0.05 µm to about 20 µm when being fully hydrated.

122. The method or coated contact lens according to any one of embodiments 89 to 120, wherein the outer anterior and posterior surface hydrogel layers independent of each another have a thickness of from about 0.1 µm to about 15 µm when being fully hydrated.

123. The method or coated contact lens according to any one of embodiments 89 to 120, wherein the outer anterior and posterior surface hydrogel layers independent of each another have a thickness of from about 0.2 µm to about 15 µm when being fully hydrated.

124. The method or coated contact lens according to any one of embodiments 89 to 120, wherein the outer anterior and posterior surface hydrogel layers independent of each another have a thickness of from about 0.3 µm to about 10 µm when being fully hydrated.

125. The method of any one of embodiments 1-61 and 71-124 or the coated contact lens of any one of embodiments 62 to 124, wherein the outer anterior and posterior surface hydrogel layers independent of each another are a crosslinked hydrophilic polymeric material comprising polymer chains each of which includes repeating monomeric units of at least one hydrophilic vinylic monomer which comprises: (1) an alkyl (meth)acrylamide selected from the group consisting of (meth)acrylamide, N,N-dimethyl (meth)acrylamide, N-ethyl (meth)acrylamide, N,N-diethyl (meth)acrylamide, N-propyl (meth)acrylamide, N-isopropyl (meth)acrylamide, N-3-methoxypropyl (meth)acrylamide, and combinations thereof; (2) a hydroxyl-containing acrylic monomer selected from the group consisting of N-2-hydroxylethyl (meth)acrylamide, N,N-bis(hydroxyethyl) (meth)acrylamide, N-3-hydroxypropyl (meth)acrylamide, N-2-hydroxypropyl (meth)acrylamide, N-2,3-dihydroxypropyl (meth)acrylamide, N-tris(hydroxymethyl)methyl (meth)acrylamide, 2-hydroxyethyl (meth)acrylate, 3-hydroxypropyl (meth)acrylate, 2-hydroxypropyl (meth)acrylate, glycerol methacrylate (GMA), di(ethylene glycol) (meth)acrylate, tri(ethylene glycol) (meth)acrylate, tetra(ethylene glycol)

(meth)acrylate, poly(ethylene glycol) (meth)acrylate having a number average molecular weight of up to 1500, poly(ethylene glycol)ethyl (meth)acrylamide having a number average molecular weight of up to 1500, and combinations thereof; (3) a carboxyl-containing acrylic monomer selected from the group consisting of 2-(meth)acrylamidoglycolic acid, (meth)acrylic acid, ethylacrylic acid, 3-(meth)acrylamidopropionic acid, 5-(meth)acrylamidopentanoic acid, 4-(meth)acrylamidobutanoic acid, 3-(meth)acrylamido-2-methylbutanoic acid, 3-(meth)acrylamido-3-methylbutanoic acid, 2-(meth)acrylamido-2methyl-3,3-dimethyl butanoic acid, 3-(meth)acrylamidohaxanoic acid, 4-(meth)acrylamido-3,3-dimethylhexanoic acid, and combinations thereof; (4) an amino-containing acrylic monomer selected from the group consisting of N-2-aminoethyl (meth)acrylamide, N-2-methylaminoethyl (meth)acrylamide, N-2-ethylaminoethyl (meth)acrylamide, N-2-dimethylaminoethyl (meth)acrylamide, N-3-aminopropyl (meth)acrylamide, N-3-methylaminopropyl (meth)acrylamide, N-3-dimethylaminopropyl (meth)acrylamide, 2-aminoethyl (meth)acrylate, 2-methylaminoethyl (meth)acrylate, 2-ethylaminoethyl (meth)acrylate, 3-aminopropyl (meth)acrylate, 3-methylaminopropyl (meth)acrylate, 3-ethylaminopropyl (meth)acrylate, 3-amino-2-hydroxypropyl (meth)acrylate, trimethylammonium 2-hydroxy propyl (meth)acrylate hydrochloride, dimethylaminoethyl (meth)acrylate, and combinations thereof; (5) an N-vinyl amide monomer selected from the group consisting of N-vinylpyrrolidone (aka, N-vinyl-2-pyrrolidone), N-vinyl-3-methyl-2-pyrrolidone, N-vinyl-4-methyl-2-pyrrolidone, N-vinyl-5-methyl-2-pyrrolidone, N-vinyl-6-methyl-2-pyrrolidone, N-vinyl-3-ethyl-2-pyrrolidone, N-vinyl-4,5-dimethyl-2-pyrrolidone, N-vinyl-5,5-dimethyl-2-pyrrolidone, N-vinyl-3,3,5-trimethyl-2-pyrrolidone, N-vinyl piperidone (aka, N-vinyl-2-piperidone), N-vinyl-3-methyl-2-piperidone, N-vinyl-4-methyl-2-piperidone, N-vinyl-5-methyl-2-piperidone, N-vinyl-6-methyl-2-piperidone, N-vinyl-6-ethyl-2-piperidone, N-vinyl-3,5-dimethyl-2-piperidone, N-vinyl-4,4-dimethyl-2-piperidone, N-vinyl caprolactam (aka, N-vinyl-2-caprolactam), N-vinyl-3-methyl-2-caprolactam, N-vinyl-4-methyl-2-caprolactam, N-vinyl-7-methyl-2-caprolactam, N-vinyl-7-ethyl-2-caprolactam, N-vinyl-3,5-dimethyl-2-caprolactam, N-vinyl-4,6-dimethyl-2-caprolactam, N-vinyl-3,5,7-trimethyl-2-caprolactam, N-vinyl-N-methyl acetamide, N-vinyl formamide, N-vinyl acetamide, N-vinyl isopropylamide, N-vinyl-N-ethyl acetamide, N-vinyl-N-ethyl formamide, and mixtures thereof; (6) a methylene-containing pyrrolidone monomer selected from the group consisting of 1-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, and combinations thereof; (7) an acrylic monomers having a $C_1$-$C_4$ alkoxyethoxy group and selected from the group consisting of ethylene glycol methyl ether (meth)acrylate, di(ethylene glycol) methyl ether (meth)acrylate, tri(ethylene glycol) methyl ether (meth)acrylate, tetra (ethylene glycol) methyl ether (meth)acrylate, $C_1$-$C_4$-alkoxy poly(ethylene glycol) (meth)acrylate having a number average molecular weight of up to 1500, methoxy-poly(ethylene glycol)ethyl (meth)acrylamide having a number average molecular weight of up to 1500, and combinations thereof; (8) a vinyl ether monomer selected from the group consisting of ethylene glycol monovinyl ether, di(ethylene glycol) monovinyl ether, tri(ethylene glycol) monovinyl ether, tetra(ethylene glycol) monovinyl ether, poly(ethylene glycol) monovinyl ether, ethylene glycol methyl vinyl ether, di(ethylene glycol) methyl vinyl ether, tri(ethylene glycol) methyl vinyl ether, tetra(ethylene glycol) methyl vinyl ether, poly(ethylene glycol) methyl vinyl ether, and combinations thereof; (9) an allyl ether monomer selected from the group consisting of ethylene glycol monoallyl ether, di(ethylene glycol) monoallyl ether, tri(ethylene glycol) monoallyl ether, tetra(ethylene glycol) monoallyl ether, poly(ethylene glycol) monoallyl ether, ethylene glycol methyl allyl ether, di(ethylene glycol) methyl allyl ether, tri(ethylene glycol) methyl allyl ether, tetra(ethylene glycol) methyl allyl ether, poly(ethylene glycol) methyl allyl ether, and combinations thereof; (10) a phosphorylcholine-containing vinylic monomer selected from the group consisting of (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)-ethylphosphate, 3-[(meth)acryloylamino]propyl-2'-(trimethylammonio)ethylphosphate, 4-[(meth)acryloylamino]butyl-2'-(trimethylammonio)ethylphosphate, 5-((meth)acryloyloxy)pentyl-2'-(trimethylammonio)ethyl phosphate, 6-((meth)acryloyloxy)hexyl-2'-(trimethylammonio)-ethylphosphate, 2-((meth)acryloyloxy)ethyl-2'-(triethylammonio)ethylphosphate, 2-((meth)acryloyloxy)ethyl-2'-(tripropylammonio)ethylphosphate, 2-((meth)acryloyloxy)ethyl-2'-(tributylammonio)ethyl phosphate, 2-((meth)acryloyloxy)propyl-2'-(trimethylammonio)-ethylphosphate, 2-((meth)acryloyloxy)butyl-2'-(trimethylammonio)ethylphosphate, 2-((meth)acryloyloxy)pentyl-2'-(trimethylammonio)ethylphosphate, 2-((meth)acryloyloxy)hexyl-2'-(trimethylammonio)ethyl phosphate, 2-(vinyloxy)ethyl-2'-(trimethylammonio)ethylphosphate, 2-(allyloxy)ethyl-2'-(trimethylammonio)ethylphosphate, 2-(vinyloxycarbonyl)ethyl-2'-(trimethylammonio)ethyl phosphate, 2-(allyloxycarbonyl)ethyl-2'-(trimethylammonio)-ethylphosphate, 2-(vinylcarbonylamino)ethyl-2'-(trimethylammonio)ethylphosphate, 2-(allyloxycarbonylamino)ethyl-2'-(trimethylammonio)ethyl phosphate, 2-(butenoyloxy)ethyl-2'-(trimethylammonio)ethylphosphate, and combinations thereof; (11) allyl alcohol; (12)N-2-hydroxyethyl vinyl carbamate; (13)N-carboxyvinyl-β-alanine (VINAL); (14) N-carboxyvinyl-α-alanine; (15) or combinations thereof.

126. The method or coated contact lens of embodiment 125, wherein the monomeric units of said at least one hydrophilic vinylic monomer is present in each polymer chain in an amount of at least about 25% by mole.

127. The method or coated contact lens of embodiment 125, wherein the monomeric units of said at least one hydrophilic vinylic monomer is present in each polymer chain in an amount of at least about 35% by mole.

128. The method or coated contact lens of embodiment 125, wherein the monomeric units of said at least one hydrophilic vinylic monomer is present in each polymer chain in an amount of at least about 45% by mole.

129. The method or coated contact lens of embodiment 125, wherein the monomeric units of said at least one hydrophilic vinylic monomer is present in each polymer chain in an amount of at least about 55% by mole.

130. The method or coated contact lens of any one of embodiments 125 to 129, wherein said at least one hydrophilic vinylic monomer comprises the alkyl (meth)acrylamide.

131. The method or coated contact lens of embodiment 130, wherein the alkyl (meth)acrylamide is (meth)acrylamide, N,N-dimethyl (meth)acrylamide, or a combination thereof.

132. The method or coated contact lens of any one of embodiments 125 to 131, wherein said at least one hydrophilic vinylic monomer comprises the hydroxy-containing acrylic monomer.

133. The method or coated contact lens of any one of embodiments 125 to 132, wherein said at least one hydrophilic vinylic monomer comprises the carboxyl-containing acrylic monomer.

134. The method or coated contact lens of any one of embodiments 125 to 133, wherein said at least one hydrophilic vinylic monomer comprises the amino-containing acrylic monomer.

135. The method or coated contact lens of any one of embodiments 125 to 134, wherein said at least one hydrophilic vinylic monomer comprises the N-vinyl amide monomer.

136. The method or coated contact lens of embodiment 135, wherein the N-vinyl amide monomer is N-vinylpyrrolidone, N-vinyl-N-methyl acetamide, or combinations thereof.

137. The method or coated contact lens of any one of embodiments 125 to 136, wherein said at least one hydrophilic vinylic monomer comprises the methylene-containing pyrrolidone monomer.

138. The method or coated contact lens of any one of embodiments 125 to 137, wherein said at least one hydrophilic vinylic monomer comprises the acrylic monomer having a $C_1$-$C_4$ alkoxyethoxy group.

139. The method or coated contact lens of any one of embodiments 125 to 138, wherein said at least one hydrophilic vinylic monomer comprises the vinyl ether monomer.

140. The method or coated contact lens of any one of embodiments 125 to 139, wherein said at least one hydrophilic vinylic monomer comprises the allyl ether monomer.

141. The method or coated contact lens of any one of embodiments 125 to 140, wherein said at least one hydrophilic vinylic monomer comprises the phosphorylcholine-containing vinylic monomer.

142. The method or coated contact lens of embodiment 141, wherein the phosphorylcholine-containing vinylic monomer is (meth)acryloyloxyethyl phosphorylcholine, (meth)acryloyloxypropyl phosphorylcholine, 4-((meth)acryloyloxy)butyl-2'-(trimethylammonio)ethylphosphate, 2-[(meth)acryloylamino]ethyl-2'-(trimethylammonio)ethylphosphate, 3-[(meth)acryloylamino]propyl-2'-(trimethylammonio)ethylphosphate, 4-[(meth)acryloylamino]butyl-2'-(trimethylammonio)ethylphosphate, or combinations thereof.

143. The method or coated contact lens of any one of embodiments 125 to 142, wherein said at least one hydrophilic vinylic monomer comprises allyl alcohol, N-2-hydroxyethyl vinyl carbamate, N-carboxyvinyl-β-alanine (VINAL), N-carboxyvinyl-α-alanine, or combinations thereof.

144. The method of any one of embodiments 1-16 and 71-124 or the coated contact lens of any one of embodiments 62 to 124, wherein the outer anterior and posterior surface hydrogel layers independent of each another are a crosslinked hydrophilic polymeric material comprising poly(ethylene glycol) chains.

145. The method or coated contact lens of embodiment 144, wherein poly(ethylene glycol) chains are derived directly from: (1) a pol(ethylene glycol) having one sole functional group of —$NH_2$, —SH, —COOH, epoxy group, or vinylsulfone; (2) a poly(ethylene glycol) having two terminal functional groups selected from the group consisting of —$NH_2$, —COOH, —SH, epoxy group, vinylsulfone, and combinations thereof; (3) a multi-arm poly(ethylene glycol) having one or more functional groups selected from the group consisting of —$NH_2$, —COOH, —SH, epoxy group, vinylsulfone, and combinations thereof; or (4) combinations thereof.

146. The method of any one of embodiments 1-61 and 71-145 or coated contact lens of any one of embodiments 62 to 145, wherein the outer anterior and posterior surface hydrogel layers independent of each another have an equilibrium water content of at least 80% by weight.

147. The method of any one of embodiments 1-61 and 71-145 or coated contact lens of any one of embodiments 55 to 138, wherein the outer anterior and posterior surface hydrogel layers independent of each another have an equilibrium water content of at least 85% by weight.

148. The method of any one of embodiments 1-61 and 71-145 or coated contact lens of any one of embodiments 62 to 145, wherein the outer anterior and posterior surface hydrogel layers independent of each another have an equilibrium water content of at least 90% by weight.

149. The method of any one of embodiments 1-61 and 71-145 or coated contact lens of any one of embodiments 62 to 148, wherein the contact lens has a silicon atomic percentage of about 5% or less of total elemental percentage, as measured by XPS analysis of the contact lens in dried state.

150. The method of any one of embodiments 1-61 and 71-145 or coated contact lens of any one of embodiments 62 to 148, wherein the contact lens has a silicon atomic percentage of about 4% or less of total elemental percentage, as measured by XPS analysis of the contact lens in dried state.

151. The method of any one of embodiments 1-61 and 71-145 or coated contact lens of any one of embodiments 62 to 148, wherein the contact lens has a silicon atomic percentage of about 3% or less of total elemental percentage, as measured by XPS analysis of the contact lens in dried state.

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

Example 1

Oxygen Permeability Measurements

Unless specified, the oxygen transmissibility (Dk t), the intrinsic (or edge-corrected) oxygen permeability ($Dk_i$ or $Dk_c$) of a lens and a lens material are determined according to procedures described in ISO 18369-4.

Surface Wettability Tests

Water contact angle (VWCA) on a contact lens is a general measure of the surface wettability of a contact lens.

In particular, a low water contact angle corresponds to more wettable surface. Average contact angles (Sessile Drop) of contact lenses are measured using a VCA 2500 XE contact angle measurement device from AST, Inc., located in Boston, Massachusetts This equipment is capable of measuring advancing contact angles ($\theta_a$) or receding contact angles ($\theta_r$) or sessile (static) contact angles. Unless specified, water contact angle is sessile (static) contact angle on the anterior surface of a contact lens. The measurements are performed on fully hydrated contact lenses and immediately after blot-drying. The blot-dried lens is then mounted on the contact angle measurement pedestal with the anterior surface up, and the sessile drop contact angle is automatically measured using the software provided by the manufacturer. The deionized water (ultra pure) used for measuring the water contact angle has a resistivity >18 MΩcm and the droplet volume used is 2p0. The tweezers and the pedestal are washed well with Isopropanol and rinsed with DI (deionized) water before coming in contact with the contact lenses. Each static water contact angle is the average of the left and right water contact angles. The static water contact angle in reference to a contact lens is an average water contact angle obtained by averaging the static water contact angles measured with at least 5 contact lenses.

Water Break-Up Time (WBUT) Tests

The surface hydrophilicity of lenses (after autoclave) is assessed by determining the time required for the water film to start breaking on the lens surface, based upon the equipment in U.S. Pat. No. 9,265,413. Lenses exhibiting WBUT a 10 seconds are considered to have a hydrophilic surface and are expected to exhibit adequate wettability (ability to support the tear film) on-eye.

Lenses are prepared for water breakup measurement by removing the lens from its blister with soft plastic tweezers (Menicon) and each lens is placed in a beaker containing 90 ml phosphate buffered saline. Each lens is swirled for roughly 5 seconds. This preparation step is repeated two more times with fresh PBS. Then each lens is stored overnight in 10 ml of PBS in test tubes prior to testing.

Water breakup time (WBUT) is measured at room temperature as follows: lenses are picked up with soft plastic tweezers as close to the edge of the lens as possible and placed on a Delrin pedestal. The pedestal is then submerged in a Langmuir trough, filled with twenty-five ml of PBS. The pedestal is then brought through the air-water interface, where an overhead video camera starts recording the PBS flowing off the lens. The time between when the pedestal is brought through the air-water interface and the first instance that the PBS shows a break in the fluid is defined as the WBUT.

Equilibrium Water Content

The equilibrium water content (EWC) of contact lenses is determined as follows.

Amount of water (expressed as percent by weight) present in a hydrated hydrogel contact lens, which is fully equilibrated in saline solution, is determined at room temperature using an analytical balance. Remove the lenses from the saline, quickly blot with a cloth, stack and then transfer them to an aluminum pan with a prerecorded weight. The number of lenses for each sample pan is typically five (5). Record the pan plus hydrated weight of the lenses. Cover the pan with aluminum foil. Place pans in a laboratory oven at 100±2° C. to dry for 16-18 hours. Remove pan plus lenses from the oven and cool in a desiccator for at least 30 minutes. Remove the pan from the desiccator, and discard the aluminum foil. Weigh the pan plus dried lens sample on the analytical balance. The wet and dry weight of the lens samples can be calculated by subtracting the weight of the empty weigh pan, and the EWC is calculated from the weight lost divided by the number of lenses.

Elastic Modulus

The elastic modulus of a contact lens is determined using a MTS insight instrument. The contact lens is first cut into a 3.12 mm wide strip using Precision Concept two stage cutter. Five thickness values are measured within 6.5 mm gauge length. The strip is mounted on the instrument grips and submerged in PBS with the temperature controlled at 21±2° C. Typically a 5N Load cell is used for the test. The grips separate at a constant speed until the sample breaks. Force and displacement data are collected by the TestWorks software. The elastic modulus value is calculated by the TestWorks software which is the slope or tangent of the stress vs. strain curve near zero elongation, in the elastic deformation region.

Surface Softness of Contact Lenses

The softer the outside of a contact lens is, the less pressure it induces on the wearer's eye for the same normal force. This, in turn, can increase the comfort level of a lens. Utilizing the Optics 11 Piuma Nanoindenter, we will evaluate contact lens outer surface softness by applying biological levels of pressure (1-5 kPa) and then reporting how much compliance the surface has.

Nano-Indentation Tests

The indentation depth of an indenting probe having a tip radius of ~10 μm and a stiffness of ~0.5 N/m at 5 KPa compression pressure against one of the surfaces of a contact lens is measured in micro-indentation tests as follows.

The Optics11 Piuma device is used to determine indentation depth function of displacement. Before indentations are performed, the Piuma probe is calibrated in PuriLens™ Plus, which is a sterile and preservative-free saline solution from LifeStyle Company, Inc. (Freehold, NJ). This calibration consists of first calibrating the optical sensor while the probe is submersed in PuriLens™ Plus but not engaged in contact with a surface of a substrate. Next, a second cantilever calibration is performed by making a test indentation on the steel mounting ball.

Figure 2:
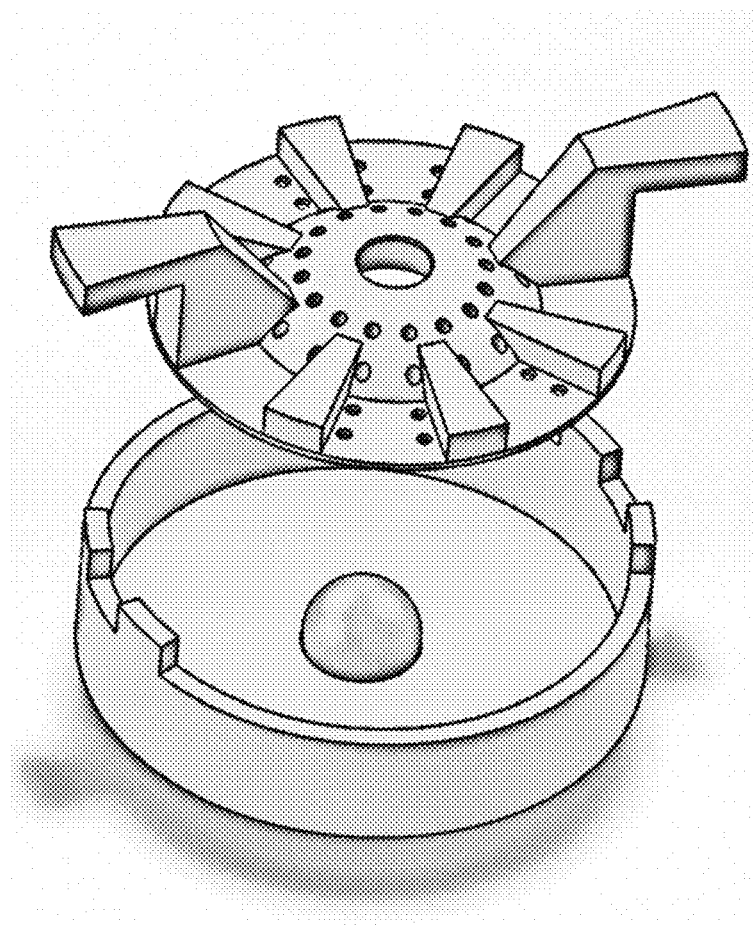
FIG. 2 schematically illustrates a lens holder for performing nano-indentation measurements of contact lenses with Optics11 Puima nano-indentation instrument.

Lenses are soaked in 30-50 ml PuriLens™ Plus (with 0.1% Pluornic F-127) for a minimum of 30 minutes to wash off excess lens package solution. Next, the lens is placed front curve down into a 3D-printed lens holder (FIG. 2). For testing the posterior surface, the contact lens is inverted onto the steel ball bearing so that the original posterior surface is exposed to the probe. This inversion also minimizes air bubbles and excess testing solution between the lens and holder.

Finally, the Piuma probe is brought just above the posterior surface, and the nano-indentation routine is performed according to the manufacturer's typical procedures. The indentation routine consists of a 10 μm indentation at a rate of 1 μm/sec, with a sampling rate of at a rate of 100 Hz. The probe moves to the surface, where the contact point is determined by the first deflection detected by the cantilever.

The Piuma probe used to collect data typically has a stiffness of ~0.5 N/m and a tip radius of ~10 μm. The area of contact of the spherical cap ($S_{cap}$) can be calculated by:

$$S_{cap} = 2\pi Rh$$

in which "R" is the tip radius and h is the indentation depth. Therefore, the pressure can be calculated by taking the force measured divided by the area of contact $S_{cap}$.

As the indentation is performed, both the depth of the indentation and the indentation force is recorded. Three lenses per lens type are tested, and each specimen was tested in a 4×4 grid (250 µm between locations) across the approximate center of the lens. Each location is indented 3 times in succession. This results in a total of 48 data points per lens and 144 data points per lens group.

All the raw data is processed using MATLAB and analyzed using Excel. The indentation depth value at pressure of 5 kPa (approximate eyelid pressure) is reported to represent how much compliance the surface gel has under physiological condition.

Alternatively, a surface modulus value can be obtained at a certain indent depth using a Hertzian fit of the force-distance profile. For example, the surface modulus at an indentation depth of 400 nm can be reported.

Determinations of Polyquaternium-1 Uptake (PU).

Polyquaternium-1 uptake by a contact lens is determined according to a DNA intercalation procedure based on a PicoGreen dsDNA assay kit (i.e. Quanti-iT PicoGreen dsDNA kit, ThermoFisher). Polyquaternium-1 uptake by a contact lens is determined as follows:

A basis solution is prepared by dissolving the following components in purified water 5 ppm myristamidopropyldimethylamine; 1000 ppm sodium decanoyl ethylenediamine triacetate; 83 ppm sodium citrate dehydrate; 1000 ppm NaCl; 1000 ppm Tetronic 1304; 1150 ppm sodium borate decahydrate; and 10000 ppm propylene glycol and then by adjusting pH to about 7.8.

The Polyquaternium-1 (PQ) testing solution is prepared by dissolving a desired amount in the basis solution prepared above to have 5 ppm PQ and then by adjusting pH to about 7.8 if necessary. A series of PQ standard solutions each having a concentration within a range are prepared to establish a calibration curve between 0 and 6 ppm (or higher) of PQ.

Contact lenses are removed from their individual lens packages and shaken in 25 ml PBS per lens for 30 minutes. The PBS-soaked lenses are blotted with a paper towel (preferably with W4 polypropylene towels from Kimberly Clark) with a fixed weight (i.e. 0.6 kg) before being incubated overnight.

A 24-well plate will be used in the overnight incubation experiment. The wells are divided into the following categories: negative-control wells each containing 0.5 mL of the basis solution and two blotted contact lenses fully immersed therein; positive-control wells each containing 0.5 mL of the polyquaternium-1 testing solution; samples wells each containing 0.5 mL of the polyquaternium-1 testing solution and two blotted contact lenses fully immersed therein; standard wells each containing 0.5 mL of one of one of the standard solutions. The 24-well plate then is shaken for 20 minutes on an orbital shaker and then sits on a bench top overnight (for 16-20 hours) at room temperature.

A 25 µL aliquot from each of the wells of the overnight incubated 24-well plate is added to a 96-well plate (e.g. DNA LoBind, Eppendorf) cell well containing 450 µL of a Lambda DNA solution (1 µg/mL Lambda DNA; 10 mM Tris-HCl; 1 mM EDTA; pH 7.5). The solution is mixed and incubated on an orbital shaker at 700-800 rpm for 60 minutes.

A 100 µL aliquot from each of the DNA-incubated cell wells are transferred to a 96-well plate (e.g., black opaque, med bind, Grenier). Then 100 µL of the PicoGreen solution (ThermoFisher, diluted with Tris-EDTA buffer [10 mM Tris-HCl, 1 mM EDTA, pH 7.5] per kit instructions) are added to each of those wells and mixed. The cell wells are then incubated on an orbital shaker for 5 minutes at 250 rpm. Each plate is read with a fluorescence plate reader (e.g., Victor X5 Plate Reader, Perkin Elmer) using standard fluorescence excitation and emission wavelengths for the PicoGreen. Each sample is compared against the linear fit of the standard curve to obtain final PQ concentration in each solution. The amount of PQ uptake per lens is obtained by multiplying the incubation volume and dividing by the number of lenses incubated. The PQ uptake by the lens is calculated to be the difference in [polyquaternium-1] between the DNA-incubated positive-control and sample solutions, times the incubation volume (0.5 mL) and divide by 2.

Chemicals

The following abbreviations are used in the following examples: NVP represents N-vinylpyrrolidone; MMA represents methyl methacrylate; TEGDMA represent triethyleneglycol dimethacrylate; VAZO 64 represents 2,2'-dimethyl-2,2'azodipropiononitrile; Nobloc is 2-[3-(2H-Benzotriazol-2-yl)-4-hydroxyphenyl]ethyl methacrylate from Aldrich; UV28 represents 2-{2'-Hydroxy-3'-tert-butyl-5'-[3'-methacryloyloxypropoxy]phenyl}-5-chloro-2H-benzotiiazole; RB247 is Reactive Blue 247; TAA represents tert-amyl alcohol; PrOH represents 1-propanol; IPA represents isopropanol; PAA represents polyacrylic acid; PMAA represents polymethacrylic acid; PAE represents polyamidoamine-epichlorohydrin (a.k.a., polyamine-epichlorohydrin); MPC represent 2-methacryloyloxyethyl phosphorylcholine; Poly(AAm-co-AA) represents poly(acrylamide-co-acrylic acid); PBS represents a phosphate-buffered saline which has a pH of 7.2±0.2 at 25° C. and contains about 0.044 wt % $NaH_2PO_4 \cdot H_2O$, about 0.388 wt. % $Na_2HPO_4 \cdot 2H_2O$, and about 0.79 wt. % NaCl and; wt % represents weight percent; D9 represents monobutyl-terminated monomethacryloxypropyl-terminated polydimethylsiloxane (Mw~984 g/mol from Shin-Etsu); "G4" macromer represents a di-methacryloyloxypropyl-terminated polysiloxane (Mn~13.5K g/mol, OH content~1.8 meq/g) of formula (A).

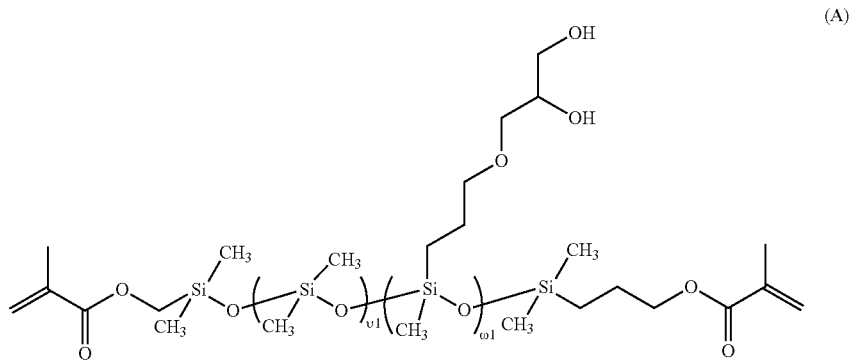

(A)

Example 2

Preparation of Polymerizable Compositions

Lens formulations (polymerizable compositions), I to III, are prepared to have compositions (in unit parts) as shown in Table 4 and each lens formulations also include 0.5 unit parts of VAZO-64 and 0.01 parts of RB247.

TABLE 4

|  | Formulation I | Formulation II | Formulation III |
| --- | --- | --- | --- |
| D9 | 33 | 33 | 33 |
| G4 | 10 | 10 | 10 |
| NVP | 46 | 46 | 46 |
| MMA | 10 | 10 | 10 |
| TEGDMA | 0.5 | 0.65 | 0.7 |
| Norbloc | 1.5 | 1.5 | 1.5 |
| UV28 | 0.26 | 0.26 | 0.26 |
| TAA | 10 | 10 | 10 |
| Curing | 55/80/100° C. | 55/80/100° C. | 55/80/100° C. |
| Profile | 30 min/2 hr/30 min | 40 min/40 min/40 min | 30 min/120 min/30 min |

The formulations are prepared by adding listed components in their targeted amounts into a clean bottle, with a stir bar to mix at 600 rpm for 30 minutes at room temperature. After all the solid is dissolved, a filtration of the formulation is carried out by using 2.7 μm glass-microfiber-filter.

Cast-Molded Silicone Hydrogel Contact Lenses

A lens formulation is purged with nitrogen at room temperature for 30 to 35 minutes. The $N_2$-purged lens formulation is introduced into polypropylene molds and thermally cured in an oven under the following curing conditions: ramping from room temperature to a first temperature and then holding at the first temperature for a first curing time period; ramping from the first temperature to a second temperature and holding at the second temperature for a second curing time period; optionally ramping from the second temperature to a third temperature and holding at the third temperature for a third curing time period; and optionally ramping from the third temperature to a fourth temperature and holding at the fourth temperature for a fourth curing time period.

Lens molds are opened by using a demolding machine with a push pin. Lenses are pushed onto base curve molds with a push pin and then molds are separated into base curve mold halves and front curve mold halves. The base curve mold halves with a lens thereon are placed in an ultrasonic device (e.g., Dukane's single horn ultrasonic device). With a certain energy force, a dry state lens is released from mold. The dry state lens is loaded in a designed extraction tray. Alternatively, lenses can be removed from the base curve mold halves by floating off (i.e., soaking in an organic solvent, e.g., IPA, without ultrasonic).

The obtained silicone hydrogel (SiHy) contact lenses can be subjected to various post-molding processes before lens characterization.

For example, after demolding, SiHy lenses prepared above are extracted with 100% IPA for 15 minutes, immersed in 50 wt %/50 wt. % IPA/water mixture for 30 minutes and then in DI water for 30 minutes, and finally rinsed with PBS saline for about 60 minutes at room temperature. After rinsing in PBS with 5 min, the lens then is placed in polypropylene lens packaging shells (or blisters) (one lens per shell) with 0.6 mL of PBS. The blisters are then sealed with foil and autoclaved for about 45 minutes at about 121° C. The resultant SiHy contact lenses are characterized according to the procedures to have the following properties: Dkc~105 barrers-118 barrers; EWC~54 wt %-57 wt %; elastic modulus~0.55 MPa-0.74 MPa.

Example 3

Poly(AAm-co-AA)(90/10) partial sodium salt, poly(AAm-co-AA) 90/10, Mw 200,000) is purchased from Polysciences, Inc. and used as received; PAE (Kymene) is obtained from Ashland as an aqueous solution and used as received; PAA (Mn: ~450 kDa) is obtained from Polysciences, Inc. and used as received; PMAA (Mn: 400-700 kDa) is obtained from PolyMaterials, Inc. and used as received.

A copolymer, poly(2-methacryloyloxyethyl phosphorylcholine-co-2-Aminoethylmethacrylate)(96/4 w/w) (i.e., poly(MPC-co-AEM), is prepared by thermal polymerizing a polymerizable composition comprising: about 96 wt. % MPC; about 4 wt. % AEM; about 0.02 wt. % Vazo 56 [2,2'-Azobis(2-methylpropionamidine) dihydrochloride]; about 0.1 wt. % chain transfer agent (HS—CH2CH2OH) in water at about 60° C. for about 2 hours and then at 20° C. for about 2 hours. The obtained poly(MPC-co-AEM) (an aqueous solution with solid content~10 wt. %) is determined to have an amine functionality of ~0.22 meq/g, and a Mn of ~160 kDa.

PAA Solution #1

This solution is prepared as follows. An amount of PAA powder is dissolved in a desired volume of PrOH to prepare a PAA solution. After PAA is fully dissolved, the pH is adjusted by adding ~3.8 wt. % formic acid to the PAA PrOH solution to about 2. The target concentration of PAA is about 0.44 wt % by weight. The prepared PAA solution is filtered to remove any particulate or foreign matter.

PAA Solution #2

This solution is prepared as follows. An amount of PAA powder is dissolved in a desired volume of a mixture of PrOH/$H_2$O (50/50 by weight) to prepare a PAA solution. After PAA is fully dissolved, the pH is adjusted by adding ~1.9 wt. % formic acid to the PAA PrOH/$H_2$O solution to about 2. The target concentration of PAA is about 0.4 wt % by weight. The prepared PAA solution is filtered to remove any particulate or foreign matter.

PMAA Solution #1

The PMAA solution #1 is prepared by dissolving a PMAA concentrate (e.g., ~2.6 wt. % in DI (de-ionized) water), in a mixture of 50 wt. % DI water and ~48 wt % PrOH. Once solution is mixed, 1.87 wt. % formic acid is added. The final PMAA concentration in the mixture is ~0.04 wt. %.

PMAA Solution #2

The PMAA solution #2 is prepared by dissolving a PMAA concentrate (e.g., ~2.6 wt. % in DI (de-ionized)

water), in 50 wt. % DI water and ~48 wt. % PrOH. Once solution is mixed, 1.87 wt. % formic acid is added. The final PMAA concentration in the mixture is ~0.4 wt. %.

Phosphate Buffered Saline (PBS)

A phosphate buffered saline is prepared by dissolving $NaH_2PO_4.H_2O$, $Na_2HPO_4.2H_2O$, and in a given volume of purified water (distilled or deionized) to have the following composition: ca. 0.044 wt. % $NaH_2PO_4.H_2O$, ca. 0.388 wt. % $Na_2HPO_4.2H_2O$, and ca. 0.79 wt % NaCl.

Phosphate Buffer (PB) without NaCl (PB, No NaCl)

PB is prepared using the same procedure for preparing PBS, but no NaCl is added.

IPC Saline #0

This IPC saline is prepared by dissolving/mixing appropriate amounts of Poly(AAm-co-AA)(90/10), PAE, $NaH_2PO_4.H_2O$, $Na_2HPO_4.2H_2O$ and NaCl in DI (de-ionized) water to have the following concentrations: 0.07 wt. % of poly(AAm-co-AA); about 0.11 wt % PAE; about 0.044 wt. % $NaH_2PO_4.H_2O$, about 0.388 wt % $Na_2HPO_4.2H_2O$, and about 0.79 wt. % NaCl and then by adjusting pH to about 7.3. The prepared solution is pre-treated at 65° C. for about 6 hours. After the heat pre-treatment, the IPC saline is cooled down back to room temperature and adjust pH as needed, and the IPC saline is filtered using a 0.22 micron membrane filter.

IPC Saline #1

This IPC saline is prepared by dissolving/mixing appropriate amounts of Poly(AAm-co-AA)(90/10), PAE, $NaH_2PO_4.H_2O$ and $Na_2HPO_4.2H_2O$ in DI (de-ionized) water to have the following concentrations: about 0.28 wt. % of poly(AAm-co-AA); about 0.025 wt % PAE; about 0.028 wt. % $NaH_2PO_4.H_2O$, about 0.231 wt. % $Na_2HPO_4.2H_2O$ and then by adjusting pH to about 7.3. The prepared solution is pre-treated at 60° C. for about 6 hours. After the heat pre-treatment, the IPC saline is cooled down back to room temperature. The IPC saline is filtered using a 0.22 micron membrane filter.

IPC Saline #2a: With PB/Glycerol Only

This IPC saline is prepared by dissolving/mixing appropriate amounts of Poly(AAm-co-AA)(90/10), PAE, $NaH_2PO_4.H_2O$ and $Na_2HPO_4.2H_2O$ in DI (de-ionized) water to have the following concentrations: about 0.28 wt. % of poly(AAm-co-AA); about 0.025 wt % PAE; about 0.028 wt. % $NaH_2PO_4.H_2O$, about 0.23 wt % $Na_2HPO_4.2H_2O$ and then by adjusting pH to about 7.3. The prepared solution is pre-treated at 60° C. for about 6 hours. After the heat pre-treatment, the IPC saline is cooled down back to room temperature. About 2.5 wt. % glycerol is added to the final IPC saline and then adjust the pH to about 7.3. The IPC saline is filtered using a 0.22 micron membrane filter.

IPC Saline #2b

Same as IPC saline #2a, but with about 0.044 wt % $NaH_2PO_4.H_2O$, about 0.388 wt % $Na_2HPO_4.2H_2O$, and about 2.2% glycerol.

IPC Saline #3, with Different Combinations of PB, Glycerol and NaCl

This IPC saline is prepared by dissolving/mixing appropriate amounts of Poly(AAm-co-AA)(90/10), PAE, $NaH_2PO_4.H_2O$ and $Na_2HPO_4.2H_2O$ in DI (de-ionized) water to have the following concentrations: about 0.28 wt. % of poly(AAm-co-AA); about 0.025 wt. % PAE; about 0.028 wt. % or 0.044 wt. % $NaH_2PO_4.H_2O$, about 0.231 wt. % or 0.388 wt. % $Na_2HPO_4.2H_2O$ and then by adjusting pH to about 7.3. The prepared solution is pre-treated at 60° C. for about 6 hours. After the heat pre-treatment, the IPC saline is cooled down back to room temperature. Additional tonicity-adjusting agents, for example, NaCl (0 wt. % to 0.79 wt. %), glycerol (0% to 2.5 wt. %), $NaH_2PO_4.H_2O$ (0% to 0.3 wt. %), $Na_2HPO_4.2H_2O$ (0% to 2.5 wt. %), at different combinations are added to have a final osmolality of from about 280 mOsm/Kg to 340 mOsm/Kg. Then the pH is adjusted to about 7.3. The IPC saline is filtered using a 0.22 micron membrane filter.

The detailed compositions of IPC saline #3a to 3h are listed in following table

| IPC saline # | $NaH_2PO_4 \cdot H_2O$ (wt %/mM) | $Na_2HPO_4 \cdot 2H_2O$ (wt %/mM) | Glycerol (wt %) | NaCl (wt %) | Total Phosphate salts (mM) | Total salts (mM) | Osmolality (mOsm/Kg) |
|---|---|---|---|---|---|---|---|
| 3a | 0.028/2.0 | 0.23/12.9 | 2.2 | | 14.9 | 14.9 | 282 |
| 3b | 0.044/3.2 | 0.38/21.3 | 2.2 | | 24.5 | 24.5 | 309 |
| 3c | 0.044/3.2 | 0.38/21.3 | 2 | 0.1 | 24.5 | 41.6 | 322 |
| 3d | 0.044/3.2 | 0.38/21.3 | 1.5 | 0.3 | 24.5 | 75.8 | 336 |
| 3e | 0.224/16.2 | 1.89/106.2 | 0.8 | | 122.4 | 122.4 | 438 |
| 3f | 0.27/19.6 | 2.286/128.4 | 0.4 | | 148.0 | 148.0 | 468 |
| 3g | 0.028/2.0 | 0.23/12.9 | 0 | 0.79 | 14.9 | 149.9 | 313 |
| 3h | 0.294/21.3 | 2.54/142.7 | | | 164.0 | 164.0 | 471 |

IPC Saline #4: With NaCl

This IPC saline is prepared by dissolving/mixing appropriate amounts of poly(MPC-co-AEM), PAE, $NaH_2PO_4.H_2O$ and $Na_2HPO_4.2H_2O$ in DI (de-ionized) water to have the following concentrations: about ~7.5 wt. % poly(MPC-co-AEM); about 1.2 wt. % PAE; about 0.046 wt. % $NaH_2PO_4.H_2O$, about 0.19 wt. % $Na_2HPO_4.2H_2O$ and then by adjusting pH to about 7.3. The prepared solution is pre-treated at 60° C. for about 4 hours. After the heat pre-treatment, the IPC saline is cooled down back to room temperature and then is diluted to a final solution that has ~0.75 wt % poly(MPC-co-AEM); about 0.12 wt % PAE; about 0.074 wt. % $NaH_2PO_4.H_2O$, about 0.30 wt. % $Na_2HPO_4.2H_2O$, 0.070% sodium citrate dihydrate and about 0.77 wt. % NaCl. Then the pH is adjusted to about 7.3. The IPC saline is filtered using a 0.22 micron membrane filter.

IPC Saline #5: Without NaCl

IPC saline is prepared by the same process shown in IPC Saline #4 except no NaCl in final solution.

IPC Saline #6: With Glycerol

IPC saline is prepared by dissolving/mixing appropriate amounts of poly(MPC-co-AEM), PAE, $NaH_2PO_4.H_2O$ and $Na_2HPO_4.2H_2O$ in DI (de-ionized) water to have the following concentrations: about ~7.5 wt. % poly(MPC-co-AEM); about 1.2 wt. % PAE; about 0.046 wt. % $NaH_2PO_4.H_2O$, about 0.19 wt. % $Na_2HPO_4.2H_2O$ and then by adjusting pH to about 7.3. The prepared solution is pre-treated at 60° C. for about 4 hours. After the heat pre-treatment, the IPC saline is cooled down back to room temperature and then diluted to a final solution that has ~0.75 wt % poly(MPC-co-AEM); about 0.12 wt % PAE; about 0.074 wt. % $NaH_2PO_4 \cdot H_2O$, about 0.30 wt. % $Na_2HPO_4 \cdot 2H_2O$ and about 2.2 wt. % glycerol. Then the pH is adjusted to about 7.3. The IPC saline is filtered using a 0.22 micron membrane filter.

Example 4

Surface Softness of SiHy Contact Lenses

SiHy contact lenses (uncoated) are cast-molded according to the procedures described in Example 3 of U.S. Pat. No. 10,266,445. After de-molding, SiHy contact lenses prepared above are placed in lens trays. Then the lens trays with lenses are immersed in water for about 1 minutes, followed by in MEK for bout 5 minutes, then in water for about 52 seconds, then in 0.44 wt. % PAA Solution #1 (in PrOH) for about 44 seconds, followed by about 52 seconds in PrOH/$H_2O$ (50/50 wt/wt.) mixture, then in DI water for about 3.5 minutes, then in phosphate buffer for about 52 seconds.

SiHy lenses with a PAA base coating thereon prepared above are placed in polypropylene lens packaging shells (one lens per shell) containing about 0.15-0.3 mL of one of the IPC salines prepared in Example 3. About 0.35-0.5 mL of one IPC saline is dosed into the concave surface (i.e., the posterior surface or the inverted anterior surface) with some overflow of the same IPC saline in the packaging shell. The blisters (packaging shells) are then sealed with foil and autoclaved for about 45 minutes at about 121° C., forming SiHy contact lenses with a cross-linked hydrophilic coating (i.e., a hydrogel coating) thereon (or so-called water gradient contact lenses).

Characterization

Where IPC saline #0 is used as the packaging solution (pH~7.3, $[HPO_4^{2-}]$~14.1 mM $[phosphate]_{total}$~25 mM, $[Ions]_{total}$~334 mM), the resultant water gradient contact lenses have an indentation depth of about 448 nm at pressure of about 5 KPa and a surface modulus of about 60 kPa at an indentation depth of 400 nm.

Where IPC saline #1 is used as the packaging solution (pH~7.3, $[HPO_4^{2-}]$~8.4 mM $[phosphate]_{total}$~15 mM, $[Ions]_{total}$~38.4 mM), the resultant water gradient contact lenses have an indentation depth of about 919 nm at pressure of about 5 KPa and a surface modulus of about 12 kPa at an indentation depth of 400 nm.

Where IPC saline #2a is used as the packaging solution (pH~7.3, $[HPO_4^{2-}]$~8.4 mM $[phosphate]_{total}$~14.9 mM, $[Ions]_{total}$~38.2 mM), the resultant water gradient contact lenses have an indentation depth of about 999 nm at pressure of about 5 KPa and a surface modulus of about 10 kPa at an indentation depth of 400 nm.

Where IPC saline #2b is used as the packaging solution (pH~7.3, $[HPO_4^{2-}]$~14.1 mM $[phosphate]_{total}$~25 mM, $[Ions]_{total}$~64.0 mM), the resultant water gradient contact lenses have an indentation depth of about 856 nm at pressure of about 5 KPa and a surface modulus of about 13 kPa at an indentation depth of 400 nm.

Where IPC saline is one of #3a to #3h is used as the packaging solution, the indentation depths at pressure of 5 KPa and the surface modulus at an indentation depth of 400 nm of the resultant water gradient contact lenses are reported in table below.

| IPC saline # | $[HPO_4^{2-}]$* (mM) | $[phosphate]_{total}$ (mM) | $[Ions]_{total}$ (mM) | Osmolality mOsm/Kg | Indent depth (nm) @ 5 kPa | Surface modulus (kPa) @ 400 nm |
|---|---|---|---|---|---|---|
| 3a | 8.4 | 14.9 | 42.7 | 282 | 734 | 16 |
| 3b | 13.8 | 24.5 | 70.3 | 309 | 856 | 13 |
| 3c | 13.8 | 24.5 | 104.5 | 322 | 851 | 14 |
| 3d | 13.8 | 24.5 | 172.9 | 336 | 671 | 22 |
| 3e | 68.9 | 122.4 | 351 | 438 | 407 | 87 |
| 3f | 83.3 | 148.0 | 424.4 | 468 | 408 | 85 |
| 3g | 8.4 | 14.9 | 312.7 | 313 | 348 | 136 |
| 3h | 92.3 | 164.0 | 470.7 | 471 | 261 | 227 |

*calculated based on pKa = 7.19 and pH = 7.3.

Example 5

Lenses prepared in Example 2 are coated by PMAA by the following steps, 40 minutes in PrOH, then 170 minutes in PrOH, then 50 minutes in 0.4 wt % PMAA solution #2 (prepared in Example 3), then 25 minutes in 50/50 w/w PrOH/water, then 50 minutes in PB solution with pH adjusted to 7.8

Then the lenses with PMAA base coating thereon (prepared above) are packaged and autoclaved in IPC saline #2 (prepared in Example 3). The indent depth to 5 Kpa is about 2074 nm. The surface modulus at 400 nm indent depth is about 5 kPa.

Example 6

Lenses prepared in Example 2 are coated by PAA by the following steps, 40 minutes in PrOH, then 170 minutes in PrOH, then 50 minutes in 0.4 wt % PAA solution #2 (prepared in Example 3), then 25 minutes in 50/50 w/w PrOH/water, then 50 minutes in PB solution with pH adjusted to 7.8

Then the lenses are packaged and autoclaved in IPC saline #2 (prepared in Example 3). The indent depth to 5 Kpa is about 2210 nm. The surface modulus at 400 nm indent depth is about 2 kPa.

Example 7

Lenses prepared in Example 2 are coated by PMAA by the following steps, 40 minutes in PrOH, then 170 minutes in PrOH, then 50 minutes in 0.04 wt. % PMAA solution #1 (prepared in Example 3), then 25 minutes in 50/50 wt/wt PrOH/water, then 25 minutes in 10 mM PB solution with pH adjusted to 7, then at least 50 minutes in 12 mM PB with pH adjusted to 8.2.

Then the lenses are packaged and autoclaved in IPC saline #4 (prepared in Example 3). The PQ uptake (PU) for the two lots tested are 0.33±0.05 and 0.36±0.08 µg/lens. Then the lenses are packaged and autoclaved in IPC saline #5 and #6. The PQ uptake (PU) the lenses packaged and autoclaved in the IPC saline #5 is 0.1710.02 µg/lens and in the IPC saline #6 is 0.16±0.09 µg/lens respectively.

All the publications, patents, and patent application publications, which have been cited herein above in this application, are hereby incorporated by reference in their entireties.

What is claimed is:

1. A method for making coated contact lenses, comprising the steps of:
   (1) obtaining a contact lens precursor which has a concave surface and an opposite convex surface and comprises a lens bulk material and first reactive functional groups on and/or near the anterior and posterior surfaces, wherein the first reactive functional groups are selected from the group consisting of carboxyl groups, amino groups, azetidnium groups, and combinations thereof; and
   (2) autoclaving the contact lens precursor immersed in a packaging solution in a sealed lens package at a temperature of from about 115° C. to about 125° C. for approximately 20-90 minutes to form a coated contact lens having a hydrogel coating thereon, wherein the packaging solution comprises (a) at least one hydrophilic polymeric material and (b) a pH-buffering system for maintaining pH of the packaging solution, wherein the pH-buffering system comprises at least two buffering agents which are phosphates, wherein the total concentration of all buffering agents present in the packaging solution is from about 10 mM to 70 mM, wherein the packaging solution has a room temperature and a pH of from about 6.9 to about 7.3, wherein the totally concentration of all ions present in the packaging solution is less than 201 mM, provided that the total concentration of all ions each having two or more charges in the packaging solution is less than 50 mM, wherein said at least one hydrophilic polymeric material comprises second reactive functional groups which are selected from the group consisting of carboxyl groups, amino groups, azetidnium groups, and combinations thereof, wherein the hydrogel coating is covalently attached onto the contact lens precursor through covalent linkages each formed between one first functional group and one second functional group, wherein the coated contact lens has a superior lens surface softness as measured by an averaged indentation depth at 5 KPa compression pressure of at least 550 nm with using an indenting probe having a tip radius of 10 µm and a stiffness of 0.5 N/m in a nanoindentation test.

2. The method of claim 1, wherein the contact lens precursor inherently comprises first reactive functional groups on and/or near the anterior and posterior surfaces, or wherein the contact lens precursor is obtained by subjecting a preformed contact lens to a surface treatment to have the first reactive functional groups.

3. The method of claim 2, wherein if the first reactive functional groups are carboxyl groups and/or amino groups, then the second reactive functional groups are azetidinium groups; wherein if the first reactive functional groups are azetidinium groups, then the second reactive functional groups are carboxyl groups, amino groups, or combinations thereof.

4. The method of claim 3, wherein the packaging solution additionally includes one or more non-ionic tonicity-adjusting agents and are used to adjust the osmolality of the packaging solution to a value from about 200 to about 450 mOsm/Kg, wherein said one or more nonionic tonicity-adjusting agents are glycerol, propylene glycol, polyols, mannitol, sorbitol, xylitol, or mixtures thereof.

5. The method of claim 4, wherein said at least one hydrophilic polymeric material is a branched hydrophilic polymeric material comprising the second reactive functional groups.

6. The method of claim 2, wherein the first reactive functional groups are carboxyl groups and/or amino groups whereas the second reactive functional groups are azetidinium groups.

7. The method of claim 6, wherein the packaging solution additionally includes one or more non-ionic tonicity-adjusting agents and are used to adjust the osmolality of the packaging solution to a value from about 200 to about 450 mOsm/Kg, wherein said one or more nonionic tonicity-adjusting agents are glycerol, propylene glycol, polyols, mannitol, sorbitol, xylitol, or mixtures thereof.

8. The method of claim 7, wherein said at least one hydrophilic polymeric material is a branched hydrophilic polymeric material comprising the second reactive functional groups.

9. The method of claim 8, wherein the branched hydrophilic polymeric material comprises azetidinium groups and is a partial reaction product of at least one azetidinium-containing polymer with at least one hydrophilicity-enhancing polymer having at least one carboxyl, primary amine, secondary amine, or thiol group.

10. The method of claim 9, wherein the contact lens precursor inherently comprises comprise first reactive functional groups on and/or near the anterior and posterior surfaces.

11. The method of claim 9, wherein the contact lens precursor is obtained by subjecting a preformed contact lens to a surface treatment to have the first reactive functional groups.

12. The method of claim 11, wherein the surface treatment is a plasma treatment; a chemical treatment; a chemical vapor deposition; grafting of compounds having at least one first reactive functional group onto the surface of the preformed contact lens; graft-polymerization of vinylic monomers each having at least one first reactive functional group onto the surface of the preformed contact lens; layer-by-layer ("LbL") deposition of one or more hydrophilic materials having first reactive functional groups on the surface of the preformed contact lens; covalently attachment of one or more hydrophilic polymeric materials having first reactive functional groups onto the surface of the preformed contact lens; or a combination thereof.

* * * * *